(12) United States Patent
Carlson et al.

(10) Patent No.: US 10,399,285 B2
(45) Date of Patent: Sep. 3, 2019

(54) COMPOSITE WING STRUCTURE AND METHODS OF MANUFACTURE

(71) Applicant: Bell Helicopter Textron Inc., Fort Worth, TX (US)

(72) Inventors: David G. Carlson, North Richland Hills, TX (US); John R. McCullough, Weatherford, TX (US); Douglas K. Wolfe, Denton, TX (US); Andrew G. Baines, Southlake, TX (US); George R. Decker, Amarillo, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 358 days.

(21) Appl. No.: 15/423,939

(22) Filed: Feb. 3, 2017

(65) Prior Publication Data

US 2018/0001579 A1 Jan. 4, 2018

Related U.S. Application Data

(60) Provisional application No. 62/292,673, filed on Feb. 8, 2016.

(51) Int. Cl.
*B29C 70/34* (2006.01)
*B29C 35/02* (2006.01)
(Continued)

(52) U.S. Cl.
CPC ............. *B29C 70/34* (2013.01); *B29C 35/02* (2013.01); *B29C 70/06* (2013.01); *B29C 70/545* (2013.01);
(Continued)

(58) Field of Classification Search
None
See application file for complete search history.

(56) References Cited

U.S. PATENT DOCUMENTS 3,885,887 A    5/1975   Desjardins
4,186,536 A *  2/1980   Piazza .................... E04C 2/284
                                                                            264/279
(Continued)

FOREIGN PATENT DOCUMENTS

EP         3202660 A1    8/2017
EP         3208187 A1    8/2017
(Continued)

OTHER PUBLICATIONS

European Exam Report, dated Mar. 1, 2018, by the EPO, re EP Patent Application No. 17154891.0.
(Continued)

*Primary Examiner* — Jacob T Minskey
(74) *Attorney, Agent, or Firm* — Timmer Law Group, PLLC

(57) ABSTRACT

In one aspect, there is a method of making a pre-cured laminate having a total number of plies in a mold, the mold having a periphery defined by a forward edge, an aft edge, and outboard ends. The method includes selecting a first plurality of resin impregnated plies that continuously extend beyond the periphery of the mold, the first plurality of resin impregnated plies includes at least 50 percent of the total number of plies; laying the plies in a mold; compacting the plies in a mold; and pre-curing the plies to form a pre-cured laminate, which can extend beyond the periphery of the mold. In an embodiment, a pre-cured laminate includes a first plurality of resin impregnated plies that continuously extend beyond the periphery of the mold, the first plurality of resin impregnated plies includes at least 50 percent of the total number of plies.

12 Claims, 34 Drawing Sheets

(51) Int. Cl.
*B29C 70/54* (2006.01)
*B29C 70/06* (2006.01)
*B29D 99/00* (2010.01)
*B64C 1/12* (2006.01)
*B64C 3/26* (2006.01)
*B29L 31/30* (2006.01)
*B64C 29/00* (2006.01)

(52) U.S. Cl.
CPC ...... *B29D 99/001* (2013.01); *B29C 2793/009* (2013.01); *B29L 2031/3085* (2013.01); *B32B 2250/05* (2013.01); *B32B 2605/18* (2013.01); *B64C 1/12* (2013.01); *B64C 3/26* (2013.01); *B64C 29/0033* (2013.01)

(56) References Cited

U.S. PATENT DOCUMENTS

| | | | |
|---|---|---|---|
| 4,293,276 A | 10/1981 | Brogdon et al. | |
| 5,476,627 A | 12/1995 | Black | |
| 5,479,698 A | 1/1996 | Angel | |
| 5,560,102 A | 10/1996 | Micale et al. | |
| 5,716,686 A | 2/1998 | Black | |
| 5,755,558 A | 5/1998 | Reinfelder et al. | |
| 6,170,157 B1 | 1/2001 | Munk et al. | |
| 6,314,630 B1 | 11/2001 | Munk et al. | |
| 6,625,866 B2 | 9/2003 | Stone et al. | |
| 6,682,619 B2 | 1/2004 | Cermignani et al. | |
| 6,738,564 B1 | 5/2004 | Tung | |
| 6,808,143 B2 | 10/2004 | Munk et al. | |
| 7,509,740 B2 | 3/2009 | Munk et al. | |
| 7,585,156 B2 | 9/2009 | Oldroyd | |
| 7,665,969 B2 | 2/2010 | Stamps et al. | |
| 7,721,995 B2 | 5/2010 | Tanner et al. | |
| 7,867,928 B2 | 1/2011 | Toni et al. | |
| 7,891,072 B2 | 2/2011 | Sahramaa | |
| 8,104,714 B2 | 1/2012 | Brown et al. | |
| 8,147,198 B2 | 4/2012 | Baskin | |
| 8,156,711 B2 | 4/2012 | Hethcook et al. | |
| 8,627,579 B2 | 1/2014 | Rotondi | |
| 8,695,219 B2 | 4/2014 | Munk et al. | |
| 8,997,642 B2 * | 4/2015 | Stewart | B29C 70/38 100/35 |
| 9,108,395 B2 | 8/2015 | Whitworth et al. | |
| 9,174,731 B2 | 11/2015 | Ross et al. | |
| 9,364,930 B2 | 6/2016 | Hethcock et al. | |
| 9,394,063 B2 | 7/2016 | Jackson et al. | |
| 9,427,940 B2 | 8/2016 | Bremmer et al. | |
| 9,505,491 B2 | 11/2016 | Byrnes et al. | |
| 2007/0268173 A1 | 11/2007 | Williams | |
| 2012/0021165 A1 | 1/2012 | Hethcock et al. | |
| 2012/0201683 A1 | 8/2012 | Stamps et al. | |
| 2012/0321835 A1 | 12/2012 | Hethcock et al. | |
| 2014/0109365 A1 | 4/2014 | Sutton et al. | |
| 2015/0037533 A1 | 2/2015 | Kendrick et al. | |
| 2015/0147114 A1 | 5/2015 | McCullough et al. | |
| 2017/0225769 A1 | 8/2017 | Carlson et al. | |
| 2018/0001590 A1 | 1/2018 | Carlson et al. | |

FOREIGN PATENT DOCUMENTS

| | | |
|---|---|---|
| EP | 3210882 A1 | 8/2017 |
| EP | 3210884 A1 | 8/2017 |
| JP | H06210630 | 8/1994 |
| WO | 03041939 A1 | 5/2003 |

OTHER PUBLICATIONS

European Exam Report, dated Mar. 23, 2018, by the EPO, re EP Patent Application No. 17155027.0.
European Search Report, dated Jul. 17, 2017, by the EPO, re EP Patent Application No. 17154891.0.
European Search Report, dated Jul. 20, 2017, by the EPO, re EP Patent Application No. 17155085.8.
European Exam Report, dated Mar. 1, 2018, by the EPO, re EP Patent Application No. 17155085.8.
European Search Report, completed Jul. 14, 2017, by the European Patent Office, re EP Patent App No. EP17155027.0.
Bell Helicopter; Demonstrating the Third Generation Tiltrotor; Society of Experimental Test Pilots; Oct. 25, 2014.

* cited by examiner

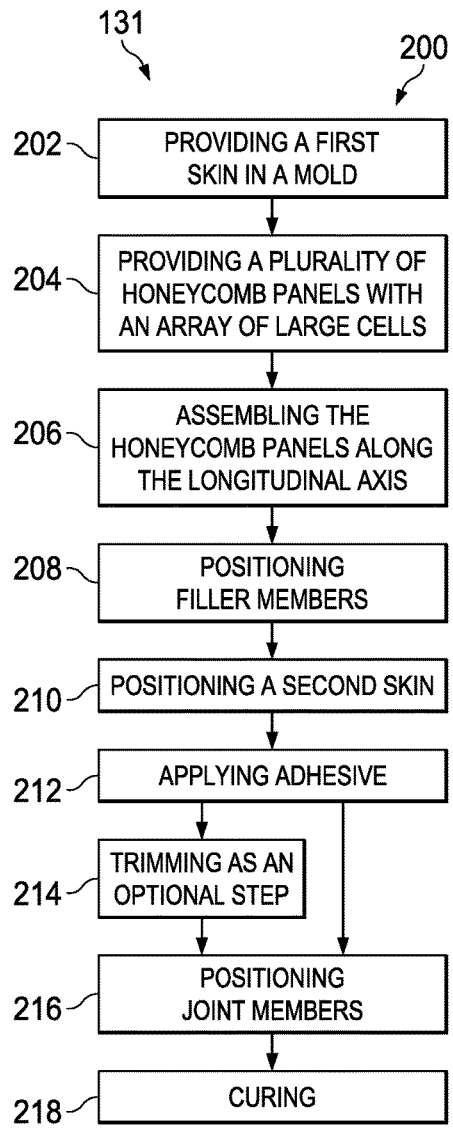
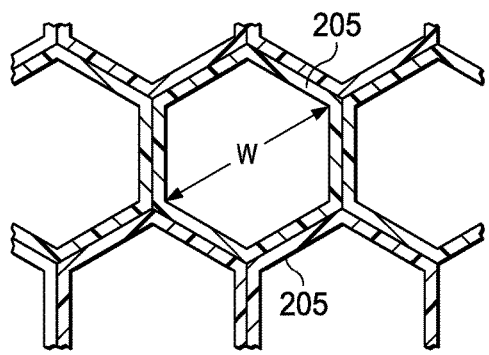
FIG. 10B
FIG. 9

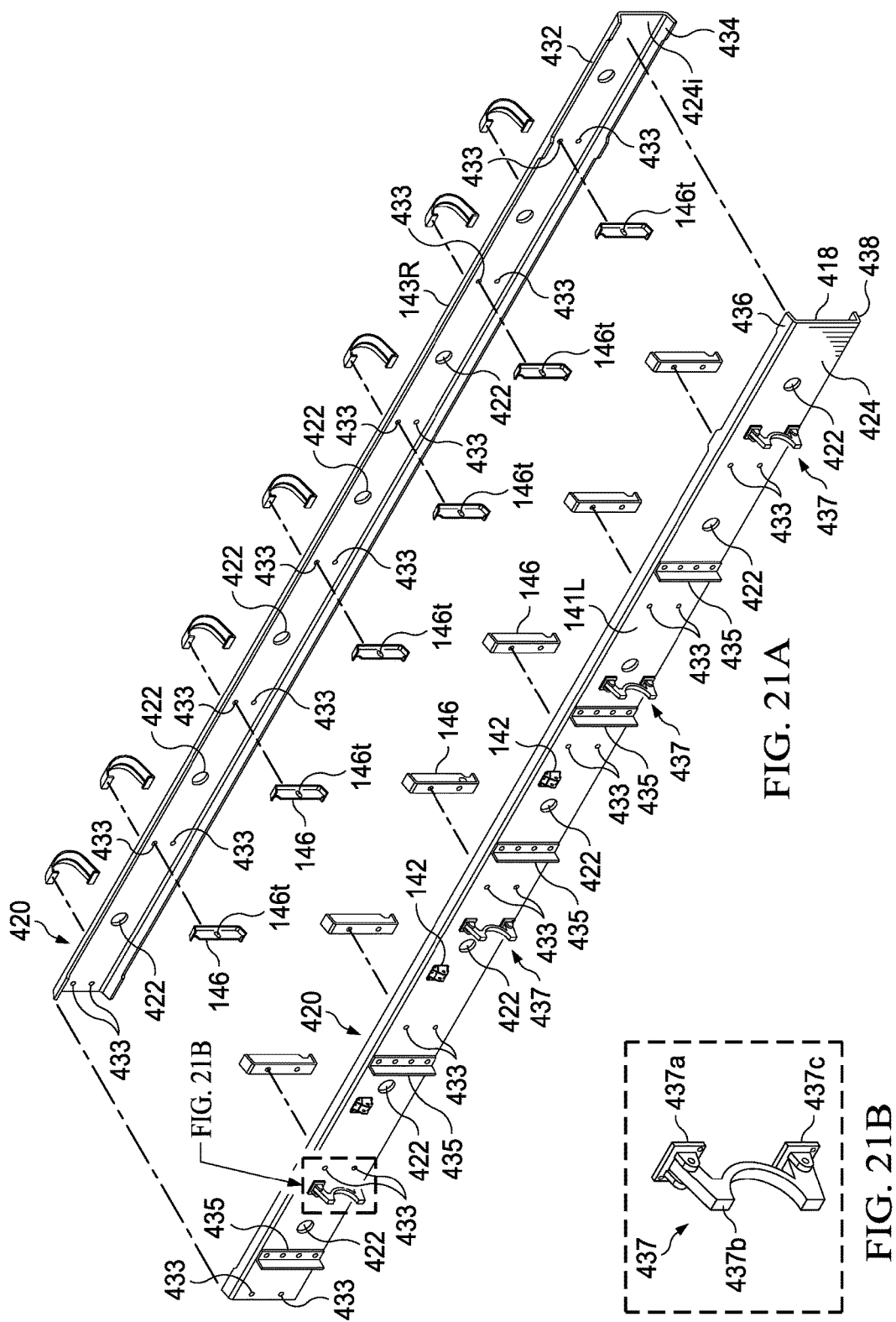

COMPOSITE WING STRUCTURE AND METHODS OF MANUFACTURE

CROSS-REFERENCE TO RELATED APPLICATIONS

This patent application claims the benefit of the filing date of U.S. Provisional Patent Application No. 62/292,673, filed Feb. 8, 2016, which is hereby incorporated by reference.

BACKGROUND

Field of the Invention:

The present disclosure relates, in general, to skins for an aircraft, and in particular, to skins for a tiltrotor aircraft wing.

Description of Related Art:

Modern aircraft are manufactured from a wide variety of materials, including steel, aluminum, and a wide variety of composite materials. Most structural components are made from strong, rigid materials. However, in order to conserve weight, the structural components are often made from a thin layer of metal or composite that includes reinforcement strips of material reinforced with stringers.

Tiltrotor aircraft have complicated proprotor assemblies located at opposing wing tips that operate between a helicopter mode to take off, hover, fly, and land like a conventional helicopter; and an airplane mode. The proprotor assemblies are oriented vertically for a helicopter mode and horizontally for airplane mode. Because the tiltrotor aircraft must operate in both helicopter mode and airplane mode, and operate while transitioning between the two, the wing structure must support the weight of the proprotor assemblies, withstand the forces generated from the proprotor assemblies in a variety of modes, and provide a lifting force sufficient to lift the weight of the aircraft.

FIG. 1 is a partial view of an exemplary prior art tiltrotor wing 10 including a torque box structure 30. The torque box structure 30 includes skins 20, forward spar 32, and aft spar 34. The skins 20 includes stringers 12 extending generally parallel to the longitudinal axis of the wing 10. The upper skin 22 requires five stringers 12 and the lower skin 24 requires four stringers 12. The stringers 12 provide stiffness and support to the skin 20 and are each an I-beam shaped stiffener as shown in FIG. 2 connected to the interior surface 20a of the skin 20. The stiffeners 12 are made from a composite material and extend the depth of the skin 20 assembly into the interior of the wing 10 thereby reducing the space available for fuel and other internal systems.

The skin 20 is constructed of many of layers or "plies" of composite materials including hundreds of reinforcement strips 28 or "postage stamps" made of various types, sizes, orientations, and thicknesses of materials. The reinforcement strips 28 are made of graduated sizes of postage stamp stamps that have been compacted together as shown in FIG. 2. The reinforcement strips 28 are located below the stringer 12: (1) to provide support for the skin 20 against catastrophic buckling; (2) to maintain shape and contour of the skin 20; (3) to provide stiffness at the stringer load points; and (4) to distribute pressure into the skin.

During manufacture of the skin 20 each of the reinforcement strips 28 is cut, labeled, and positioned in a mold, which is an extremely time-consuming and laborious process. When the size and shape of a reinforcement strip 28 is used repeatedly, a problem results in that the reinforcement strips 28 are pre-cut and stored in a controlled atmosphere environment and must be identified and thawed by a user each time a reinforcement strip is needed for a composite.

The stringers 12 are connected to the torque box structure 30 using rivets or other suitable means. The torque box structure 30 further includes lower supports 36, and upper supports 38. The lower and upper supports 36, 38 provide horizontal structural strength to the forward and aft spars 32, 34 and to the respective upper and lower skins 22, 24. The lower and upper supports 36, 38 are stiffening elements to keep the rib from buckling and act as a doubler around an access hole through the rib. The lower and upper supports 36, 38 are individual manufactured composite parts that are mechanically fastened during the rib install, which increases the part count and time for assembly of the overall wing structure. As shown in FIG. 1, the torque box structure 30 includes multiple internal supports that reduces the space available for fuel and other internal systems.

The assembly of the torque box structure 30 is very complex, often with very tight tolerances required. The installation of the fasteners to the skins 20 and other structural components is also difficult because there is limited access to small interior spaces and complicated sealing requirements. Moreover, a large number of fasteners is required for each wing 10, which can cause the structures to warp and dimensional growth during assembly. Once the structural members are assembled, over a hundred foam details are positioned between the structural members in the fuel bays to provide a smooth, ramped surface for the fuel components housed therein. The assembly of the torque box 30 is time consuming and extremely labor intensive at each of the various stages of manufacture (manufacture of the composites, sub-assembly, installation stages).

The wing structure in FIGS. 1 and 2 is a cross-sectional view of a prior art tiltrotor swept, dihedral wing that concentrates loads at the outboard ends and inboard ends adjacent to the fuselage; which requires structural reinforcement in those areas to withstand twisting and torsional forces during the various flight modes. The front spar requires three spars and the back requires five spars along with tip spars to provide sufficient structural strength for the swept, dihedral wing.

Accordingly, the need has arisen for an improved wing structure, assembled components, and methods for manufacture thereof for use on a tiltrotor aircraft that addresses one or more of the foregoing issues.

SUMMARY

In a first aspect, there is provided a method of making a pre-cured laminate having a total number of plies in a mold, the mold having a periphery defined by a forward edge, an aft edge, and outboard ends. The method includes selecting a first plurality of resin impregnated plies that continuously extend beyond the periphery of the mold, the first plurality of resin impregnated plies comprises at least 50 percent of the total number of plies; laying the first plurality of resin impregnated plies in a mold to form a portion of the total number of plies; compacting the total number of plies in a mold; and pre-curing the total number of plies to form a pre-cured laminate, which can extend beyond the periphery of the mold.

In an embodiment, the first plurality of resin impregnated plies includes from about 50 percent to about 90 percent of the total number of plies.

An embodiment further provides the step of selecting a second plurality of resin impregnated plies that do not extend beyond the forward edge and continuously extend beyond the aft edge; and laying the second plurality of plies in the mold to form a portion of the total number of plies.

In an embodiment, the second plurality of resin impregnated plies includes from about 15 percent to about 25 percent of the total number of plies.

An embodiment provides selecting a third plurality of resin impregnated plies that do not extend beyond the aft edge and continuously extend beyond the forward edge; and laying the third plurality of plies in the mold to form a portion of the total number of plies.

In one embodiment, the third plurality of resin impregnated plies includes from about 15 percent to about 25 percent of the total number of plies.

In yet another embodiment, a portion of the third plurality of plies do not extend beyond the outboard ends.

An embodiment can include selecting a fourth plurality of resin impregnated plies that do not extend beyond the outboard ends and continuously extend beyond the forward and aft edges; and laying the fourth plurality of plies in the mold to form a portion of the total number of plies.

In an embodiment, the fourth plurality of resin impregnated plies includes from about 5 percent to about 50 percent of the total number of plies.

An embodiment further includes trimming the pre-cured laminate such that the pre-cured laminate is reduced to the periphery of the mold.

In an embodiment, the total number of plies is from about 8 plies to about 100 plies.

In another embodiment, the resin impregnated plies are made from a fiber including one or more of the following: glass, carbon, graphite, basalt, and aramid.

In yet another embodiment, the resin impregnated plies comprise at least one of a woven fabric and a tape.

In a second aspect, there is provided a pre-cured laminate having a total number of plies formed in a mold, the mold having a periphery defined by a forward edge, an aft edge, and outboard ends. The pre-cured laminate includes a first plurality of resin impregnated plies that continuously extend beyond the periphery of the mold, the first plurality of resin impregnated plies comprises at least 50 percent of the total number of plies.

In an embodiment, the first plurality of resin impregnated plies comprises from about 50 percent to about 90 percent of the total number of plies.

In yet another embodiment, there is provided a second plurality of resin impregnated plies that do not extend beyond the forward edge and continuously extend beyond the aft edge, the second plurality of resin impregnated plies comprises from about 15 percent to about 25 percent of the total number of plies.

An embodiment provides a third plurality of resin impregnated plies that do not extend beyond the aft edge and continuously extend beyond the forward edge; the third plurality of resin impregnated plies comprises from about 15 percent to about 25 percent of the total number of plies.

In one embodiment, there is a portion of the third plurality of plies do not extend beyond the outboard end and comprises from about 3 percent to about 7 percent of the total number of plies.

In yet another embodiment, there is provided a fourth plurality of resin impregnated plies that do not extend beyond the outboard ends and continuously extend beyond the forward and aft edges; the fourth plurality of resin impregnated plies comprise from about 5 percent to about 50 percent of the total number of plies.

In an embodiment, the pre-cured laminate has a total number of plies from about 8 plies to about 100 plies.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE DRAWINGS

The novel features believed characteristic of the embodiments of the present disclosure are set forth in the appended claims. However, the embodiments themselves, as well as a preferred mode of use, and further objectives and advantages thereof, will best be understood by reference to the following detailed description when read in conjunction with the accompanying drawings, wherein:

FIG. 9 is a flow diagram of a method of manufacturing a composite, according to an exemplary embodiment;

FIG. 10B is a top view of a portion of a honeycomb core for a composite skin, according to an exemplary embodiment;

FIG. 21A is an exploded view of a spar assembly, according to an exemplary embodiment;

FIG. 21B is a perspective view of a clevis, according to an exemplary embodiment;

DESCRIPTION OF THE PREFERRED EMBODIMENT

Illustrative embodiments of the apparatus and method are described below. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 3:
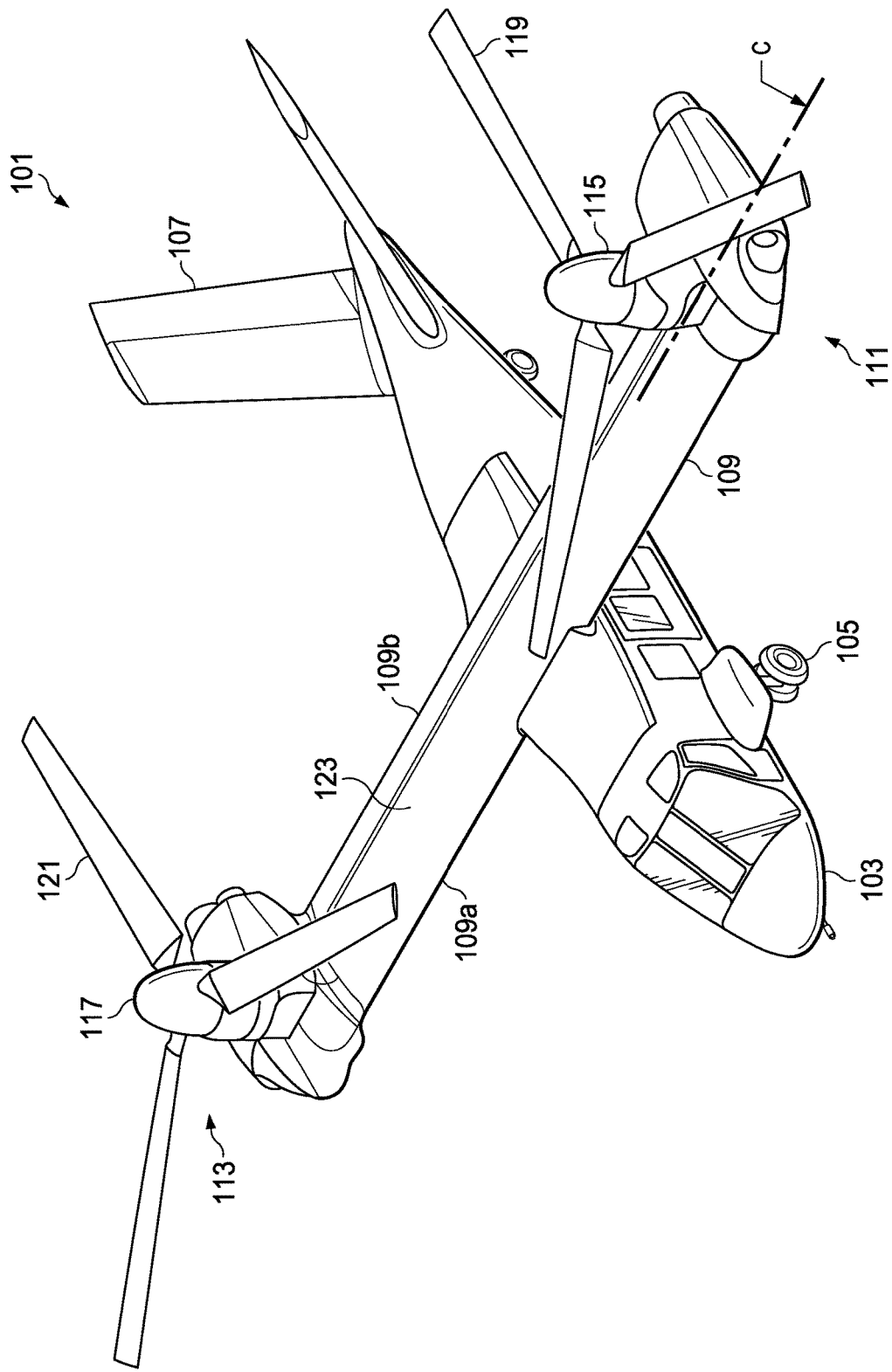
FIG. 3 is a perspective view of a tiltrotor aircraft in helicopter mode, according to one example embodiment.
Figure 4:
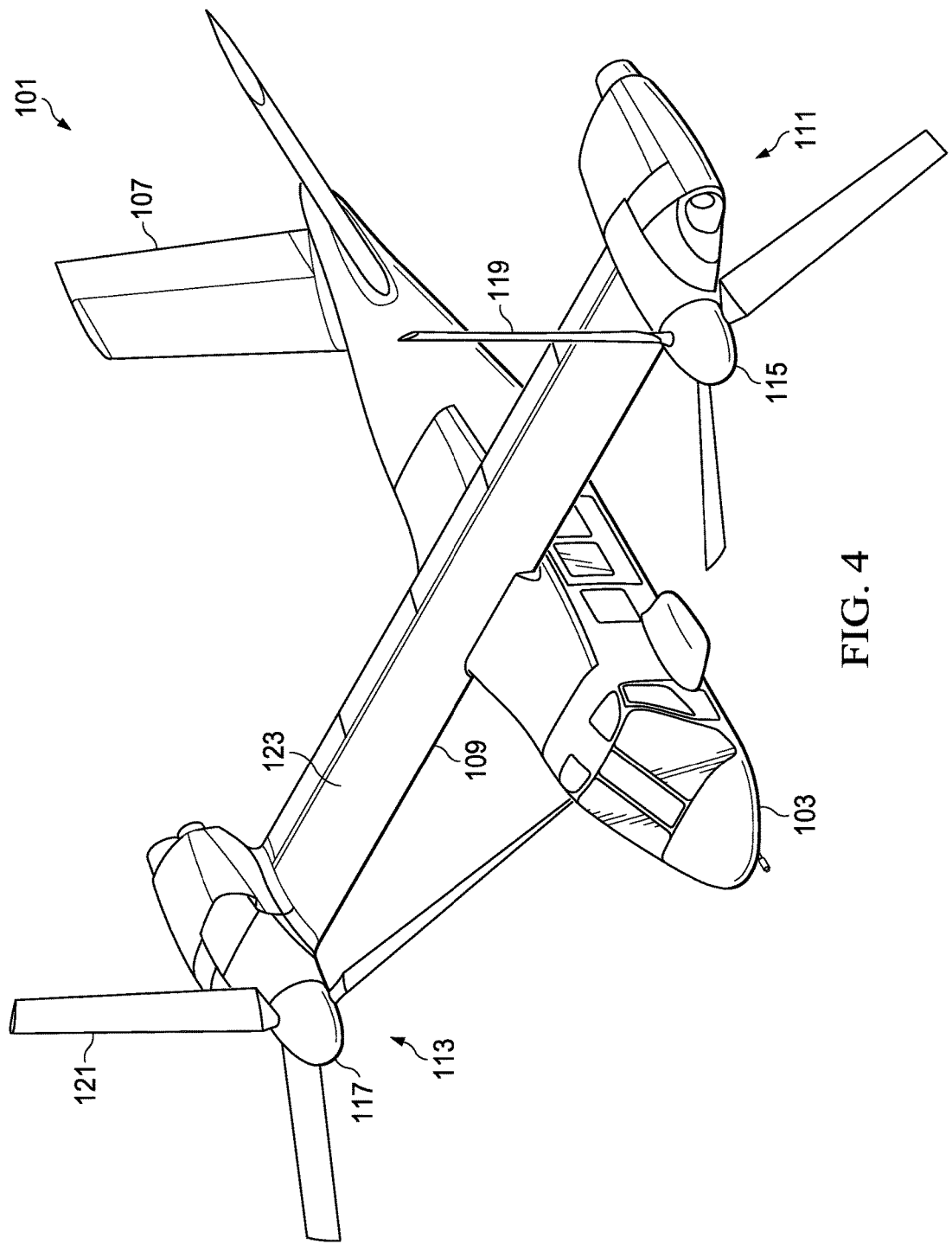
FIG. 4 is a perspective view of a tiltrotor aircraft in airplane mode, according to one example embodiment.

Referring to FIGS. 3 and 4, a tiltrotor aircraft 101 is illustrated. Tiltrotor aircraft 101 can include a fuselage 103, a landing gear 105, a tail member 107, a wing 109, a propulsion system 111, and a propulsion system 113. Each propulsion system 111, 113 includes a fixed engine and a rotatable proprotor 115, 117, respectively. Each rotatable proprotor 115, 117 have a plurality of rotor blades 119, 121, respectively, associated therewith. The position of proprotors 115, 117, as well as the pitch of rotor blades 119, 121, can be selectively controlled in order to selectively control direction, thrust, and lift of tiltrotor aircraft 101.

FIG. 3 illustrates tiltrotor aircraft 101 in helicopter mode, in which proprotors 115 and 117 are positioned substantially vertical to provide a lifting thrust. FIG. 4 illustrates tiltrotor aircraft 101 in an airplane mode, in which proprotors 115, 117 are positioned substantially horizontal to provide a forward thrust in which a lifting force is supplied by wing 109. It should be appreciated that tiltrotor aircraft can be operated such that proprotors 115, 117 are selectively positioned between airplane mode and helicopter mode, which can be referred to as a conversion mode.

The proprotors 115 and 117 rotate from a conversion axis C located above an upper wing skin 123. An advantage of locating the conversion axis C of the proprotors 115 and 117 above the upper wing skin 123 is that the fore/aft location of the proprotors 115 and 117 can be moved to shift the center of gravity of the aircraft in the various flight modes as described by U.S. Pat. No. 9,174,731, issued Nov. 3, 2015, which is hereby incorporated by reference in its entirety. As such, locating the conversion axis of the proprotors 115 and 117 above the upper wing skin 123 allows the fore/aft location of the proprotors 115 and 117 to be optimized for the center of lift in a particular flight mode.

The aircraft 101 has a maximum range further than a conventional tiltrotor aircraft (wing shown in FIGS. 1 and 2) achieved at least in part by the wing structure described herein. The wing structure 109 provides structural support for the propulsion systems 111, 113 and fuselage 103 and lifting force sufficient to lift the weight of the aircraft 101. The wing structure 109 is configured to distribute loads and the shearing motion generated by the propulsion systems 111, 113 during the various flight modes. The improved structural support of the wing member 109 also provides fuel bays having no I-beam projections on the fuel supporting surfaces, which provides more space in the fuel bay for fuel capacity.

Figure 5:
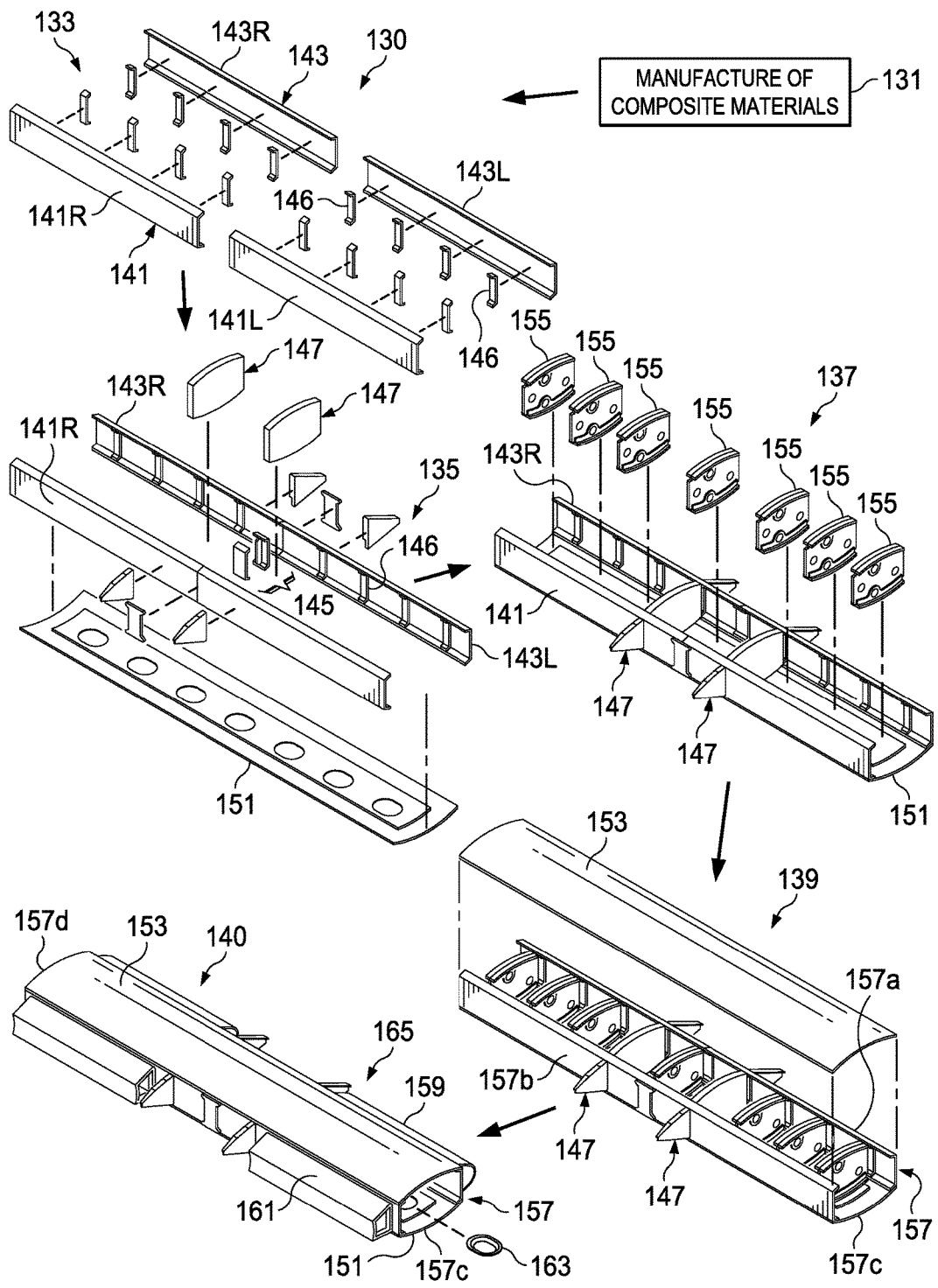
FIG. 5 is a top level schematic view diagram of a method of manufacturing a tiltrotor wing structure, according to an exemplary embodiment.

The method for manufacture 130 of a tiltrotor wing structure 109 will first be briefly summarized with reference to FIG. 5, illustrating the major process steps. After this brief overview, the separate steps, components, sub-assembled parts included in the method for manufacture 130 will be explained in detail.

FIG. 5 illustrates a method for manufacture 130 of a tiltrotor wing structure 109. The method begins with the manufacture of composite materials for the various assembled components in step 131, shown in FIGS. 6-10B, 19, and 20A-20C, including, but not limited to, an aft spar assembly 141, a forward spar assembly 143, a lower composite skin assembly 151, an upper composite skin assembly 153, and a plurality of rib assemblies 155. A plurality of cured composite spar members 141R, 141L, 143R, 143L are sub-assembled along with engagement members 145, rib posts 146, and other components to form the aft spar assembly 141 and forward aft spar assembly 143 in steps 133 and 135. In an embodiment, the rib posts 146 are assembled onto an interior surface of the aft and forward spar assemblies 141, 143. Next, the components for the anchor assemblies 147 and the lower skin assembly 151 are installed onto the aft and forward spar assemblies 141, 143 in step 135. A plurality of rib assemblies 155 are installed between the aft and forward spar assemblies 141, 143 and the upper skin composite assembly 153 installed thereon in steps 137, 139 to form a torque box assembly 157. A leading edge assembly 159, a cove edge assembly 161, and a plurality of fuel covers 163 are installed on the torque box assembly 157 in step 140 to form the wing structure 165 for a tiltrotor aircraft 101.

Further, the methods of manufacture, composites, sub-assemblies, and installed components described herein are illustrated in the context of tiltrotor aircraft 101; however, the methods of manufacture, composites, sub-assemblies, and installed components can be implemented on other aircraft and aircraft components; for example, and not limitation, fuselage, tail member, aircraft walls, and aircraft floors for unmanned and manned aircraft.

Figure 6:
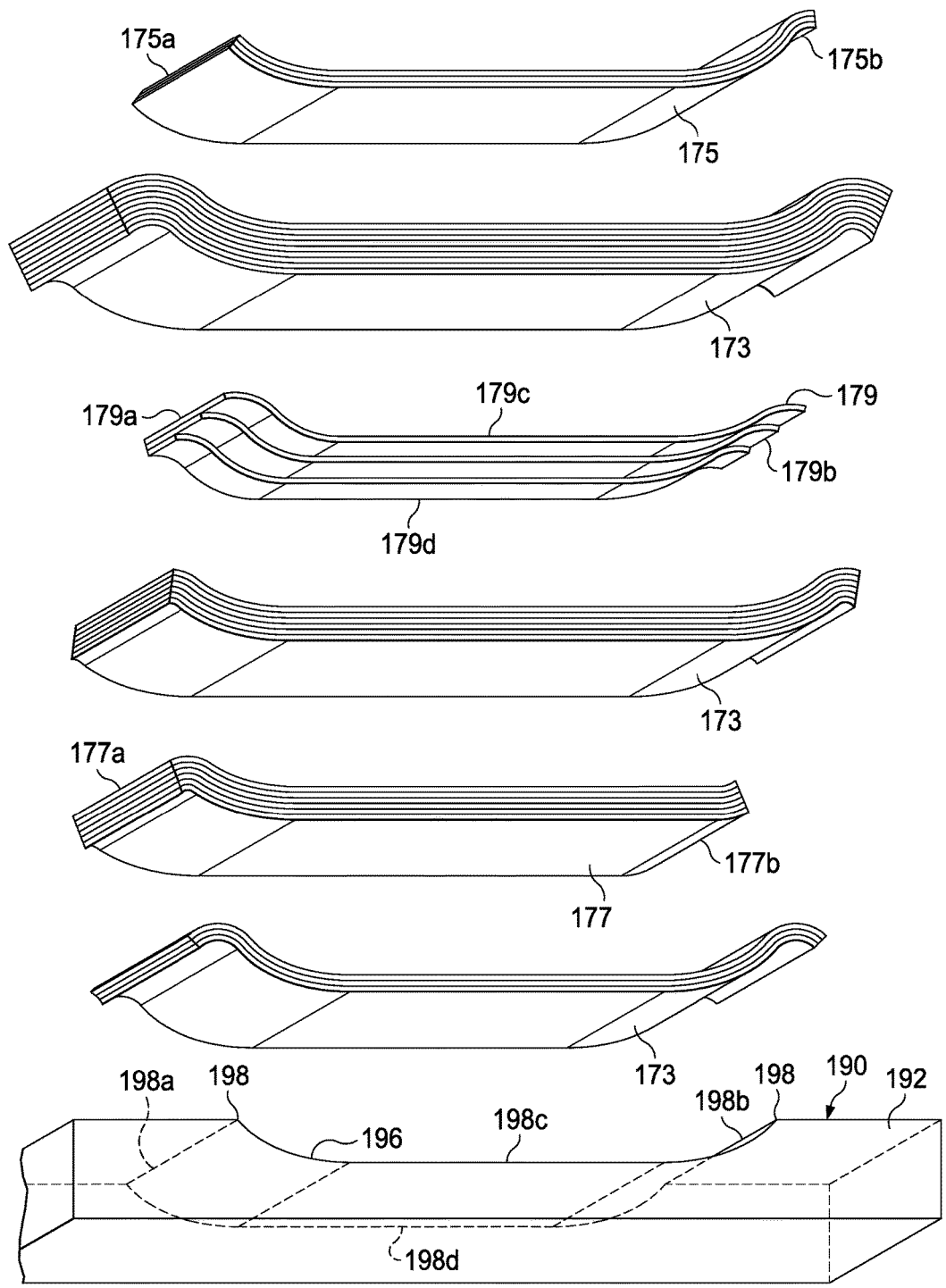
FIG. 6 is an exploded schematic view of a composite lay-up used in the construction of the composite skin, according to an exemplary embodiment.
Figure 7:
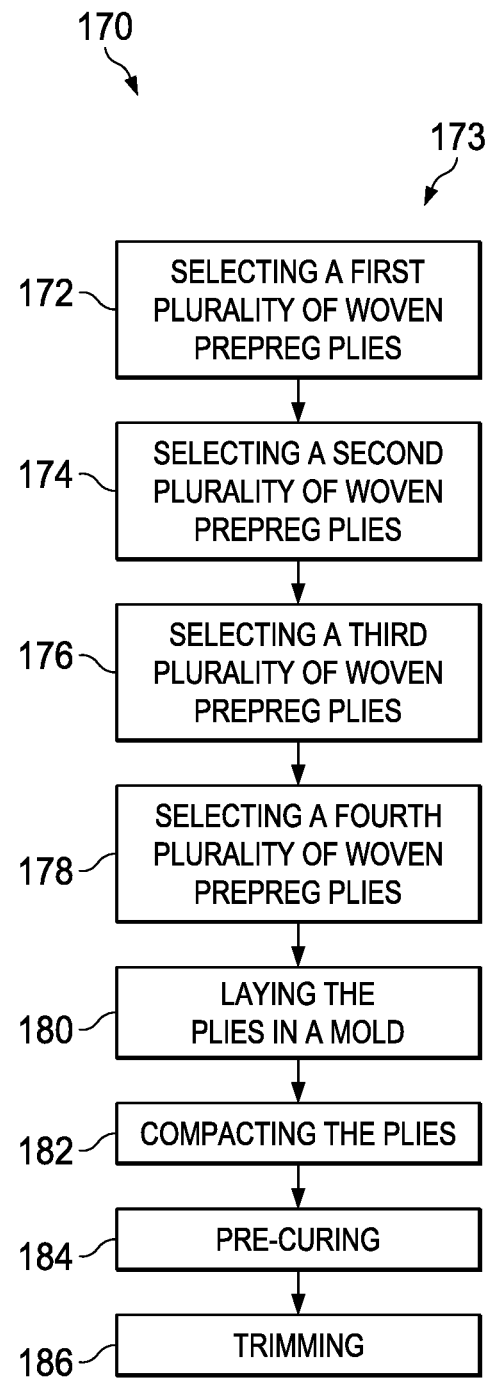
FIG. 7 is a flow diagram of a method of manufacturing a composite, according to an exemplary embodiment.

The manufacture of composite materials for various assembled components in step 131 can include a method of making a pre-cured laminate in a mold 170 shown in FIGS. 6 and 7. An exemplary mold 190 is illustrated in FIG. 6 includes a first member 192. The first member 192 includes a cavity 196 formed therein having a periphery 198 defined by a forward edge 198a, aft edge 198b, and outboard ends 198c, 198d. It should be appreciated that mold 190 may be divided up into any number of separate members and can have second, third, or more members. Cavity 196 represents the desired geometry of a laminate; for example, and not limitation, the laminate can be a lower skin, an upper skin, a spar, a floor, a rib web, and a fuselage for an aircraft.

A step 172 of method 170 includes selecting a first plurality of resin impregnated plies that continuously extend beyond the periphery 198 of the mold, the first plurality of resin impregnated plies 173 includes at least 50 percent (e.g., 51, 52, 53, 54, 55, 56, 57, 58, or 59 percent more) of the total number of plies. In an embodiment, the first plurality of resin impregnated plies 173 is from about 50 percent to about 90 percent of the total number of plies. In another embodiment, the first plurality of resin impregnated plies 173 is from about 52 percent to about 80 percent of the total number of plies. In another embodiment, the first plurality of woven 173 resin impregnated plies is from about 54 percent to about 75 percent of the total number of plies. The first plurality of resin impregnated plies 173 is configured to provide a plurality of reinforcing ply layers that extends beyond the perimeter 198 of the cavity 196 to assist in reinforcing the overall stiffness and strength of the laminate. In an embodiment, the operator unrolls a full width ply using a straight edge on one side of the mold 190 to insure proper orientation of the ply is made.

A step 174 of method 170 includes selecting a second plurality of resin impregnated plies 175 that do not extend beyond the forward edge 198a and continuously extend beyond the aft edge 198b. In an embodiment, the second plurality of resin impregnated plies 175 is from about 15 percent to about 25 percent of the total number of plies. The second plurality of resin impregnated plies 175 can provide stiffness and strength generally along the aft edge of a pre-cured laminate.

A step 176 of method 170 includes selecting a third plurality of resin impregnated plies 177 that do not extend beyond the aft edge 198b and continuously extend beyond the forward edge 198a. In an embodiment, the third plurality of resin impregnated plies 177 is from about 15 percent to about 25 percent of the total number of plies. The third plurality of resin impregnated plies 177 can provide stiffness and strength along the forward edge of a pre-cured laminate.

In another embodiment, a portion of the third plurality of resin impregnated plies 177 do not extend beyond the outboards edges 198c, 198d of the cavity 196 in the first mold member 192. The portion of the third plurality of resin impregnated plies 177 that do not extend beyond the outboard edges 198c, 198d can be from about 3 percent to about 7 percent of the total number of plies. The portion of the third plurality of resin impregnated plies 177 that do not extend beyond the outboard edges 198c, 198d can provide stiffness and strength generally along the central portion of the forward edge in a pre-cured laminate.

A step 178 of method 170 includes selecting a fourth plurality of resin impregnated plies 179 that do not extend beyond the outboard ends 198c, 198d and continuously extend beyond the forward and aft edges 198a, 198b. In an embodiment, the fourth plurality of resin impregnated plies 179 is from about 5 percent to about 50 percent of the total number of plies. The fourth plurality of resin impregnated plies 179 can provide stiffness and strength generally along the central portion of a pre-cured laminate.

In an embodiment for a laminate for a wing skin, the fourth plurality of resin impregnated plies 179 includes from about 5 percent to about 15 percent of the total number of plies. In another embodiment for a laminate for a wing skin, the fourth plurality of resin impregnated plies 179 is from about 45 percent to about 50 percent of the total number of plies.

The plies can be at least one of a fabric and a tape. In one embodiment, the plies are pre-impregnated with an un-cured resin. The resin can be applied to a conventional paper liner and transferred to the ply or applied directly to the ply and then heated to melt and infuse the resin therein. Prior to layup in a mold, a portion of the conventional liner can be removed and a detection liner can be applied to one or more of the sides of a resin impregnated ply, which can assist manufacturing techniques. The plies can be made from a fiber that is composed of continuous filaments or fibers including one or more of glass, carbon, graphite, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. However, the continuous filaments or fibers described herein can include any suitable material or combination of materials. The resin can be a polymeric matrix or any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like. In an embodiment, the fabric is a woven fabric. In another embodiment, the tape is a unidirectional tape.

In an embodiment, the plies can be an intermediate modulus epoxy resin impregnated carbon fiber fabric. The intermediate modulus epoxy impregnated carbon fiber fabric can be stiffer than conventional composite fabrics which allows for fewer plies, which reduces the weight and manufacturing cost, while the epoxy resin system can provide tolerance to damage.

It should be appreciated that even though the method 170 is described with resin impregnated plies, other composite manufacturing process may be used. For example, a resin transfer molding process, which involves fabric layers, without being impregnated without resin, being placed in a selected pattern within a mold. Further, resin is transferred into the mold such that the fibers and resin are combined, and then cured. The resin transfer molding process is an exemplary variation of a composite manufacturing process that is compatible with the embodiments disclosed herein. For example, in an embodiment of step 172 the first plurality of plies 173 can be plies that undergo a resin transfer molding process to inject resin into the fabric or tape laid in the cavity 196. The first plurality of plies 173 are at least one of fabric and tape plies that continuously extend beyond the periphery 198 of the mold 190 and are injected with a resin while positioned in the mold 190.

Each fabric ply is considered a ply or layer in the total number of plies for a laminate. In an embodiment, the total number of plies is from about 8 plies to about 100 plies for a composite article; for example, and not limitation, an exterior layer in an aircraft skin. In yet another embodiment, the total number of plies is from about 20 plies to about 60 plies for a composite article; for example, and not limitation, a layer in an aircraft skin and a spar. In still another embodiment, the total number of plies is from about 40 plies to about 60 plies. In another embodiment, the total number of plies is from about 20 plies to about 30 plies. In an embodiment, the total number of plies is from about 10 plies to about 20 plies. In an illustrative embodiment shown in FIG. 6, the total number of plies is the total plies of first plurality of plies 173, the second plurality of plies 175, the third plurality of plies 177, and the fourth plurality of plies 179.

A step 180 of method 170 includes laying down the plies in the mold 190. The step 180 can include smoothing the plies to remove any pockets of air. In an embodiment, each fabric ply is positioned against a fence or tool detail located beyond the periphery 198 to ensure that the ply is in proper alignment in the mold 190.

The plies can be oriented at various patterns of orientation as needed for the particular laminate being formed. The plies of first plurality of resin impregnated plies 173 are laid down one at a time in the cavity 196 of the first mold member 192 such that each ply continuously extends in the cavity 196 and beyond the perimeter 198 of mold 190.

The plies of the second plurality of resin impregnated plies 175 are laid down one at a time in the cavity 196 of the first mold member 192 so that each ply extends beyond the aft edge 198b and does not extend beyond the forward edge 198a, as shown in FIG. 6. Each forward edge 175a of the second plurality of resin impregnated plies 175 is positioned inside of the forward edge 198a of the cavity 196 in the first mold member 192 while the aft edge 175b of the second plurality of the plies extends beyond the aft edge 198b of the cavity 196.

The plies of the third plurality of resin impregnated plies 177 are laid down one at a time in the cavity 196 of the first mold 192 so that each of the plies extends beyond the forward edge 198a and does not extend beyond the aft edge 198b. Each aft edge 177b of the third plurality of resin impregnated plies 177 is positioned inside of the aft edge 198b of the cavity 196 in the first mold member 192 while the forward edge 177a of the second plurality of the plies extends beyond the forward edge 198a of the cavity 196.

The plies of the fourth plurality of resin impregnated plies 179 are laid down one at time in an area over the cavity 196 of the first mold 192 so that each of the plies does not extend beyond the outboard ends 198c, 198d and extend beyond the forward and aft edges 198a, 198b. Each of the outboard ends 179c, 179d of the fourth plurality of resin impregnated plies is positioned inside of the outboard ends 198c, 198d of the cavity 196 in the first mold member 192 while the forward and aft edges 179a, 179b of the plies extend beyond the forward and aft edges 198a, 198b, respectively.

A step 182 of method 170 includes compacting the plies to provide adequate attachment between the plies. The compacting step can be achieved by applying a vacuum to the plies in the mold or by pressing a second mold member on the plies disposed in the cavity 196. After the plies are compacted, the plies are cured in step 184 to form a pre-cured laminate that extends beyond the periphery 198 of the mold 190. The curing step can include heating the plies for two hours at 350 degrees Fahrenheit at 90 psi.

A step 186 of method 170 can include trimming the pre-cured laminate so that the pre-cured laminate is reduced to at least the periphery of the mold.

Figure 8:
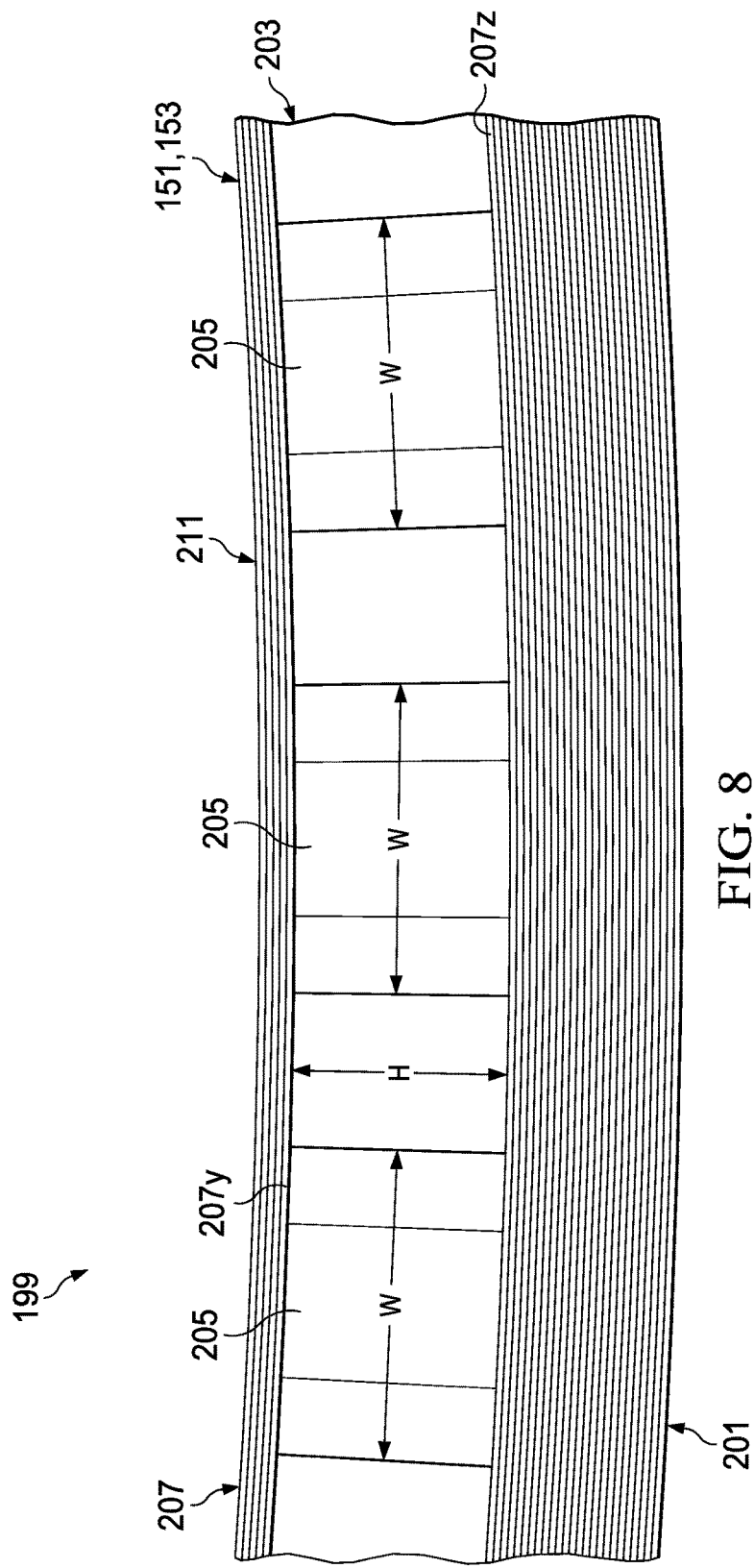
FIG. 8 is an enlarged, cross-sectional view of a portion of a composite skin, according to an exemplary embodiment.

An embodiment provides a pre-cured laminate, which can be a first skin 201 or a second skin 211 shown in FIG. 8, having a total number of plies that includes the first plurality of resin impregnated plies 173 that continuously extend beyond the periphery 198 of the mold 190 and comprise at least 50 percent of the total number of plies. In an embodiment, the first plurality of resin impregnated plies 173 comprises from about 50 percent to about 90 percent of the total number of plies.

In still another embodiment, the pre-cured laminate can include the first plurality of resin impregnated plies 173 from about 10 percent to about 50 percent of the total number of plies. In yet another embodiment, the pre-cured laminate can include the first plurality of resin impregnated plies 173 from about 15 percent to about 40 percent of the total number of plies. In yet another embodiment, the pre-cured laminate can include the first plurality of resin impregnated plies 173 from about 30 percent to about 45 percent of the total number of plies. In one embodiment, the pre-cured laminate can include the first plurality of resin impregnated plies 173 from about 5 percent to about 15 percent of the total number of plies.

In an embodiment, the pre-cured laminate further includes the second plurality of resin impregnated plies 175 that do not extend beyond the forward edge 198a and continuously extend beyond the aft edge 198b. The second plurality of resin impregnated plies 175 can be from about 15 percent to about 25 percent of the total number of plies.

In one embodiment, the pre-cured laminate includes the third plurality of resin impregnated plies 177 that do not extend beyond the aft edge 198b and continuously extend beyond the forward edge 198a. The third plurality of resin impregnated plies 177 can be from about 15 percent to about 25 percent of the total number of plies.

In yet another embodiment, there is a portion of the third plurality of plies 177 that do not extend beyond the outboard end and comprises from about 3 percent to about 7 percent of the total number of plies.

In another embodiment, the pre-cured laminate includes the fourth plurality of resin impregnated plies 179 that do not extend beyond the outboard ends 198c, 198d and continuously extend beyond the forward and aft edges 198a, 198b. The fourth plurality of resin impregnated plies 179 can be from about 5 percent to about 50 percent of the total number of plies.

In an embodiment, the total number of plies in the pre-cured laminate is from about 8 plies to about 100 plies for a composite article. In yet another embodiment, the total number of plies in the pre-cured laminate is from about 20 plies to about 60 plies. In still another embodiment, the total number of plies in the pre-cured laminate is from about 40 plies to about 60 plies. In another embodiment, the total number of plies in the pre-cured laminate is from about 20 plies to about 30 plies. In an embodiment, the total number of plies in the pre-cured laminate is from about 10 plies to about 20 plies. In an illustrative embodiment shown in FIG. 6, the total number of plies in the pre-cured laminate is the total plies of first plurality of plies 173, the second plurality of plies 175, the third plurality of plies 177, and the fourth plurality of plies 179.

Figure 2:
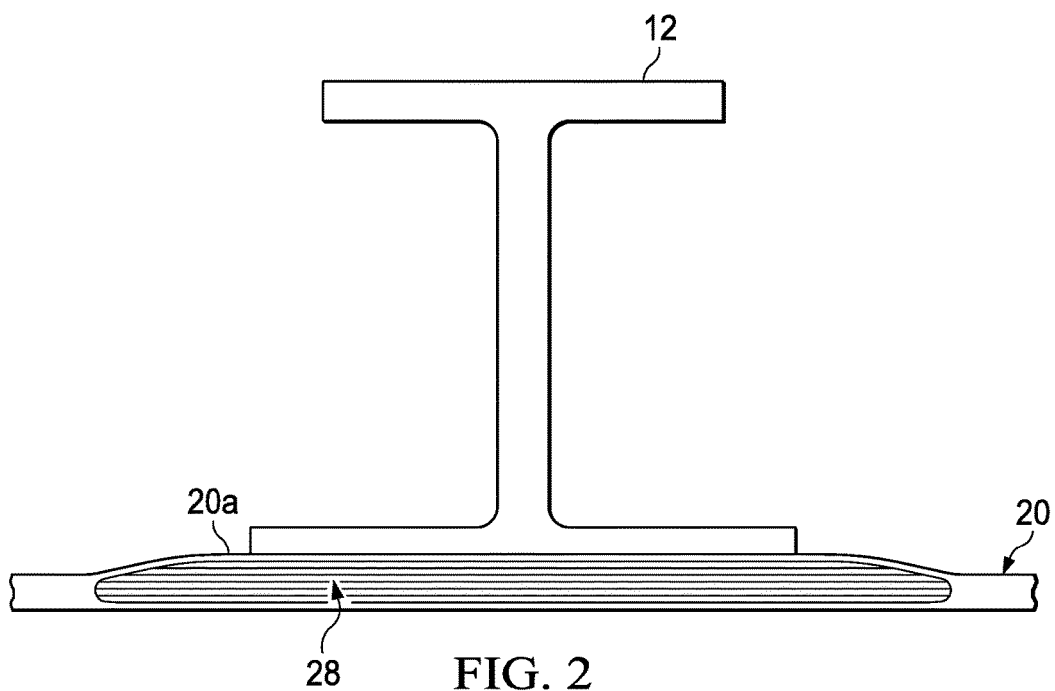
FIG. 2 is a cross-sectional view of a stringer and skin in the prior art tiltrotor wing shown in FIG. 1.

The method 170 and resulting pre-cured laminate can advantageously provide at least one of the following benefits: plies that cover a larger acreage of a near constant constant-section part, as opposed to placing a constantly varying amount of material and sizes of material down around highly tailored features as shown in the prior art FIG. 2; automatic tape lay and fiber placement machines are not required, which reduces capital costs and material application rates; and a greatly reduced total ply count and part count as compared to the prior art in FIG. 2.

The manufacture of composite materials for various assembled components in step 131 can include a method of making a composite skin 199 for a torque box 157 of a tiltrotor aircraft 200 shown in FIGS. 8, 9, 10A, 10B. The torque box 157, shown in FIG. 5, has a periphery defined by a forward edge 157a, an aft edge 157b, and outboard ends 157c, 157d. In an embodiment, the composite skin 199 is used to manufacture a composite skin assembly 150, which can be an upper composite skin assembly 151 and the lower composite skin assembly 153.

Figure 10A:
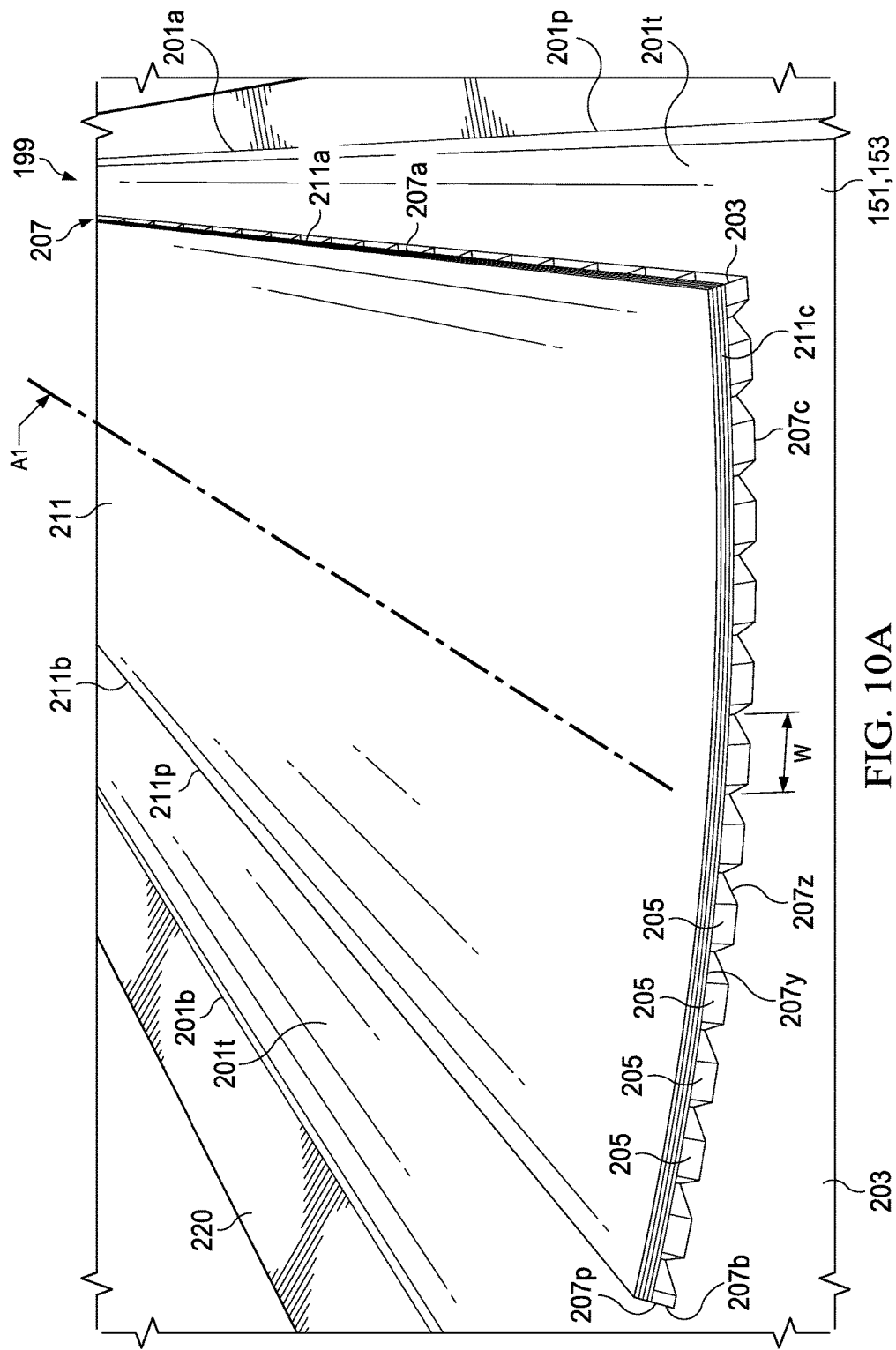
FIG. 10A is a perspective view of an illustrative embodiment of a composite skin, according to an exemplary embodiment.

A step 202 in the method 200 includes providing a first skin 201 in a mold 220. The first skin 201 having a periphery 201p defined by a forward edge 201a, an aft edge 201b, and outboard ends 201c, 20d. In an embodiment, the periphery 201p of the first skin 201 can generally align with the periphery of the torque box 157. In an embodiment, the first skin 201 can be a pre-cured laminate having a total number of plies that is less than or equal to 70 plies, trimmed to connect with an outer perimeter of a torque box 157, and positioned onto a surface of the mold 220, as shown in FIG. 10A. In an embodiment, the first skin 201 is a pre-cured laminate having from about 40 plies to about 60 plies.

A step 204 in the method 200 includes providing a plurality of honeycomb panels 203 having an array of large cells 205 onto the first skin 201. In an embodiment, each of the honeycomb panels 203 is a panel of large cell honeycomb. The term "honeycomb" means a material comprising a plurality of interconnected cell walls that define a plurality of cells. While many honeycomb materials define hexagonal cells, the scope of the present application encompasses materials that define cells of other shapes, such as square, rectangular, and the like. The term "large cell", for the purposes of this disclosure, means that each cell 205 has a width W of at least 1 cm. In another embodiment, the width W of the large cells is from about 1 cm to about 3 cm. In yet another embodiment, the width W of the large cells is from about 1.5 cm to about 2.5 cm. In an embodiment, the height H of the honeycomb panels 203 is at least 1 cm. In another embodiment, the height H of the honeycomb panels 203 is from 0.5 cm to 4 cm.

It should be appreciated that honeycomb panels 203 can be of a variety of materials, including but not limited to, composite materials and metals. The honeycomb panels 203 may be made from materials oriented in one or more directions and can be woven, unwoven, or braided, for example. In an embodiment, the honeycomb panels 203 are made of resin impregnated filaments or fibers. The filaments or fibers can be composed of filaments or fibers including one or more of carbon, graphite, glass, basalt, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. However, the continuous filaments or fibers described herein can include any suitable material or combination of materials. The resin can be a polymeric matrix or any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like.

Each of the honeycomb panels 203 can be rectangular or any other suitable shape for connecting the first skin 201 to the second skin 211. In an embodiment, each of the panels 203 is constructed of similar material, shape, and size panels. In other embodiments, the plurality of honeycomb panels 203 includes a variety of honeycomb panels having at least one different material, shape, or size as compared to the other panels.

The plurality of honeycomb panels 203 is assembled along the longitudinal axis A1 of the first skin 201 in the mold 220 in step 206 to form a honeycomb core 207 having an outer perimeter within the periphery of the first skin 201p. The plurality of honeycomb panels 203 can be selectively positioned on the first skin 201 to provide structural stiffness for the first skin 201 and second skin 211, which can prevent the first and second skins 201, 211 from buckling during operation.

In an embodiment, the honeycomb core 207 can be constructed from one honeycomb panel that extends spanwise across the wing 109. In an embodiment with a one-piece honeycomb core 207, the one-piece panel can be filled with an expanded foam, an adhesive, or other filler material at various locations requiring stiffening or for securing other components thereto. In an embodiment, the one-piece panel can include at least one integral filler member that are cells with expanded foam, adhesive, or other filler material at locations where the filler members 209 are located as shown in FIG. 11.

Figure 11:
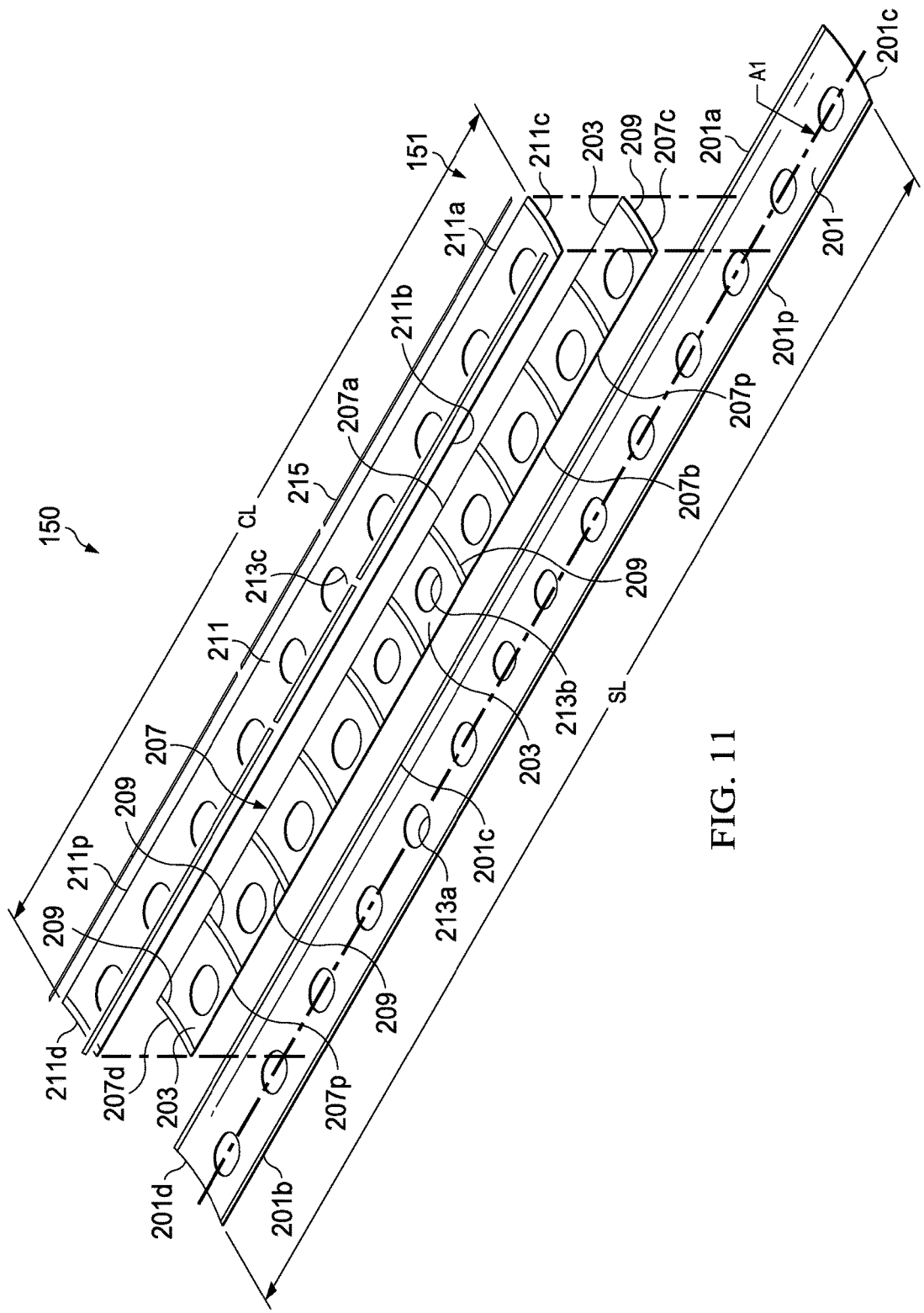
FIG. 11 is an exploded perspective view of a composite skin assembly, according to an exemplary embodiment.

In an embodiment, the method 200 can include a step 208 of positioning a plurality of filler members 209 between the plurality of honeycomb panels 203 in the honeycomb core 207, as shown in FIG. 11. In an embodiment, each of the filler members 209 is a compression molded material that is machined to the desired shape. In another embodiment, each of the filler members 209 is a net-molded part not requiring machining. The compression molded material can be a curable moldable material, for example, and not limitation, a thermosetting resins and advanced composite thermoplastics with unidirectional tapes, woven fabrics, randomly orientated fiber mat, or chopped strand. Each of the filler members 209 is butt jointed to the adjacent honeycomb panels 203. In an embodiment shown in FIGS. 10 and 11, each of the outboard ends 207c, 207d of the honeycomb core 207 includes a filler member 209 thereon that can provide a fluid barrier for the plurality of honeycomb panels 203 in the honeycomb core 207. The plurality of filler members 209 are oriented generally perpendicular to the longitudinal axis A1 of the first skin. In an embodiment, the filler members 209 can provide compressive strength to the composite skin 199 and provide stiff surface for fasteners to attach thereto during later installation steps.

In an embodiment, each of the filler members 209 is adhesively bonded to the first and second skins 201, 211. In another embodiment, each of the filler members 209 can be fastened to the first skin 201 using conventional aerospace fasteners. The term "fasteners" means pins, screws, rivets, or other suitable aerospace fasteners. In an embodiment, the plurality of filler members 209 are a portion of the honeycomb core 207.

A second skin 211 is positioned onto the honeycomb core 207 in step 210 and has outer perimeter within the periphery of the torque box. In an embodiment, the second skin 211 is a pre-cured laminate having a total number of plies less than the first skin 201. In another embodiment, the second skin 211 is a pre-cured laminate having less than 60 plies. An adhesive can be applied in step 212 to a top surface 207y of the honeycomb core 207 and to a bottom surface 207z of the honeycomb core 207 for securing the first and second skins 201, 211 to the honeycomb core 207, as shown in FIG. 8. In an embodiment, the adhesive is reticulated to provide fillets of adhesive between the first skin 201, the honeycomb core 207, and the second skin 211. In an embodiment, the step of applying adhesive 212 can include applying adhesive to filler members 209, honeycomb core 207, and other components. The forward and aft edges 211a, 211b of the second skin 211 are aligned to the forward and aft edges 207a, 207b of the honeycomb core 207. The outboard edges 211c, 211d of the second skin 211 are aligned to the corresponding outboard edges 207c, 207 of the honeycomb core 207.

The outer perimeters 207p, 211p of the honeycomb core 207 and the second skin 211 on their forward edges 207a, 211a and aft edges 207b, 211b are from about 1 cm to about 16 cm from the forward edge 201a and the aft edge 201b of the first skin 201. The outer perimeters 207p, 211p of the honeycomb core 207 and the second skin 211 on their outboard edges 207c, 207d, 211c, 211d are from about 7 cm to about 91 cm from the outboard edges 201c, 201d of the first skin 201. In another embodiment, the outer perimeters 207p, 211p of the honeycomb core 207 and the second skin 211 on their outboard edges 207c, 207d, 211c, 211d are from about 30 cm to about 80 cm from the outboard edges 201c, 201d of the first skin 201. In other embodiments, the outer perimeters 207p, 211p of the honeycomb core 207 and the second skin 211 on their outboard edges 207c, 207d, 211c, 211d form a length CL from about 5% to about 90% of the total spanwise length SL of the first skin 201. In an embodiment, the outer perimeters 207p, 211p of the honeycomb core 207 and the second skin 211 on their outboard edges 207c, 207d, 211c, 211d form a length CL from about 50% to about 80% of the total spanwise length SL of the first skin 201.

Figure 14:
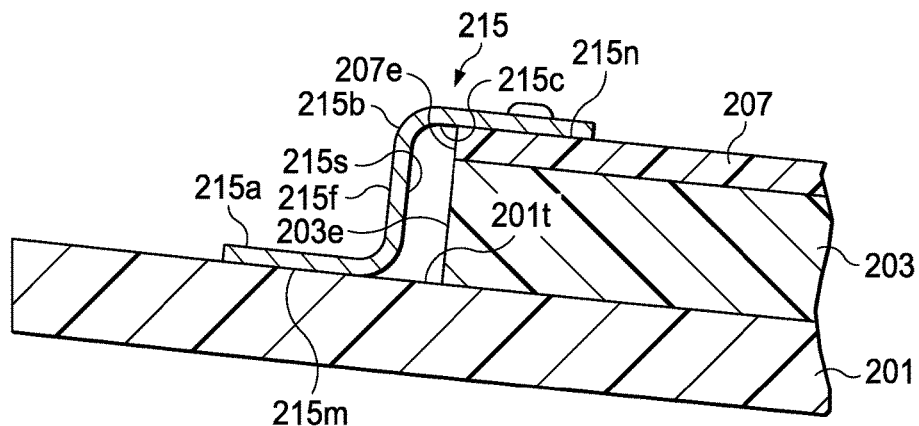
FIG. 14 is a side view of a joint member in a composite skin assembly, according to an exemplary embodiment.
Figure 15:
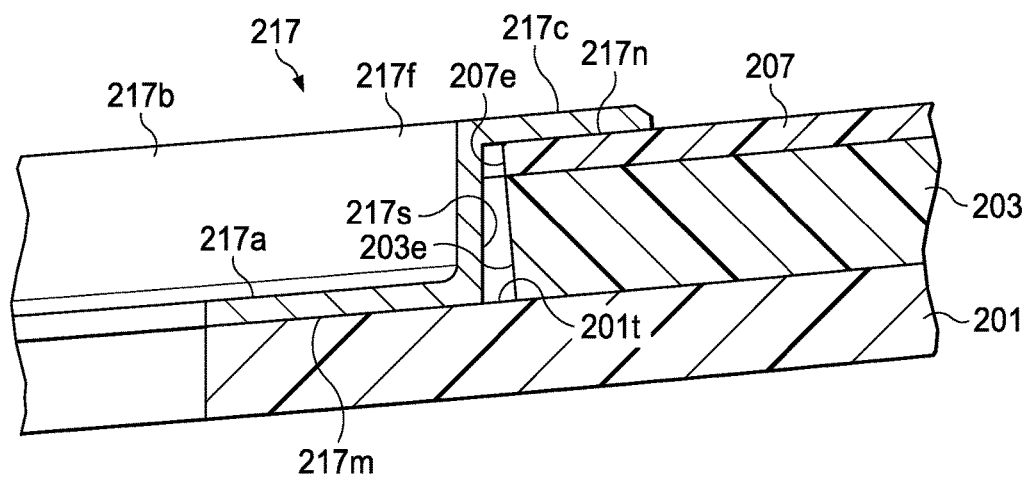
FIG. 15 is a perspective view of a joint member in a composite skin assembly, according to an exemplary embodiment.
Figure 16:
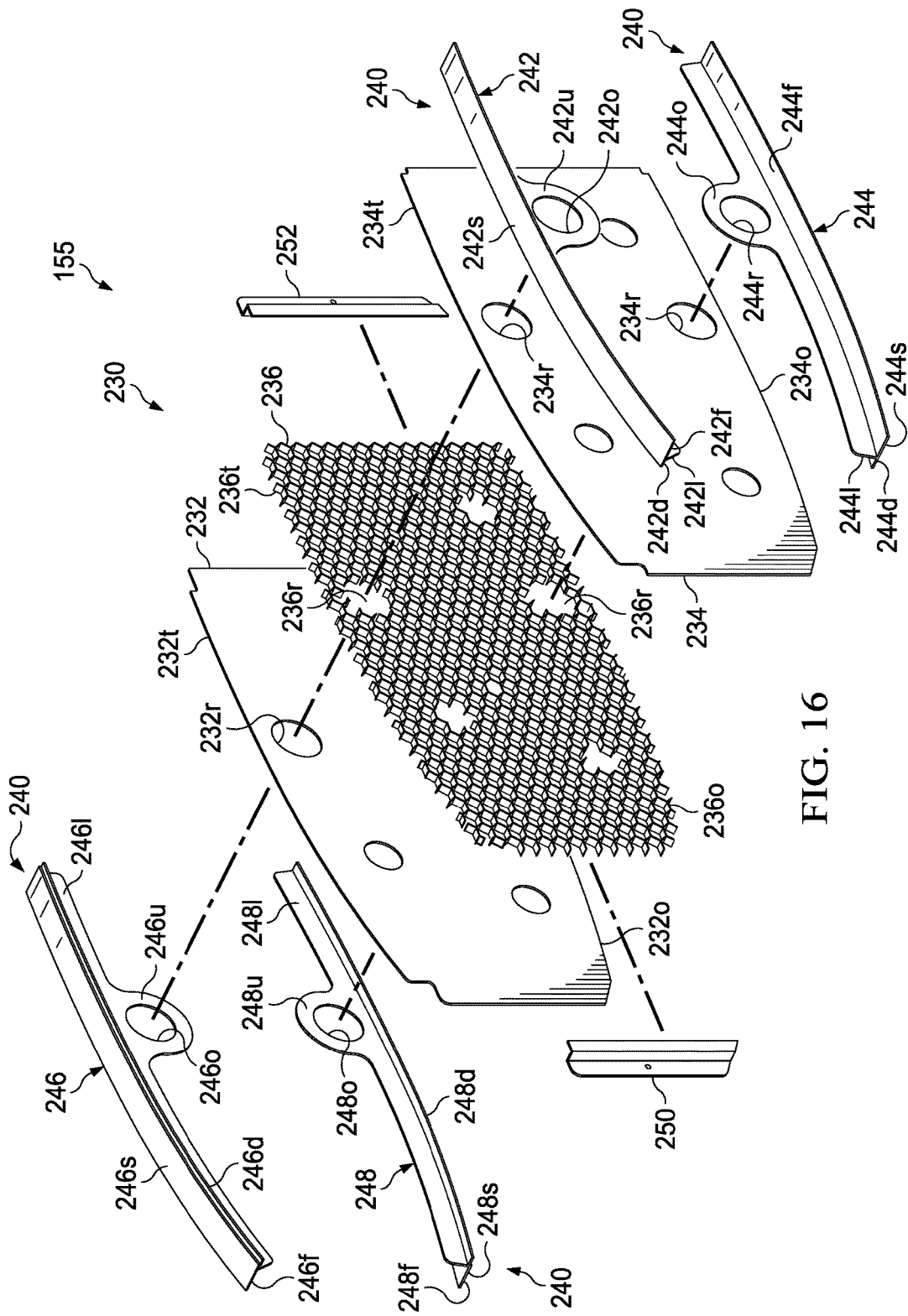
FIG. 16 is an exploded perspective view of a rib assembly, according to an exemplary embodiment.

As shown in FIGS. 10A, 14, and 15, the forward edges 207a, 211a and aft edges 207b, 2011b of the honeycomb core 207 and the second skin 211 are about 90 degrees relative to the top surface of the first skin 201.

Figure 12:
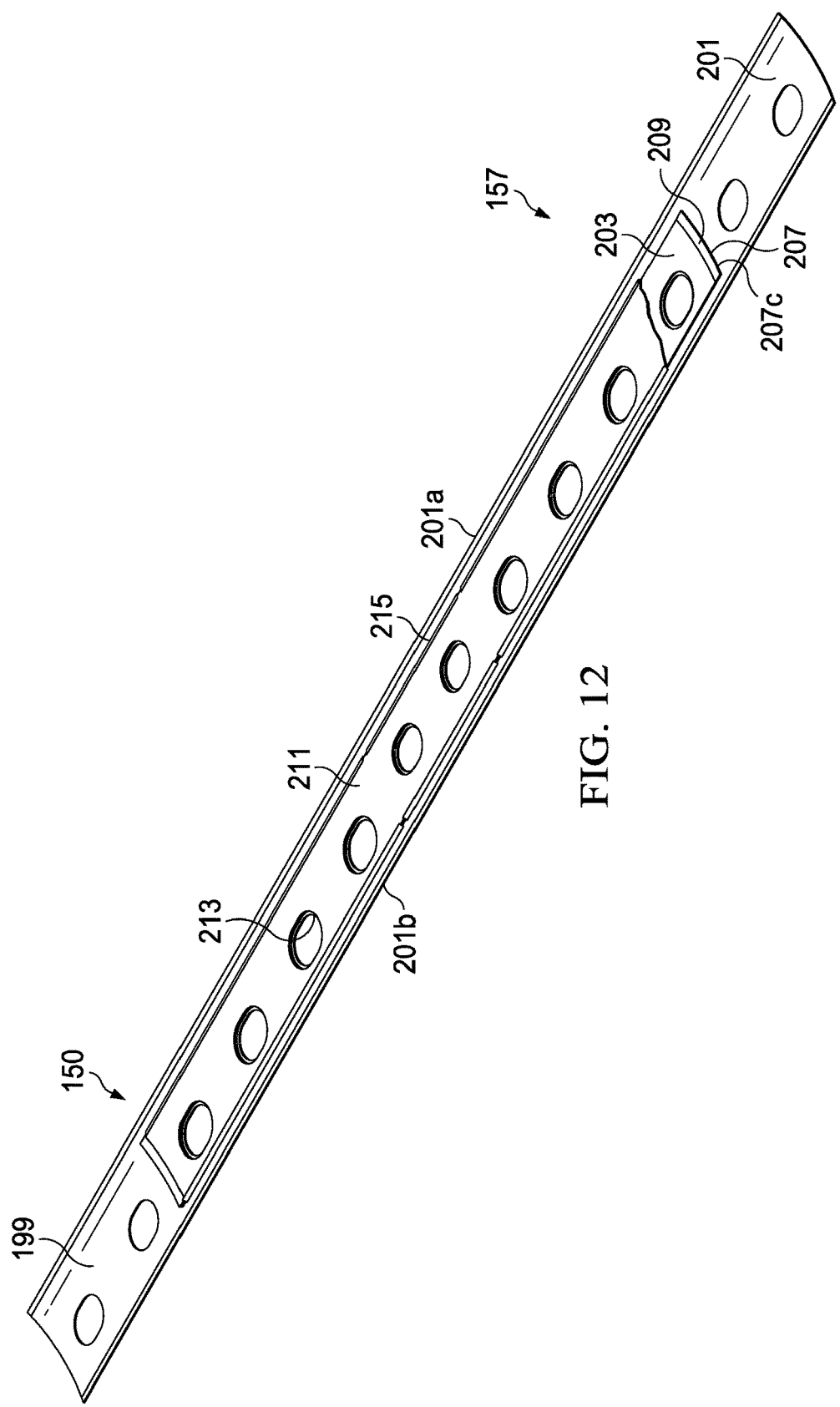
FIG. 12 is a perspective view of a composite skin assembly, according to an exemplary embodiment.
Figure 13:
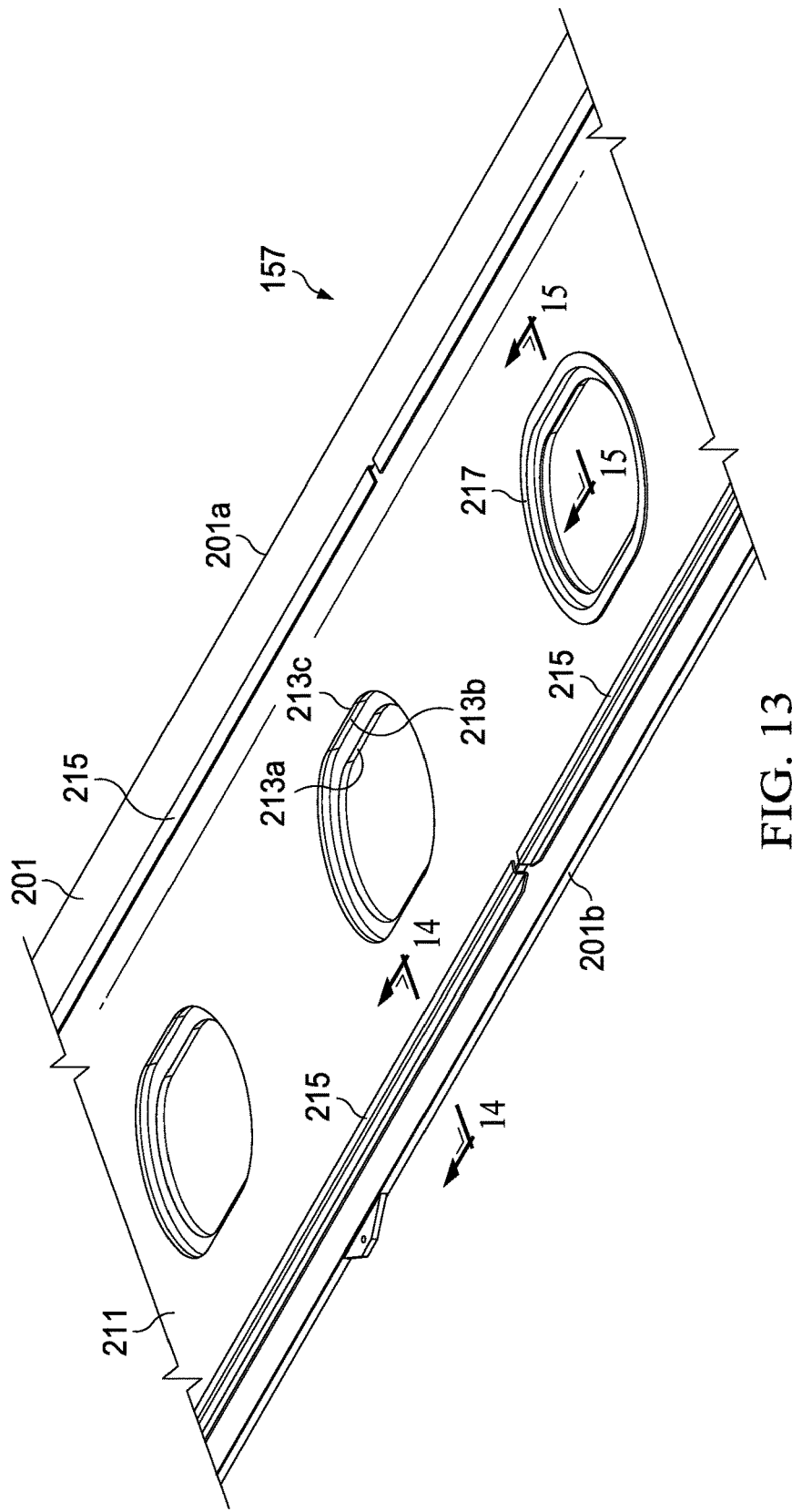
FIG. 13 is a partial perspective view of the composite skin assembly, according to an exemplary embodiment.

If the first skin 201, honeycomb core 207 and the second skin 211 are being assembled as a composite skin 199 for a lower skin assembly 151, then the first skin 201, honeycomb core 207, and second skin 211 can be trimmed in step 214 of the method 200. The trimming step 214 can include trimming a plurality of corresponding openings 213 in the first skin 213a, the honeycomb core 213b, and the second skin 213b. In an embodiment, the plurality of openings 213 are of a size sufficient to receive fuel components and systems. In an embodiment, the openings 213b, 213c in the honeycomb core 207 and the second skin 211 are larger in size but correspond to the openings 213a in the first skin 201. The trimming in step 214 can be performed by any variety of process, such as cutting, sanding, machining, to name a few examples. FIGS. 11, 12, and 13 illustrate the plurality of openings 213a, 213b, 213c trimmed in the first skin 201, honeycomb core 207, and the second skin 211.

If the first skin 201, honeycomb core 207 and the second skin 211 are being assembled as a composite skin 199 for an upper skin assembly 153, the first skin 201, honeycomb core 207, and second skin 211 may be trimmed in step 214 of the method 200; however, the trimming step for the upper skin assembly 153 can be limited to the perimeter 201p, 207p, and 211p of the first skin 201p, honeycomb core 207, and the second skin 211.

Once the first skin 201, honeycomb core 207, and the second skin are assembled into a composite skin 199, an embodiment includes positioning a plurality of joint members 215 thereon in step 216 of method 200 as shown in FIGS. 11, 12, 13, and 14 to form a joint system for a composite skin. Each of the plurality of joint members 215 includes a first flange 215c, a second flange 215a, and a support member 215b disposed between the first flange 215c and the second flange 215a. In an embodiment, the support member 215b includes a first side 215f and a second side 215s, the first flange 215a is a lower flange that extends laterally from the first side 215f of the support member 215b and the second flange 215c is an upper flange extends laterally from the second side 215s, to form generally a "Z" shape. FIGS. 14 and 15 show exemplary joint members; however, it will be appreciated that the contemplated embodiments can be configured such that the first flange 215a can be an upper flange and the second flange 215c can be a lower flange for joining certain structures.

The exemplary embodiments of the joint member 215 provides that the upper flange 215c includes an attachment surface 215n that overlaps a portion of the second skin 211 and attaches thereto. The lower flange 215a includes an attachment surface 215m that overlaps a portion of the first skin 201 and attaches thereto. The upper and lower flanges 215c, 215a can be fixedly attached to the first and second skin 201, 211, respectively, with at least one of an adhesive and a conventional fastener (screw, bolt, rivet, etc.).

The plurality of joint members 215 are configured to provide a load path from the first skin 201 to the second skin 211; secure the first skin 201 to the second skin 211, which can limit peeling of the honeycomb core 207 away from the first skin 201; and provide a fluid barrier to limit fluid intrusion, such as water, fuel, and hydraulic fluid, into the honeycomb core 207.

The joint members 215 can be made from a wide variety of materials, including but not limited to, composite materials and metals. In an embodiment, the joint members 215 are made from a pre-cured laminate as described herein that is trimmed to include the upper flange 215c, support member 215b, and the lower flange 215a as described herein. The joint members 215 can be made from materials oriented in one or more directions and can be woven, unwoven, or braided, for example. In an embodiment, the joint members 215 are made from a composite material reinforced with high strength fibers and fabrics configured to transfer a load path from the upper flange 215c to the lower flange 215a; examples of high strength fibers and fabrics, for example, and not limitation, include fabric is composed of continuous filaments or fibers including one or more of carbon, graphite, glass, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. In another embodiment, the joint members 215 are made, for example, of a metal such as titanium or a high hardness steel. In an embodiment, each of the joint members 215 in a plurality of joint members 215 are made from similar materials. In other embodiments, the plurality of the joint members 215 are made from dissimilar materials, e.g., a portion of the joint members are made from metallic materials and a portion are made from composite materials.

Each of the joint members 215 can be straight, round, or any other suitable shape for connecting the first skin 201 to the second skin 211. In an embodiment, each of the joint members 215 is constructed of similar material, shape, and size panels. In other embodiments, the plurality of joint members 215 includes a variety of joint members having at least one different material, shape, or size as compared to the other members.

An exemplary embodiment shown in FIGS. 12, 13, and 14 provides a plurality of generally straight joint members 215 are positioned at the forward edges 207a, 211a and aft edges 207b, 211b of the honeycomb core 207 and the second skin 211. In an embodiment, the joint system can include at least at the second skin 211 having an edge of about 90 degrees relative to the top surface 201t of the first skin 201, e.g., the forward edge 211a or the aft edge 211b. In the example embodiment, both the second skin 211 and the honeycomb core 207 have an edge of about 90 degrees relative to the top surface 201t of the first skin 201. In another exemplary embodiment, a plurality of generally oval joint members 217 can be installed in the plurality of openings 213 and includes a lower flange 217a that extends laterally from a greater distance first surface 217f of the support member 217b as compared to the joint member 215 along the edges. The size, length, and shape of the joint members 215, 217 can be tailored to achieve at least one of the following functional properties: provide a fluid barrier to the material adjacent to the support member 215s and provide a load path from one composite to another composite. In an embodiment, the joint member 217 can be a one-piece machined aluminum component that is riveted and room temperature bonded to the first and second skins 201, 211, as shown in FIG. 14.

The plurality of joint members 215, 217 can be fixedly attached to the first and second skin 201, 211, respectively, with at least one of an adhesive and a conventional fastener (screw, bolt, rivet, etc.).

The curing step 218 of method 200 includes curing the composite skin 199 by heating the composite skin for about 2 hours at 250 degrees Fahrenheit above ambient pressure. If the plurality of joint members 215, 217 are composite materials and are included on the composite skin 199, the joint members 215, 217 can be cured together with the composite skin 199, which can co-bond the composite joint members 215, 217 to the first and second skins 201, 211, respectively. Prior to the curing step 218, adhesive can be applied to at least one of: the first skin 201; the honeycomb core 207; the filler members 209; the joint members 215, 217; and the second skin 211.

Once the composite skin 199 is cured, it can be used to manufacture the composite skin assembly 150. The composite skin 199 can undergo an assembly step that includes accurately drilling of holes to form the composite skin assembly 150 that can be at least one of the upper composite skin assembly 151 and the lower composite skin assembly 153, which is then ready for installation in step 135 of the method 130 for manufacturing a tiltrotor wing structure 109. The assembly step can further include: procuring and attaching details; trimming of holes so as to align with installation fixtures correctly; and preparing the composite skin for bonding to form a torque box assembly 157, including applying adhesive and or positioning of pins or pegs.

Figure 1:
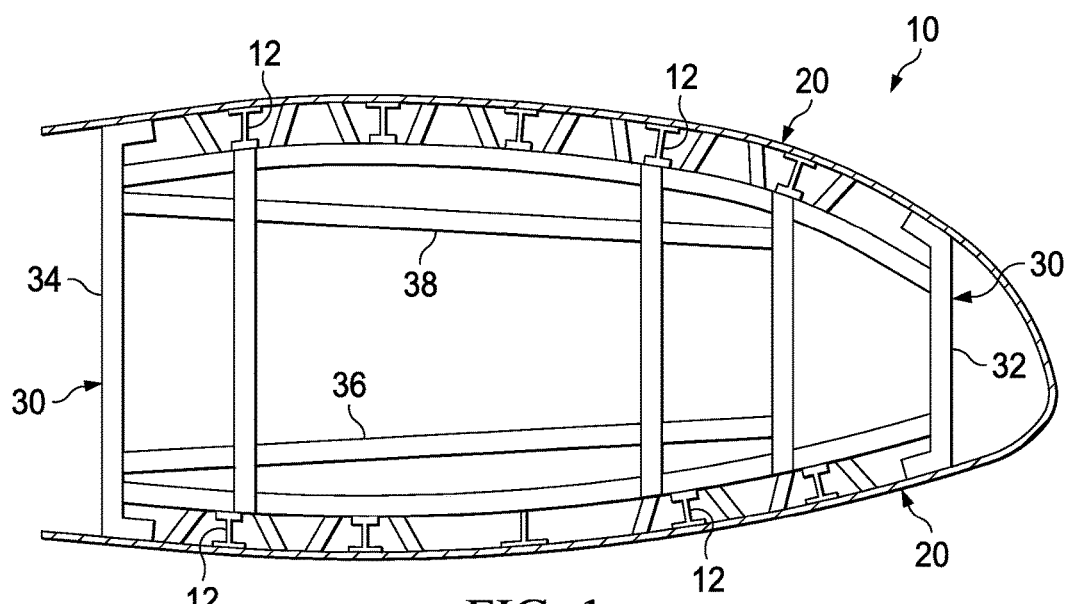
FIG. 1 is a cross-sectional view of a prior art tiltrotor wing.

The method of manufacture for a composite skin assembly in FIG. 9 and the resulting composite skin can advantageously provide at least one of the following: a narrow profile honeycomb core stiffened wing skin, which does not include any or require any conventional stringers as shown in FIGS. 1 and 2; the straight forward and aft edges of the composite skin facilitates assembly and improves strength of the torque box assembly, as compared to tapered or angled wings, the composite skin provides sufficient stiffness and torsional support during the shearing motion produced by the twisting proprotors 115 and 117; low cost composite tooling as compared to the tooling required for the pieces and ply buildups used in the conventional tiltrotor wing shown in FIGS. 1 and 2; a combination of the methods described herein can reduce overall labor costs by more than 50% as compared to the current labor costs for the conventional tiltrotor wing shown in FIGS. 1 and 2; the composite skin is weight efficient and permits a monocoque torque box assembly 157; the composite skin includes at least one of a straight forward edge and a straight aft edge, which facilitates assembly and improves strength of the resulting spar assembly; the total ply count and part count of the composite skins has been reduced by about 75% as compared to the tiltrotor wing shown in FIGS. 1 and 2; the elimination of "postage stamp" ply buildups as shown in FIGS. 1 and 2 reduces the need for raw material knitting and allows for point-of-use manufacturing for the composite skins; reduces the number of quality defects as compared to the quality defects in the conventional tiltrotor wing in FIGS. 1 and 2; simple de-tooling; the composite skin assembly facilitates repair; and the numerous horizontal and vertical stiffeners needed for conventional wing structure shown in FIGS. 1 and 2 are no longer needed for buckling resistance and to transfer the load and resist out of plane bending forces.

In an embodiment, the composite skin 199 used in a torque box assembly 157 as described herein can provide improved fuel bay clearance as compared to the prior art structure in FIGS. 1 and 2 because the composite skin has a thin profile and does not require stringers and other structural members that extend generally into and through the interior of the fuel bays therein. In addition, the composite skin 199 provides a generally flat bottom and flat top with the prefabricated that uses only minimal foam fillets in each corner of a fuel bay, which greatly reduces the part count and complexity of manufacturing as compared to the prior art structure in FIGS. 1 and 2. The composite skin 199 can be adapted to provide selected stiffness for tiltrotor wing that combats the dynamic loads and harmonics generated by the propulsion systems 111, 113 in operation.

The method for manufacture 130 of a tiltrotor wing structure 109 includes providing a plurality of rib assemblies 155. In an embodiment, each of the plurality of rib assemblies 155 is a pre-assembled rib assembly ready for installation to form a torque box assembly 157. Each of the rib assemblies 155 includes a rib web 230 including a first laminate 232, a second laminate 234, and a honeycomb panel 236 having an array of large cells and a plurality of skin flanges 240.

In an embodiment, the first laminate 232 and the second laminate 234 are each a pre-cured laminate produced by the method 170 in a flat mold. After the pre-curing step 184, the first and second laminates are trimmed as two pieces to form the first and second laminates 232, 234. In an embodiment, the first and second laminates 232, 234 are each comprised of a total number of plies from about 4 plies to about 12 plies.

The honeycomb panel 236 is disposed between the first laminate 232 and the second laminate 234 during subassembly of the rib assembly 155. In an embodiment, the honeycomb panel 236 is a panel of large cell honeycomb as shown in FIG. 10B. The large cell means that that each cell 205 has a width W of at least 1 cm. In another embodiment, the width W of the large cells is from about 1 cm to about 3 cm. In yet another embodiment, the width W of the large cells is from about 1.5 cm to about 2.5 cm. In an embodiment, the height H of the honeycomb panel 236 is at least 1 cm. In another embodiment, the height H of the honeycomb panel 236 is from 0.6 cm to 12.7 cm.

It should be appreciated that honeycomb panel 236 can be of a variety of materials, including but not limited to, composite materials and metals. The honeycomb panel 236 may be made from materials oriented in one or more directions and can be woven, unwoven, or braided, for example. In an embodiment, the honeycomb panel 236 is made of resin impregnated filaments or fibers. The filaments or fibers can be composed of filaments or fibers including one or more of carbon, graphite, glass, an aromatic polyamide (i.e. "aramid") material, a variant of an aromatic polyamide material (e.g., a polyparaphenylene terephthalamide material, such as Kevlar® by E.I. du Pont de Nemours and Company of Richmond, Va.), or the like. However, the continuous filaments or fibers described herein can include any suitable material or combination of materials. The resin can be a polymeric matrix or any suitable resin system, such as a thermoplastic or thermosetting resin. Other exemplary resins can include epoxy, polyimide, polyamide, bismaleimide, polyester, vinyl ester, phenolic, polyetheretherketone (PEEK), polyetherketone (PEK), polyphenylene sulfide (PPS), and the like.

In an embodiment, each of the panels 236 in the rib web 230 in the plurality of rib assemblies 155 is constructed of similar material, shape, and size panels. In other embodiments, the panels 236 in the rib webs 230 in the plurality of rib assemblies 155 includes a variety of honeycomb panels 236 having at least one different material, size, or shape as compared to the other panels in the plurality of rib assemblies 155.

The first and second laminates 232, 234 are adhered to the honeycomb panel 236 on interior surfaces thereof by an adhesive that can be bonding at ambient temperature or with a temperature sensitive adhesive using a heating tool to form the rib web 230. The rib web 230 has generally smooth exterior surfaces as formed by the first and second laminates 232, 234. The rib web 230 has a thin profile or width, which can provide the necessary structural support for the wing structure 109 without requiring protruding I-beam reinforcement members therethrough as is required in the prior art shown in FIGS. 1 and 2.

The rib web 230 is then trimmed to the desired shape having a forward edge 230*a*, an aft edge 230*b*, a top 230*t*, and a bottom 230*o*. The rib web 230 further includes at least two apertures 230*r* configured to receive and support the fuel systems and lines running therethrough. In one embodiment, the rib web 230 has a width sufficient to prevent kinks in the fuel systems and lines in the apertures 230*r*. The rib web 230 includes a top 232*t*, 236*t*, 234*t* and a bottom 232*o*, 236*o*, 234*o* that are fixedly connected to the plurality of skin flanges 240.

A plurality of skin flanges 240 are fixedly attached to the rib assemblies 155 and during installation are secured to the adjacent lower composite skin assembly 151 and the upper composite skin assembly 153. In an embodiment, each rib assembly 155 includes a first skin flange 242, a second skin flange 244, a third skin flange 246, and a fourth skin flange 248. The first, second, third, and fourth skin flanges 242, 244, 246, 248 are substantially similar; therefore, for sake of efficiency the plurality of skin flanges 240 will be disclosed only with regards to the first skin flange 242. However, one of ordinary skill in the art would fully appreciate an understanding of the second, third, and fourth skin flanges 244, 246, 248 based upon the disclosure of the first skin flanges 242.

Figure 24A:
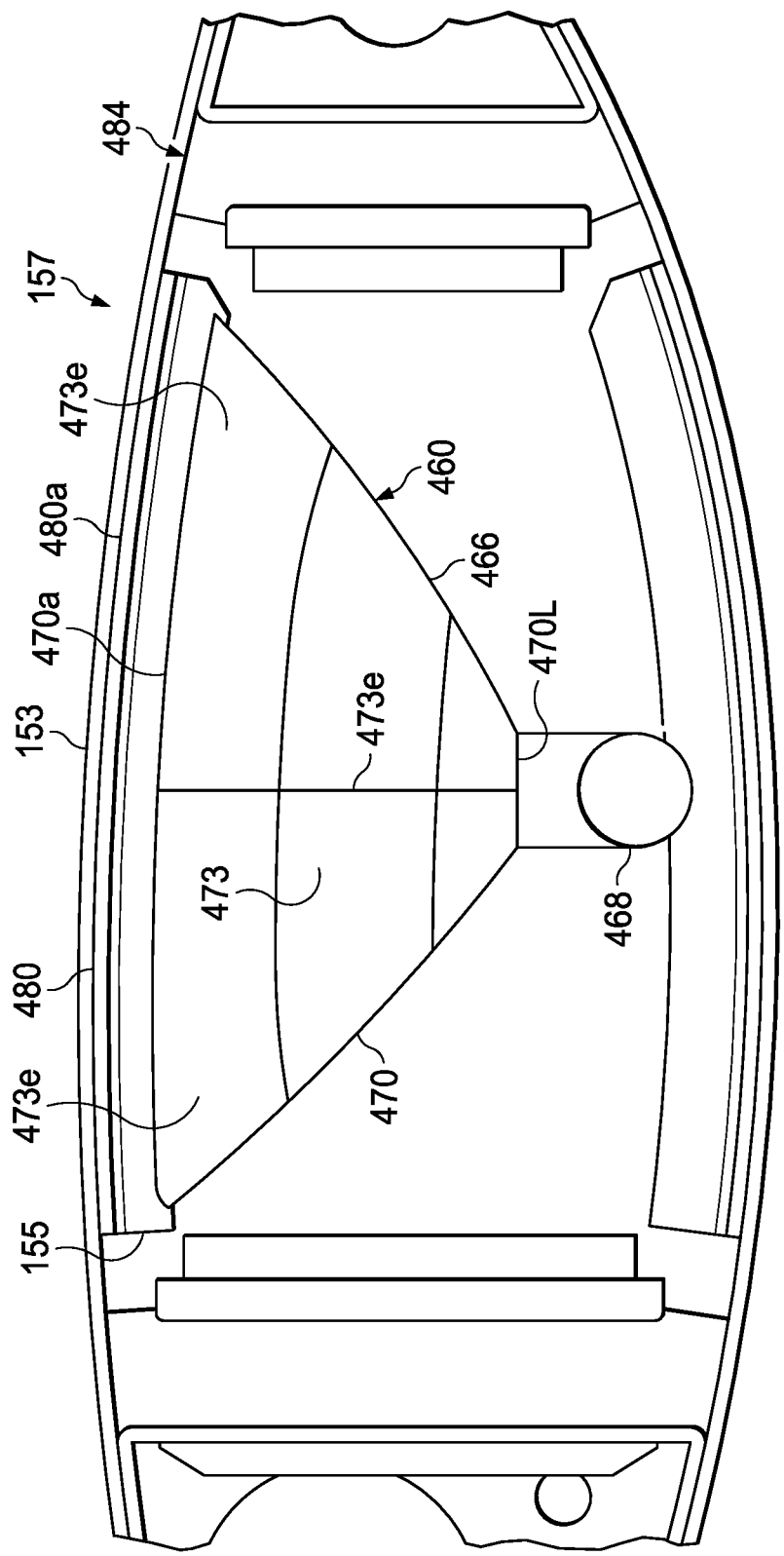
FIG. 24A is a schematic view of a heating tool in a bay of a torque box assembly, according to an exemplary embodiment.
Figure 24B:
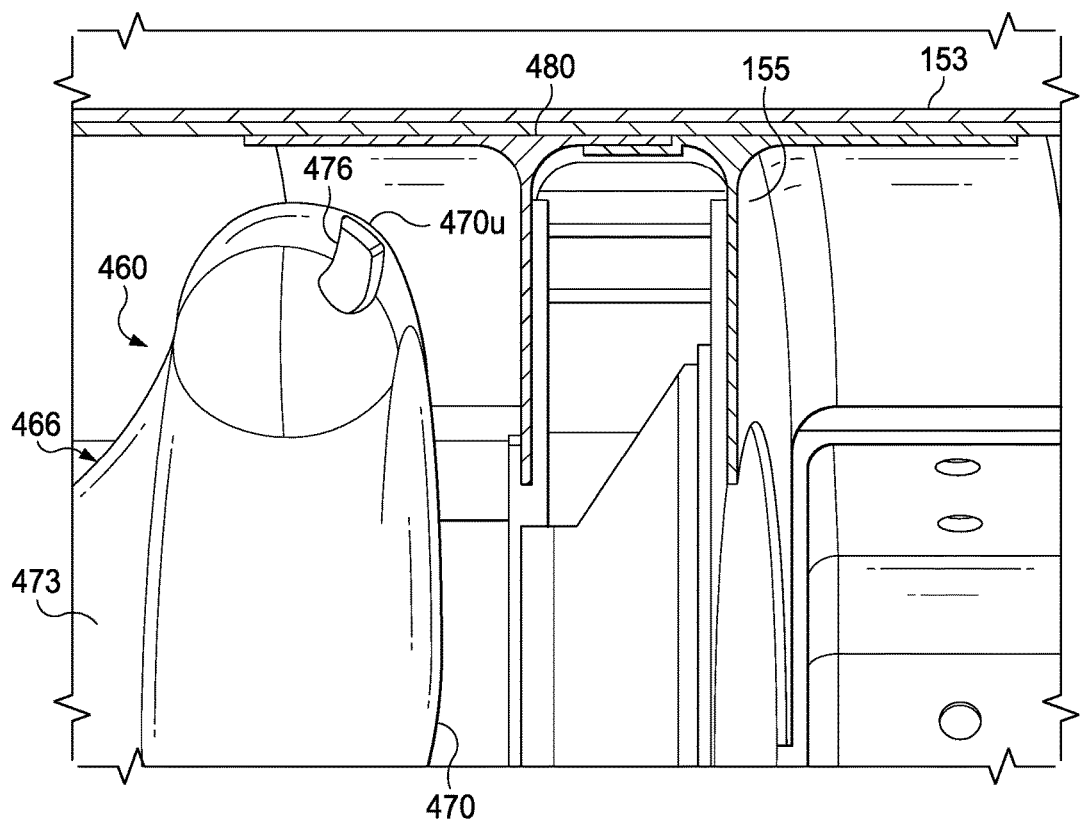
FIG. 24B is a schematic view of a heating tool heating an adhesive to secure a rib assembly to an upper composite skin assembly, according to an exemplary embodiment.
Figure 24C:
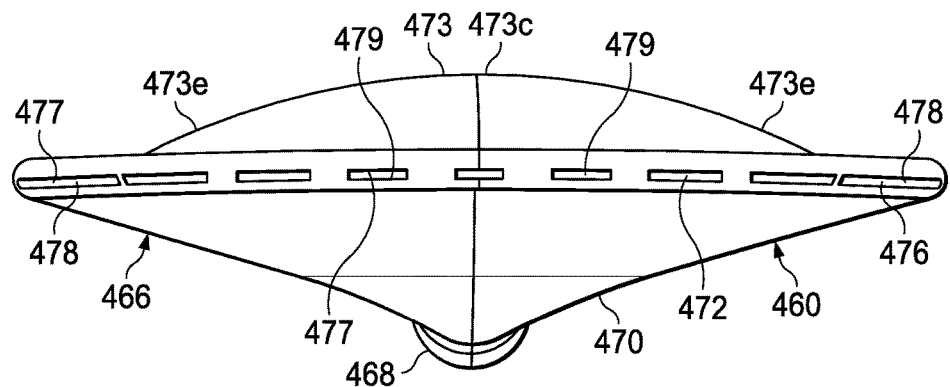
FIG. 24C is a top perspective view of a heating tool, according to an exemplary embodiment.

The first skin flange 242 includes a base member 242*s* having a first portion 242*f* and a second portion 242*d* and a vertical member 242*l* extending from the base member 242*s*. In an embodiment, the width of the first portion 242*f* is more than the width of the second portion 242*d*. The second portion 242*d* and vertical member 242*l* are configured to securely attach to the top edge of the rib web 230. In one embodiment, the width of the second portion 242*d* of the base member 242*s* corresponds to greater than half of the thickness of the rib web 230. In an embodiment, the second portion 242*d* is overlapped by a second portion 246*d* of the base member 246*s* of the third skin flange 246, as shown in FIG. 24B. The base member 242*s* is ultimately adhered to a respective composite skin assembly 151, 153 during installation to form a torque box structure 157. The base member 242*s* is opposite to the surface having the vertical member 242*l*.

The vertical member 242*l* supports the outer, top surface of the rib web 230. In an embodiment, the vertical member 242*l* includes a rounded portion 242*u* having an opening 242*o* that corresponds to the aperture 230*r* in the rib web 230 as formed by the openings 232*r*, 234*r*, 236*r*.

In an embodiment, the first skin flange 242 is constructed from a composite material molded to the shape 242. In an embodiment, the first skin flange 242 is a pre-cured laminate produced by the method 170 in a suitable mold.

The second 242*d* portion of the base member 242*s* and the vertical member 242*l* of the skin flange 242 are attached to the top and bottom of the rib web 230 by bonding at ambient temperature or with a temperature sensitive adhesive using a heating tool. In an embodiment, the skin flange 242 is structurally bonded to the rib web 230 during a composite curing process. In a further embodiment, the skin flange 242 is fastened to the rib web 230 using fasteners.

The rib assembly 230 includes a forward edge 230a and an aft edge 230b, each of which can be attached forward and aft joint members 250, 252 having a "Z" configuration to secure the rib assembly 230 to corresponding to rib posts 146 in the aft and forward spar assemblies 141, 143. The forward and aft joint members 250, 252 can be a first joint member 250 and a second joint member 252.

Each of the first and second joint members 250, 252 includes an upper flange 215c with an attachment surface 215n that overlaps and is secured to the outer rib web surface 230 being the second laminate 234 in this exemplary embodiment. The first and second joint members 250, 252 each includes a lower flange 215a with an attachment surface that overlaps and is fixedly connected with forward rib post 256 and aft rib post 258, respectively. The upper flange 215c of the first and second joint members 250, 252 can be made of a composite or metallic material that is bonded, structurally bonded, fastened to, or otherwise connected to the rib web 230. The lower flange 215a of the first and second joint members 250, 252 is secured to the respective forward and aft rib posts 256, 258 using fasteners.

Figure 17:
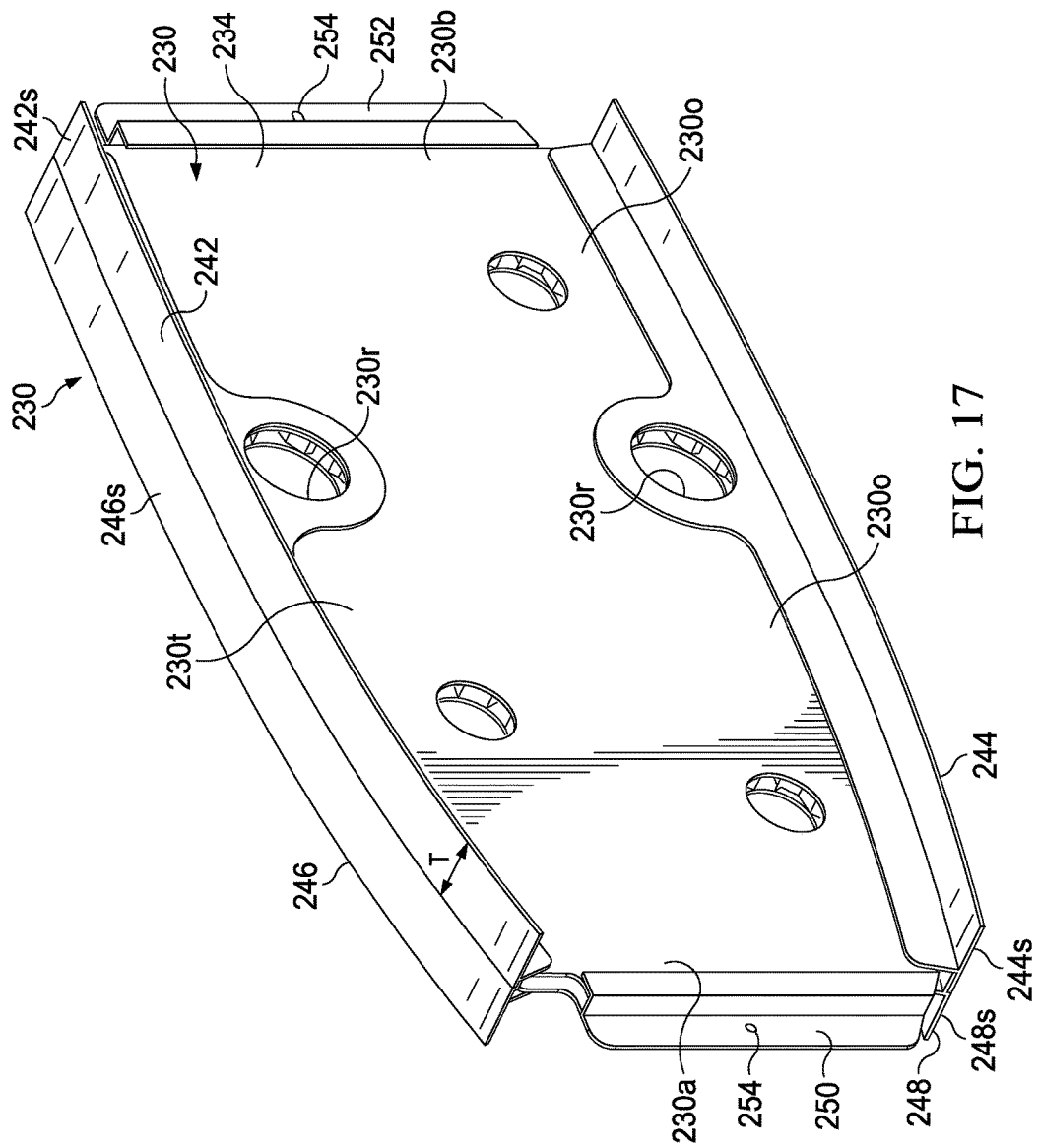
FIG. 17 is a perspective view of a rib assembly, according to an exemplary embodiment.

In an embodiment, during installation, each of the rib assemblies 155 is fastened to the forward spar rib post 256 and the aft spar rib post 258 such that the first and second joint members 250, 252 are secured to at least one side of the rib web 230, which can minimize the number of fasteners required for installing the rib assembly 155 to the rib posts 256, 258. The first and second joint members 250, 252 each include one hole 254 as shown in FIG. 17 for fastening to the respective forward rib post 256 and aft rib post 258. A plurality of holes can be back-drilled into the lower flange 215a of the first and second joint members 250, 252 using the holes in the respective forward and aft rib posts 256, 258 as a template and the remainder of the fasteners are secured therein. In an exemplary embodiment, the first joint member 250 is attached to forward rib post 256 with seven fasteners and the second joint member 252 is attached to the aft rib post 258 with nine fasteners.

Figure 18A:
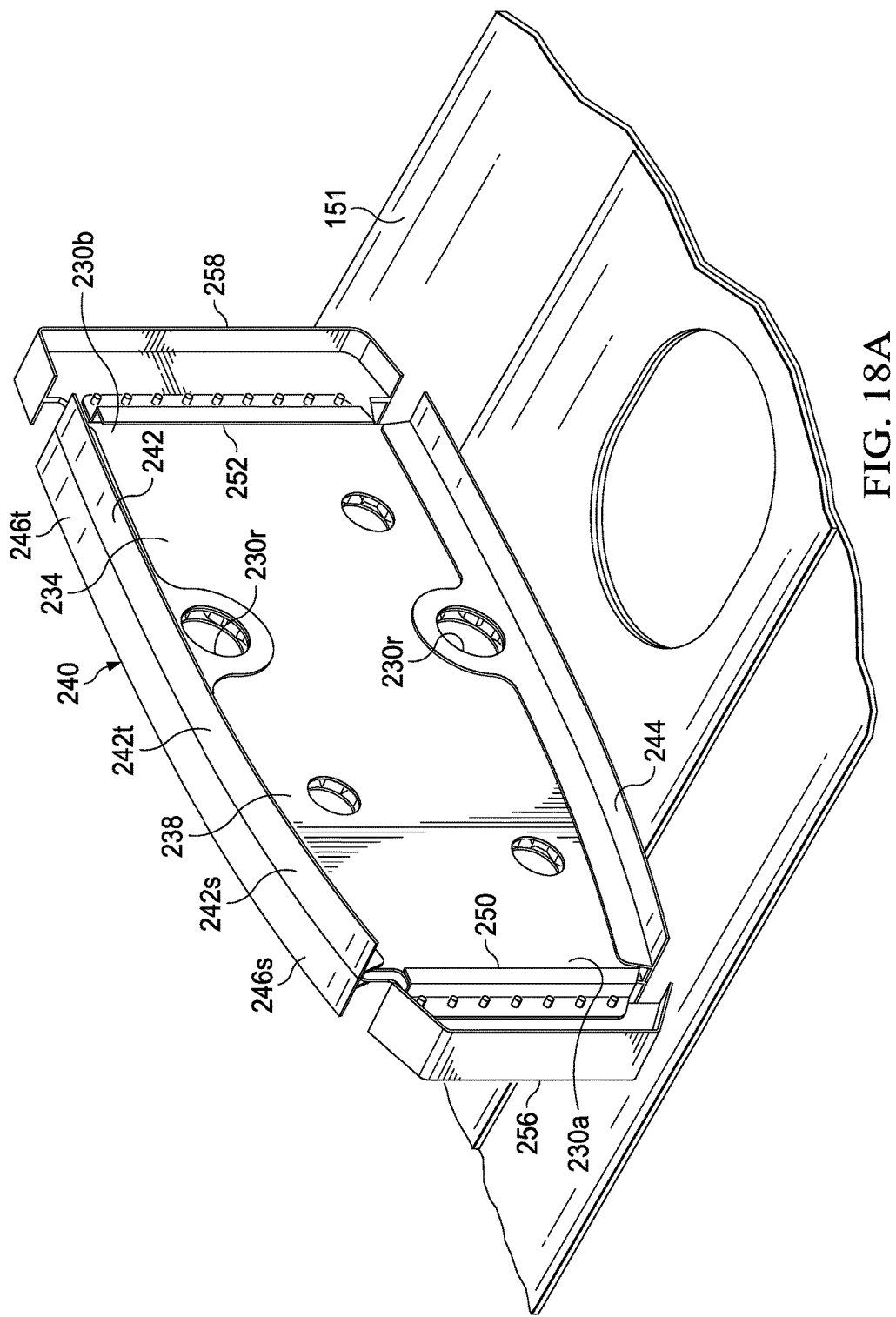
FIG. 18A is a perspective view of a rib assembly attached to rib posts, according to an exemplary embodiment.
Figure 18C:
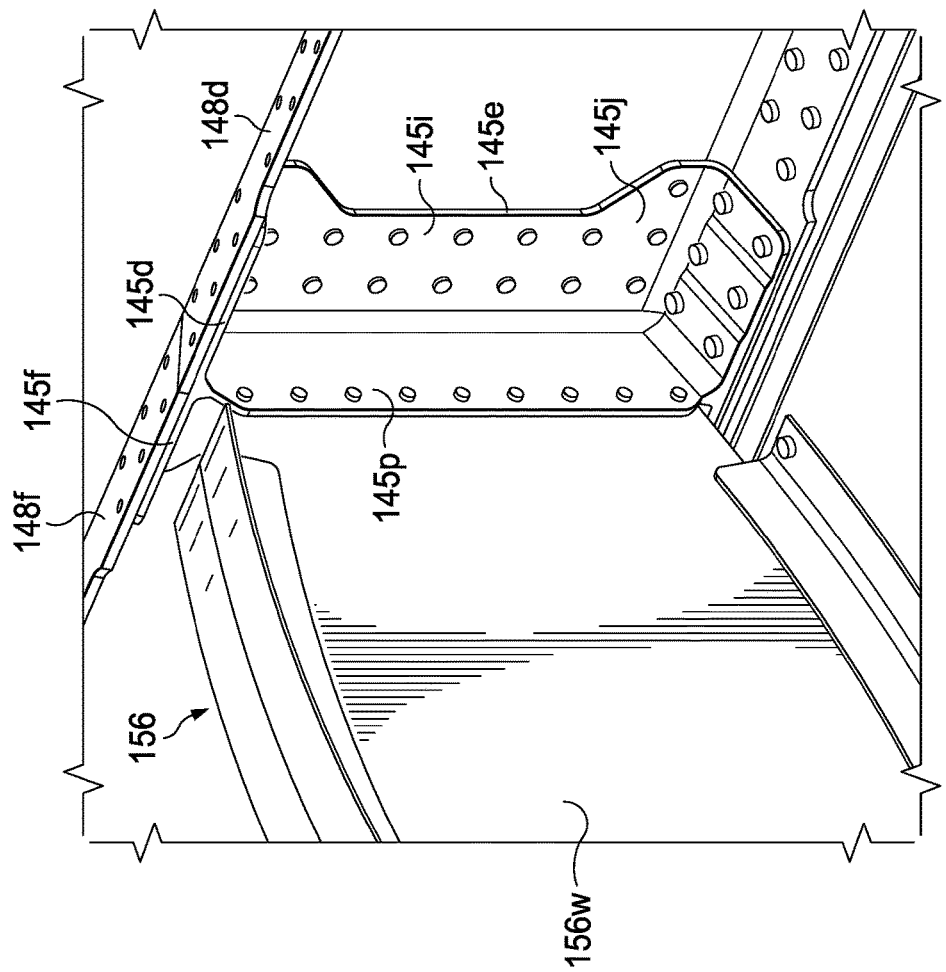
FIG. 18C is a perspective view an engagement member connected to a left spar assembly, a right spar assembly, and a rib assembly, according to an exemplary embodiment.
Figure 18B:
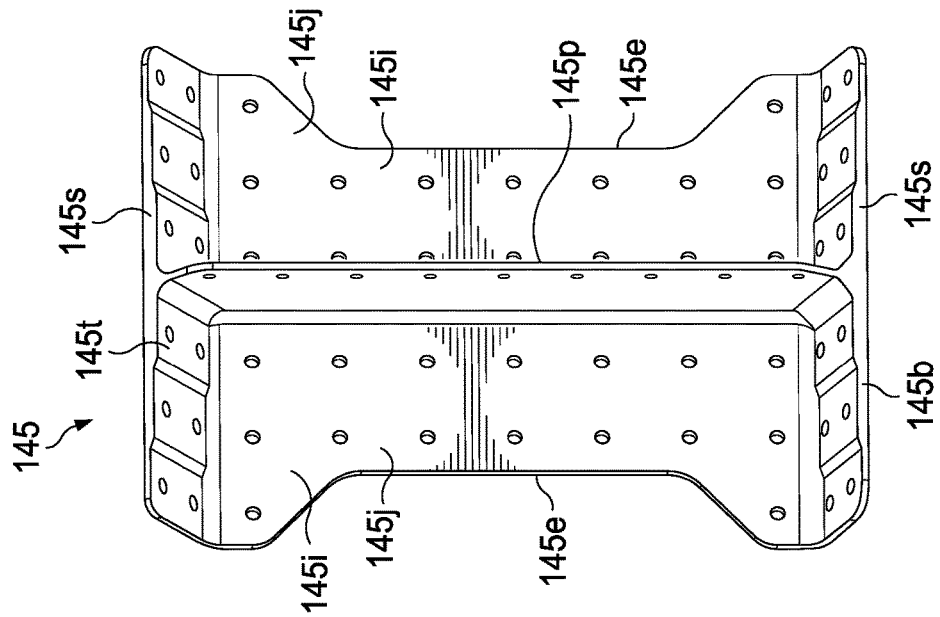
FIG. 18B is a perspective view of an engagement member including an integral rib post, according to an exemplary embodiment.

In a further embodiment shown in FIGS. 18B-18C, during installation, a centerline rib assembly 156 can be secured to an engagement member 145 including joining portion 145j and a post 145p extending from the joining portion 145j. The engagement member 145 can be generally T shaped. The engagement member 145 can be made of one-piece such that the rib post 145p is integral with the joining portion 145j and constructed of at least one of the following: a pre-cured assembly, a composite material, and a metallic material.

The joining portion 145j includes a first attachment surface 145f and a second attachment surface 145d for attachment and splicing a first spar 148f and second spar 148d to form a spar member. The first and second attachment surfaces 145f, 145d are exterior surfaces opposite to interior side 145i adjacent to the post 145p.

The joining portion 145j includes top and bottom sides 145t, 145b. At least one of the top and bottom sides 145t, 145b can include an interior surface with a slope 145s increasing the thickness of the top or bottom side 145t, 145b at the post 145p to provide reinforcement for the rib post 145p and splicing two spar assemblies. The interior surface with a slope 145s can include at least one step. In an exemplary embodiment, the interior surface with a slope 145s is a stepped surface on both the top and bottom sides 145t, 145b.

The post 145p can be fixedly connected to the centerline rib assembly 156 using the first and second joint members 250, 252 connected to the rib web 156w of the rib assembly 156. In one exemplary embodiment, the first and second joint members 250, 252 of the centerline rib assembly 156 are each fastened to a corresponding forward and aft post 145p with seven and nine fasteners respectively.

The engagement member 145 serves as a rib post and to join two spar member 148f, 148d. As shown in FIG. 18C, the first spar member 148f is fixedly connected to the first attachment surface 145f and the second spar member 148d is fixedly connected to the second attachment surface 145d. In an embodiment, the first and second attachment surfaces 145f, 145d are on the exterior surface 145e of the engagement member.

The plurality of rib assemblies 155 can advantageously provide at least one of the following: a rib assembly 155 requiring minimal fasteners and components; the skin flanges 240 include a thick base member with overlapping portions that provides improved stability for the rib assemblies 155, the upper skin 153, and the lower skin 151; substantially reduces the number of fuel bay foam details as compared to the prior art shown in FIGS. 1 and 2; the rib web 230 in the assemblies 155 has generally smooth surfaces and an overall narrow profile, which provides more space or a wider footprint for each bay, as compared to the prior art shown in FIGS. 1 and 2 requiring protruding stiffening elements and I-beams, thereby permitting more fuel storage therein; the plurality of skin flanges 240 for each rib assembly 155 provide a surface against the first and second laminates 232, 234 that will resist peeling from the honeycomb panel 236; production costs and weight are less than conventional rib assemblies used for prior art FIGS. 1 and 2, reduced part count as compared to conventional rib assemblies in the prior art FIGS. 1 and 2; the size and shape of the shape of the rib assemblies 155 can be tailored for stiffening of various aerospace structures; and compared to the prior art wing shown in FIGS. 1 and 2, the plurality of rib assemblies have about 80% fewer detail parts and 70% fewer fasteners per installed rib assembly.

Figure 19:
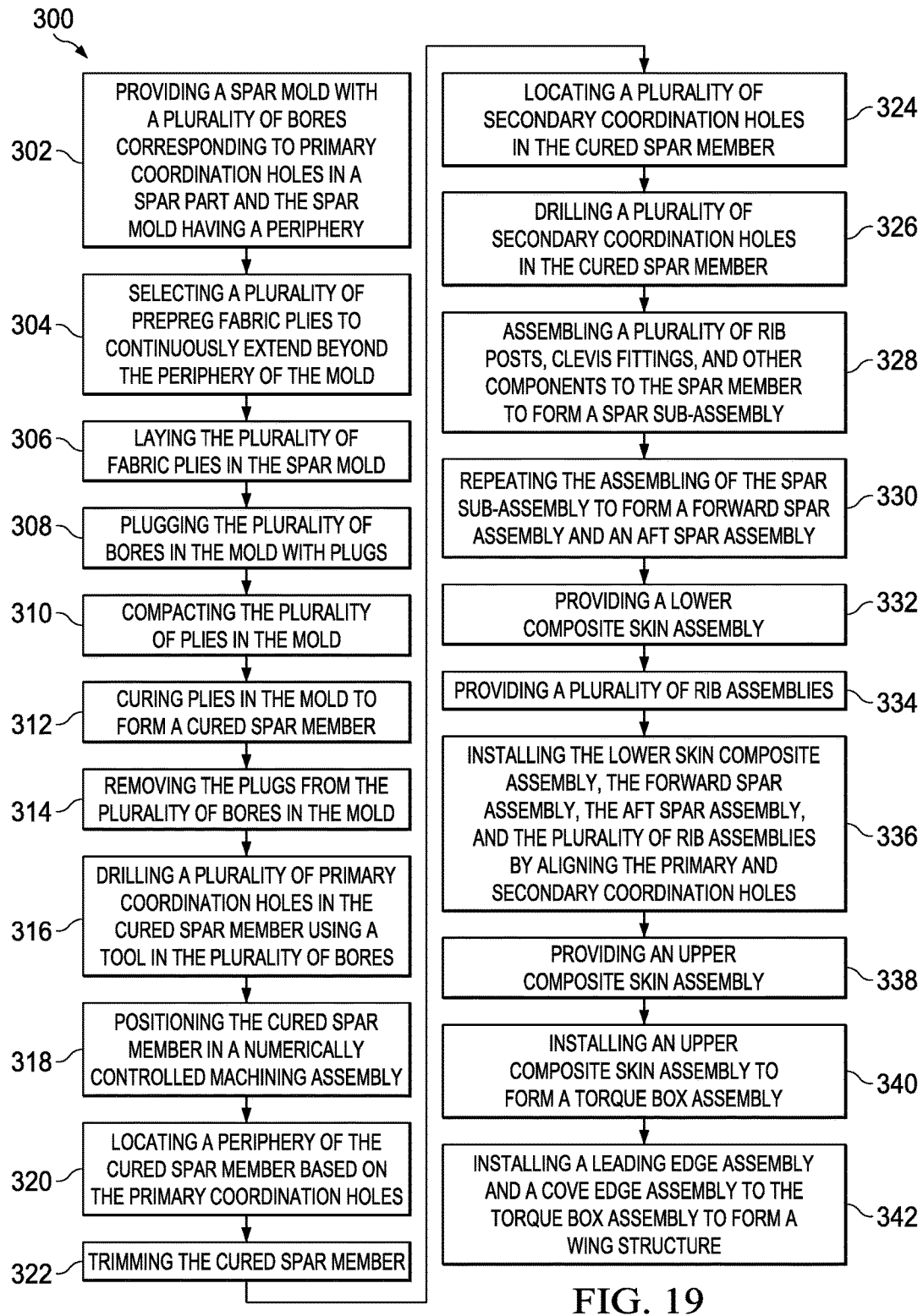
FIG. 19 is a flow diagram of a method of manufacturing a tiltrotor wing structure, according to an exemplary embodiment.

An embodiment of the method of manufacture 130 is schematically illustrated in the steps in FIG. 19 identified as a method for manufacturing a tiltrotor wing structure 300.

Figure 20A:
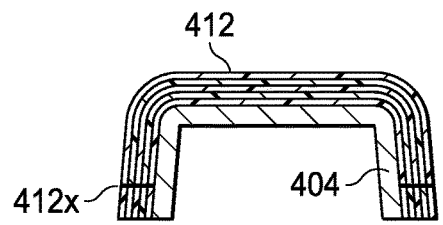
FIG. 20A is a schematic side view of a composite lay-up on a mold used in the construction of cured spar member, according to an exemplary embodiment.
Figure 20B:
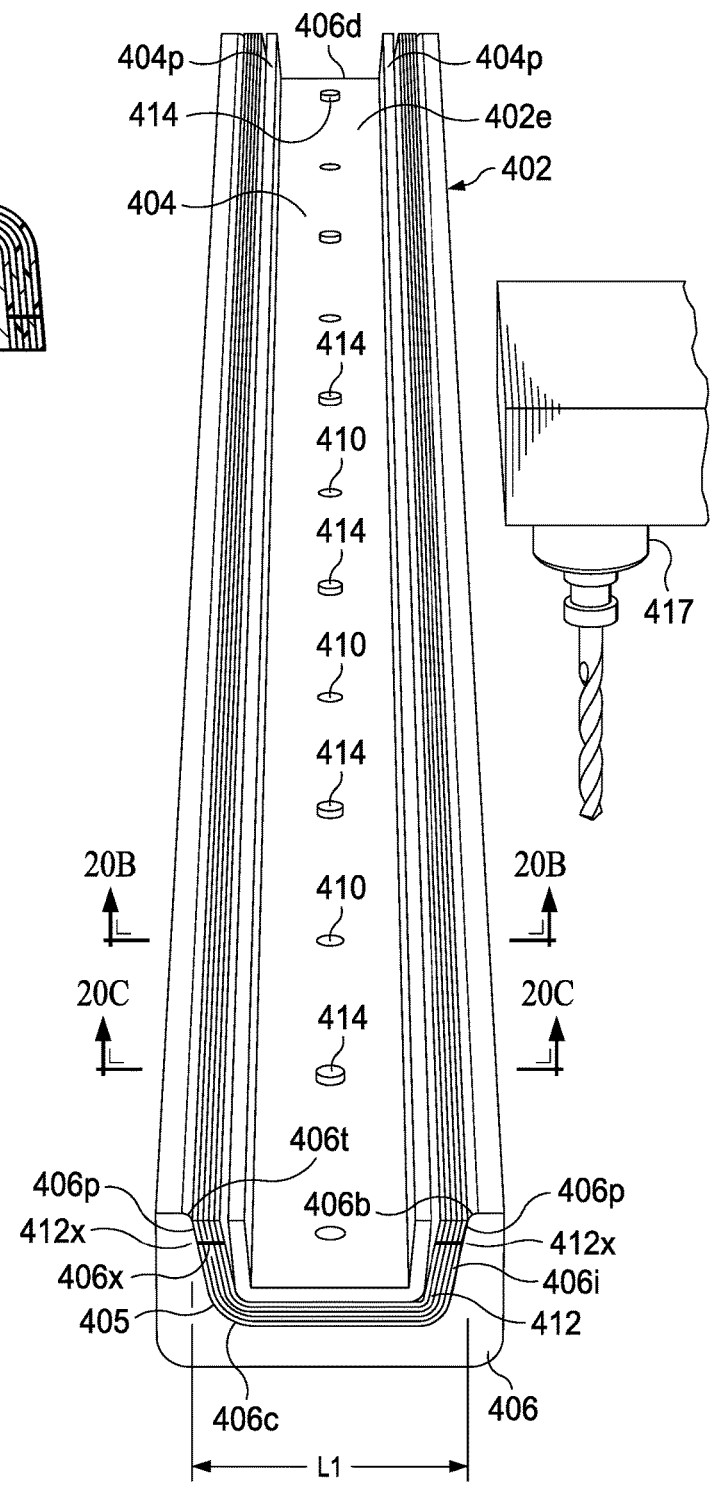
FIG. 20B is a stylized perspective view of a composite lay-up used in the construction of a cured spar member, according to an exemplary embodiment.
Figure 20C:
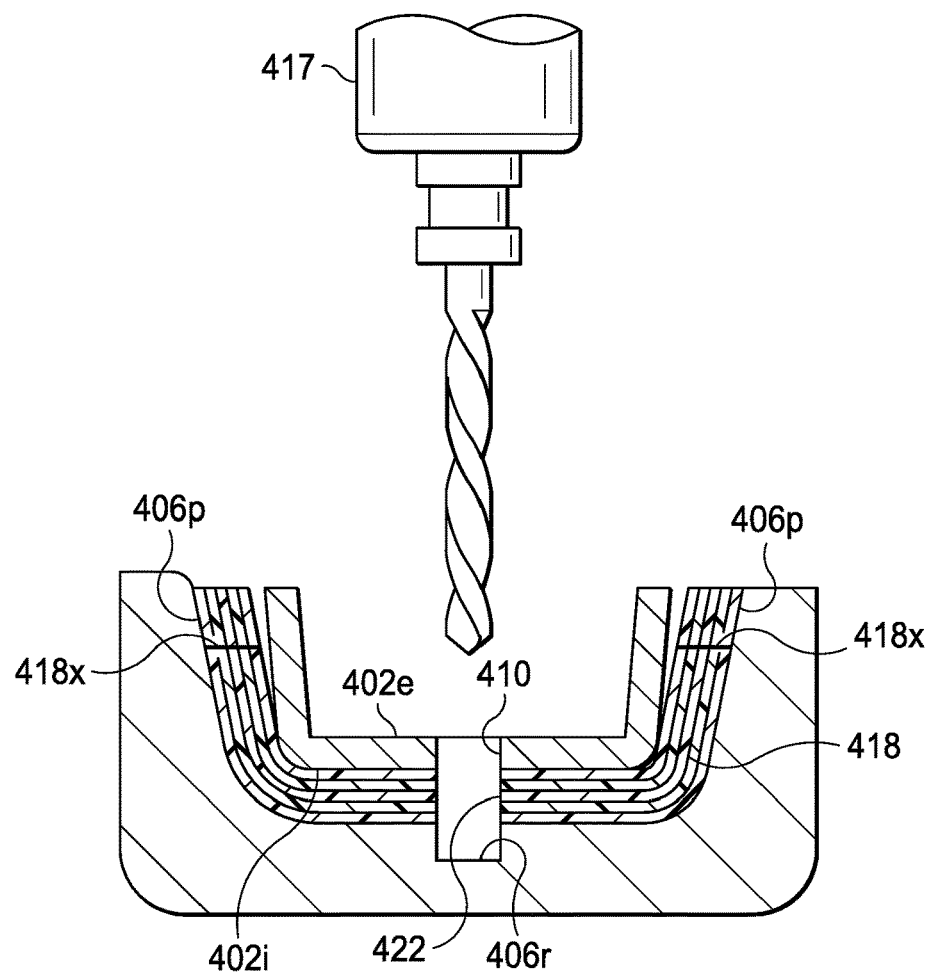
FIG. 20C is a side view of a composite used in the manufacture of a composite spar, according to an exemplary embodiment.

Method 300 can include a step 302 of providing a spar mold 402. Referring now also to FIGS. 20A, 20B, and 20C, the spar mold 402 includes a plurality of bores 410 extending from an exterior surface 402e of the mold 402 to an interior surface of 402i the mold 402. In an embodiment, the spar mold 402 is made of one piece. In another embodiment, the spar mold 402 includes a first mold 404 and a second mold 406 as shown in FIG. 20B. The first mold 404 includes a plurality of bores 410 that correspond in location to a plurality of primary coordination holes 422 in a spar member 418.

In an embodiment, the spar mold 402 is configured for a cured spar member 418 that can be a portion of the aft spar assembly 141. In another embodiment, the spar mold 402 is configured for a cured spar member 418 that can be a portion of the forward spar assembly 143. In an embodiment, the spar mold 402 is configured to be used as either a left or right cured spar member 418. In an exemplary embodiment, shown in FIG. 20B, there are twelve bores 410 that can correspond to a plurality of primary coordination holes 422 in the spar member 418, half of the twelve bores 410 can be selectively plugged to determine a right or left sided spar member 418 when the corresponding holes are drilled therein.

Figure 25A:
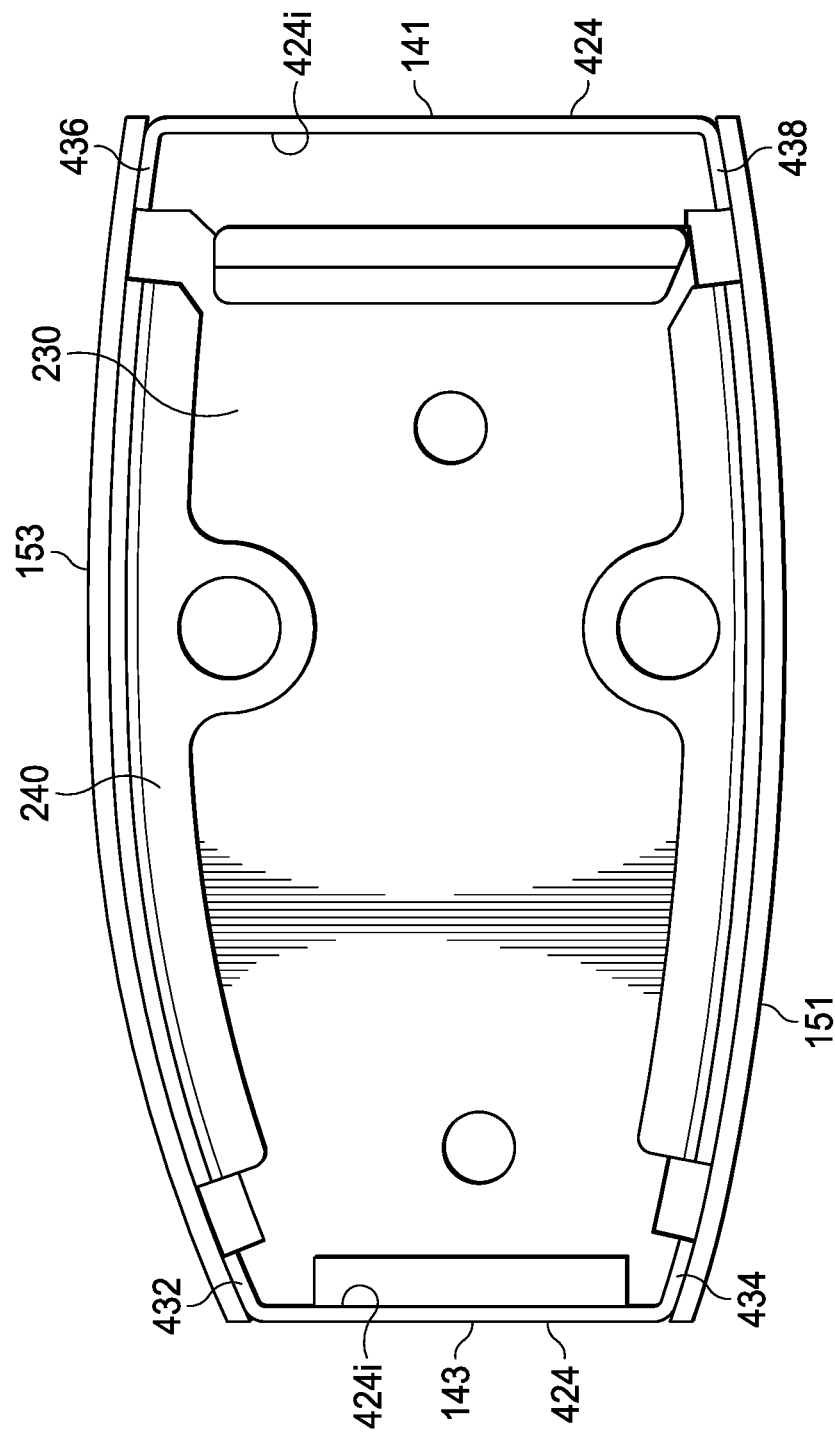
FIG. 25A is a schematic side view of a torque box assembly with aft and forward spars assemblies according to the embodiment shown in FIG. 20C, according to an exemplary embodiment.

In one embodiment, the general height H1 of the support beam 424 of the cured spar member 418 corresponds to the length L1 in the second mold 406 where the bottom fabric ply 405 is bent thereby. An embodiment provides that the length L1 of a mold for the cured spar member 418 configured for the forward spar assembly 143 is less than the length L1 of a mold for the cured spar member 418 configured for the aft spar assembly 141. As such, the composite molded cured spar member 418 for a forward spar assembly 143 has a height H1 less than the height H1 of the composite molded cure spar member 418 for the forward spar assembly 141 as shown in FIG. 25A. In an alternate embodiment, the length L1 of a mold for the cured spar member 418 configured for the forward spar assembly 143 is more than the length L1 of a mold for the cured spar member 418 configured for the aft spar assembly 141. As such, the composite molded cured spar member 418 for a forward spar assembly 143 has a height H2 more than the height H2 of the composite molded cure spar member 418 for the forward spar assembly 143.

The second mold 406 includes an interior surface 406*i* that resembles the desired outer contour of a spar and having a periphery 406*p* defined by a top edge 406*t*, a bottom edge 406*b*, and outboard ends 406*c*, 406*d*. In an embodiment, the second mold 406 has a periphery 406*p* defined by a top edge 406*t*, a bottom edge 406*b*, and outboard ends 406*c*, 406*d*. In one embodiment, the second mold 406 has a periphery 406*p* adjacent to the top edge 406*t*, bottom edge 406*b*, and outboard ends 406*c*, 406*d*. In an embodiment, the periphery 406*p* is below the top edge 406*t* and bottom edge 406*b*. In another embodiment, the second mold 406 has a periphery 406*p* within the top edge 406*t*, bottom edge 406*b*, and outboard ends 406*c*, 406*d* and generally above the cutting periphery 418*x* at the top edge 406*t* and the bottom edge 406*b*. In an embodiment, the second mold 406 includes a plurality of recesses 406*r* to provide minimal clearance for a tool to drill a plurality of primary coordination holes 422 in a cured spar member 418.

Method 300 can include a step 304 of selecting a plurality of resin impregnated plies 412. The step 304 can include placing the selected plurality of resin impregnated plies 412 onto mold 404 in an inverted position as shown in FIG. 20A then rotating the mold 404 with the plies 412 thereon into the second mold 406. In step 304 the selected plurality of resin impregnated plies 412 continuously extend beyond the periphery 406*p* of the second mold 406. Step 306 includes laying the plurality of resin impregnated plies 412 in the spar mold 406 so that the plurality of resin impregnated plies 412 extend beyond the periphery 406*p* of the spar mold 406 as shown in FIGS. 20B-20C. In an embodiment, the plurality of resin impregnated plies 412 continuously extend beyond the periphery 404*p* of the first mold 404 in the spar mold 402. In trimming step 322, the plies 412 can be trimmed at line 412*x*, which is at a location 406*x* within or under the periphery 406*p* of the mold 406.

A step 308 of the method 300 includes plugging the plurality of bores 410 with a plurality of plugs 414, which can assist step 310 of compacting the plurality of plies 412 in a mold 402. As shown in FIG. 20B, an embodiment provides that six of the twelve plurality of bores 410 are plugged 414. In an embodiment, step 310 includes applying a vacuum using a vacuum bag surrounding the plurality of plies 412 in the mold 402 to compact the plies 412 therein.

In another embodiment, step 310 includes compacting by pressing of the first mold 404 downward into the first mold 406.

Step 312 involves curing the plurality of plies 412 in the first and second molds 404, 406 to form a cured spar member 418 that extends beyond the periphery 406*p* of the first mold 406 in the spar mold 402. After curing step 312, the plurality of plugs 414 can be removed from the plurality of bores 410 in the first mold 404 in step 314.

Method 300 includes step 316 that involves accurately drilling a plurality of primary coordination holes 422 in the cured spar member 418 in the spar mold 402 using a tool 417 in the plurality of bores 410. The tool 417 can be a drilling tool or other cutting tool that can accurately drill through the plurality of bores 410 in the mold 404 to form a plurality of primary coordination holes 422 in the spar member 481. The plurality of bores 410 act as guide holes that match the corresponding plurality of primary coordination holes 422 in the spar member 418 as shown in FIG. 20C. The drill tool 417 can be positioned above the bore 410 and inserted through the bore 410, into the cured spar member 418, and into a recess 406*r* to form a primary coordination hole 422 in the spar member 418.

In one embodiment, the primary coordination holes 422 are a plurality of primary coordination holes that can include from about four to about twenty holes in the cured spar member 418. In an embodiment, shown in FIGS. 20B and 21A-21C, there are six primary coordination holes 422 in a cured spar member 418 that are positioned at locations that correspond to six bores 410 along the longitudinal axis of the first mold 404. The term "primary coordination holes" means a plurality of holes located on a cured spar member 418 that correspond to coordination locations on the aft spar assembly 141 and the forward spar assembly 143 fitted with rib posts 146 thereon. In an embodiment, the primary coordination holes 422 receive fasteners 452 to attach arms 450 from a fixture 449 such that the fixture 449 supports the aft spar assembly 141 and the forward spar assembly 143. The primary coordination holes 422 determine the position and location of the spar in the fixture 449 and are used to determine the location of the rib posts 146 and the associated rib assemblies 155, which is critical to distribute pressure into the upper and lower composite skin assemblies 151, 153 and to provide support sufficient to prevent catastrophic buckling of the upper and lower composite skin assemblies 151, 153. Using the mold 402 to establish the location and accurately drill the primary coordination holes 422 prior to removal of the cured spar member 418 from the mold 402 can advantageously provide accurate relationships between installed components through installation of the torque box assembly 157 and ultimately the entire wing structure 109 and is a critical step to ensure that the assembled components (forward spar assembly 143, aft spar assembly 141, upper composite skin 153, lower composite skin 151, plurality of rib assemblies 155) are installed correctly, accurately, and quickly. Step 316 can advantageously reduce defects and rework loops that occur during conventional spar assembly.

After step 316, the cured spar member 418 is cooled and removed from the mold 402 and positioned in a numerically controlled machining assembly 419 in step 318. The numerically controlled machining assembly 419 locates a cutting periphery 418*x* of the cured spar member 418 based on the location of the primary coordination holes 422 in step 320 and reduces the cutting periphery 418*x* of the cured spar member 418 in step 322. The trimming step 320 uses the information from the locating step 322 to identify the trimming periphery or "pattern" for cured spar member 418. The inventors have found that by using the plurality of bores 410 in the mold 402 to locate the primary coordination holes 422 and subsequently trimming, the cured spar member 418 manufactured by this process can advantageously provide improved accuracy and consistency of shape and structure over conventional methods.

In one embodiment, the trimming step 320 reduces the perimeter of the cured spar member 418 to a support beam 424 with integral spar flanges 425 that can function to attach the assembled spar to skins and to support and hold components attached to the assembled spar, for example, and not limitation, rib posts. The trimming step 320 can include trimming cured spar member 418 to achieve selected lengths of an upper spar flange 432 and a lower spar flange 434.

Figure 20D:
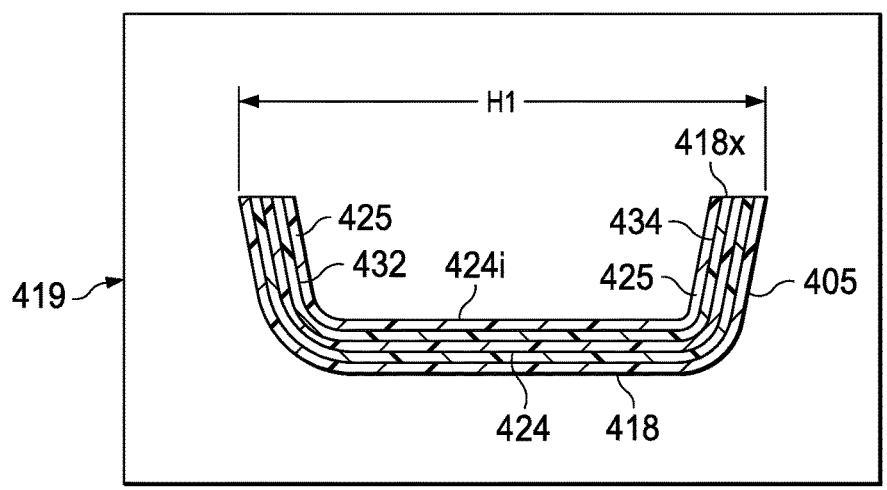
FIG. 20D is a schematic side view of a spar member in a numerically controlled machining assembly, according to an exemplary embodiment.

In one embodiment shown in FIG. 20D, the cured spar member 418 includes integral spar flanges 425 having the upper spar flange 432 and the lower spar flange 434 for attaching to the upper skin composite assembly 153 and the lower composite skin assembly 151, respectively. In an embodiment shown in FIGS. 20D and 25A, both the upper and lower spar flanges 432, 434 extend from an interior surface 424*i* of the support beam 424. Each of the upper and lower spar flanges 432, 436 form a non-acute angle, which means an angle equal to or greater than 90 degrees relative to the interior surface 424*i*.

Figures 25B, 25C:
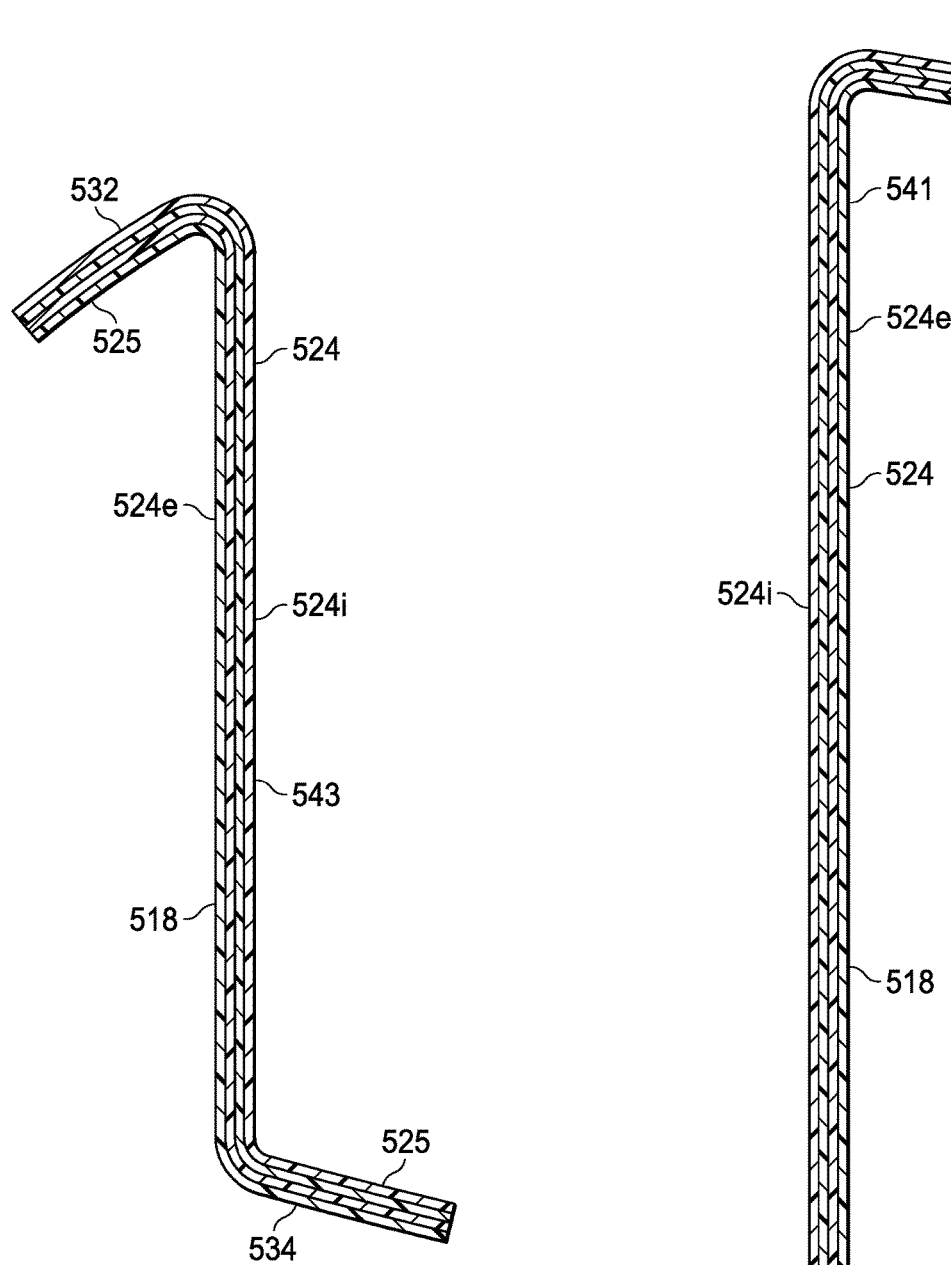
FIGS. 25B and 25C are side views of an exemplary embodiment of an aft and a forward spar members, respectively, according to an exemplary embodiment.
Figure 25D:
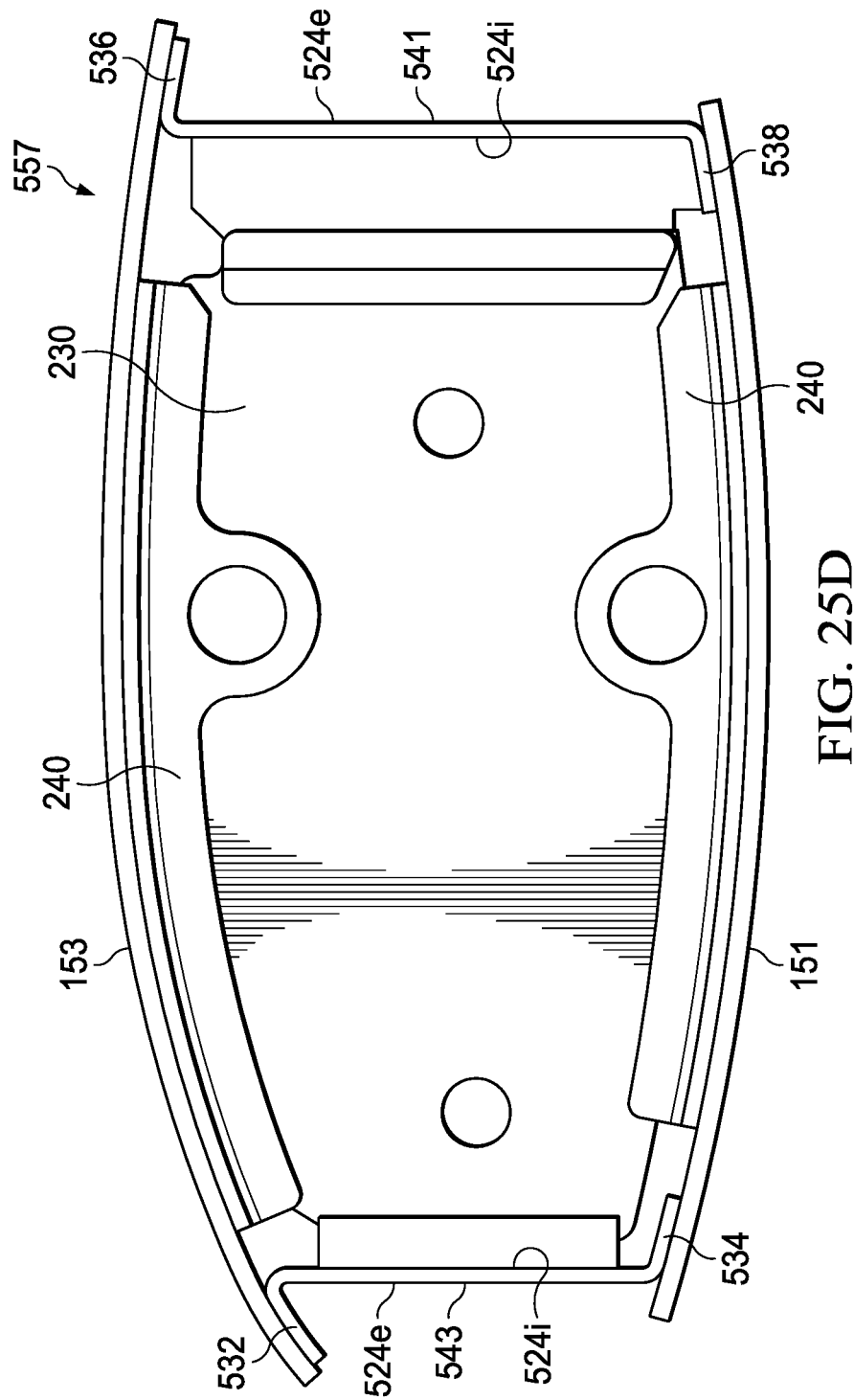
FIG. 25D is a schematic side view of a torque box assembly with the aft and forward spar members shown in FIG. 25B and FIG. 25C, according to an exemplary embodiment.

FIGS. 25B, 25C, and 25D show embodiments of the cured spar member 518. Certain features of the cured spar member 518 and associated components are as described above and bear similar reference characters to the cured spar member 418 and associated components, but with a leading '5' rather than a leading '4'. The cured spar member 518 includes integral spar flanges 525 having an upper spar flange 532 and a lower spar flange 534 for attaching to the upper skin composite assembly 153 and the lower composite skin assembly 551, respectively.

In an embodiment shown in FIG. 25B, the upper spar flange 532 extends from the exterior surface 524*e* of the support beam 524 for the forward spar assembly 543. The upper spar flange 532 forms an acute angle relative to the exterior surface 524*e* of the support beam 524. In an embodiment, the upper spar flange 532 is at an angle from about 50 degrees to about 85 degrees relative to the exterior surface 524*e*. In an embodiment, the upper spar flange 532 is at an angle from about 60 degrees to about 84 degrees relative to the exterior surface 524*e*. In another embodiment, the upper spar flange 532 is at angle from about 65 degrees to about 80 degrees relative to the exterior surface 524*e*. The lower spar flange 534 extends from the interior surface 524*i* of the support beam 524. The lower spar flange 534 forms a non-acute angle relative to the interior surface 524*i*. The term "non-acute angle" means an angle equal to or greater than 90 degrees. In one embodiment shown in FIG. 25B, the lower spar flange 534 is at an angle from about 90 degrees to about 115 degrees relative to the interior surface 524*i* of the support beam 524. This embodiment provides a "Z" spar configuration such that at least one of the spar flanges extends outward or to an exterior portion of the wing structure, which can facilitate the use of automated drilling and fastening of the skins and other wing components thereto. Automated drilling and fastening can advantageously provide at least one of the following: improved hole quality and consistent outcomes as compared to hand drilling and fastening; facilitates the use of clamping pressure during drill operations to prevent the requirement for disassembly ad deburr; permits adaptive drilling techniques in mixed material stack-ups, resulting in faster drilling speed, better hole quality, and less rejection or rework; and allows the collection and use of the statistical process control data to drive quality and cost. Automated drilling and fastening can achieve a speed of up to 12 fasteners per minute, while hand drilling and fastening results in a speed of 2 minutes per fastener or more when disassembly and deburr time is included.

FIG. 25C is an embodiment illustrating the upper spar flange 536 extending from the exterior surface 524*e* of the support beam 524 for the aft spar assembly 541. The upper spar flange 536 forms an acute angle relative to the exterior surface 524*e* of the support beam 524. In some embodiments, the upper spar flange 536 is at an angle from about 50 degrees to about 85 degrees relative to the exterior surface 524*e* of the support beam 524. In an embodiment, the upper spar flange 536 is at an angle from about 60 degrees to about 84 degrees relative to the exterior surface 524*e*. In another embodiment, the upper spar flange 536 is at angle from about 65 degrees to about 80 degrees relative to the exterior surface 524*e*. The lower spar flange 538 extends from the interior surface 524*i* of the support beam 524. The lower spar flange 538 forms a non-acute angle or an angle greater than 90 degrees relative to the interior surface 524*i*. In one embodiment shown in FIG. 25B, the lower spar flange 534 is at an angle from about 50 to about 85 relative to the interior surface 524*i* of the support beam 524. This embodiment provides another example of a "Z" spar configuration for an aft spar assembly 541 that includes at least one of the spar flanges extends outward or to an exterior portion of the wing structure, which can facilitate the use of automated drilling and fastening of the skins and other wing components thereto. FIG. 25D includes the "Z" spar configurations for the forward spar assembly 543 and the aft spar assembly 541 in a torque box assembly 557. In other embodiments, the torque box assembly 557 can include a variety of spar configurations and includes at least one "Z" spar configuration in at least one of the forward spar assembly 543 and aft spar assembly 541.

Figure 25E:
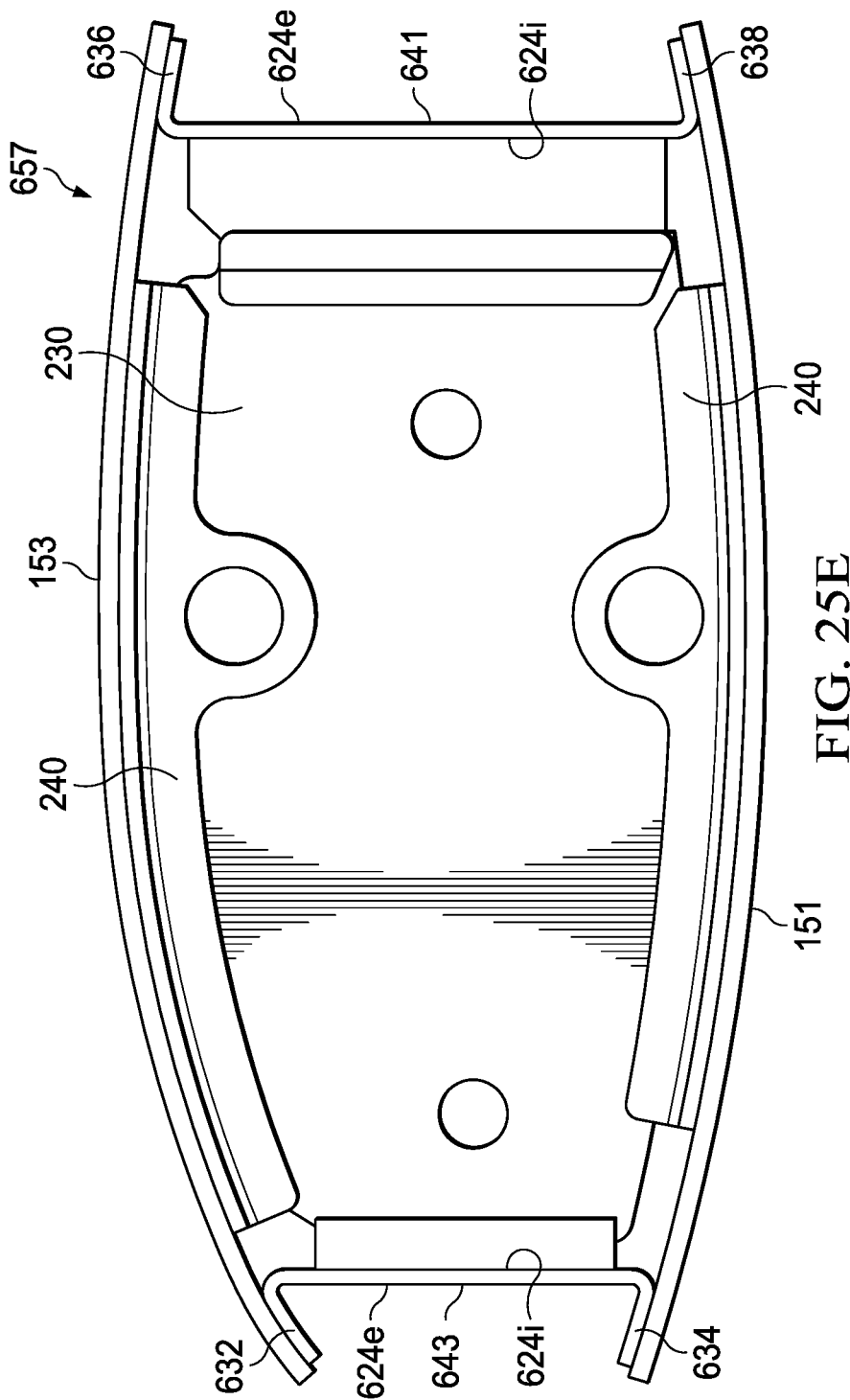
FIG. 25E is a schematic side view of a torque box assembly with an alternate embodiment of the aft and forward spar members, according to an exemplary embodiment.

FIG. 25E shows embodiments of the cured spar member 618 and associated components. Certain features of the cured spar member 618 and associated components are as described above and bear similar reference characters to the cured spar member 518 and associated components, but with a leading '6' rather than a leading '5'. The upper spar flanges 632, 636 extend from the respective exterior surface 624*e* of the forward and aft spar assemblies 643, 641. The lower spar flanges 634, 638 each form an acute angle relative to the respective exterior surface 624*e* of the support beam 624 for the forward and aft spar assemblies 643, 641. The lower spar flanges 634, 638 are each at angle from about 50 degrees to about 85 degrees relative to the exterior surface 624*e* of the support beam 624. In an embodiment, the lower spar flanges 634, 638 are each at an angle from about 60 degrees to about 84 degrees relative to the exterior surface 624*e*. In another embodiment, the lower spar flange 634, 638 are at angle from about 65 degrees to about 80 degrees relative to the exterior surface 624*e*. This embodiment is illustrative of a "C" spar with an outward configuration for the forward spar assembly 643 and the aft spar assembly 641. The "C" spar with outward configuration can advantageously provide the advantageous of the "Z" spar configuration but even more so by using automated drilling and fastening during installation of the skins and components to the top and bottom of the wing. In other embodiments, the torque box assembly 657 can include a variety of spar configurations and includes at least one "C" spar configuration in at least one of the forward spar assembly 643 and the aft spar assembly 641.

The step of locating a periphery 320 of the cured spar member can include identifying a part and accessing the corresponding tooling index plans for the part, which can be performed by the numerically controlled machining assembly 419. The tooling index plans can identify downstream tooling features (for example, and not limitation, indexing holes and locating planes) as well as the desired "as built" configurations, and initial manufacturing work instructions. The tooling index plans can provide downstream consumer information on how the designed part is intended to be manufactured and installed, which can significantly reduce the cycle time and cost of tool design and final manufacturing work instruction development.

Step 324 of the method 300 includes locating a plurality of secondary coordination holes 433 in the cured spar member 418, which are subsequently accurately drilled in step 326 to provide a plurality of secondary coordination holes 433 in the cured spar member 418. The plurality of secondary coordination holes 433 can be located based on the primary coordination holes 422, which can be performed by the numerically controlled machining assembly 419. In an embodiment, there are about 200 secondary coordination holes 433 in each cured spar member 418. Then term "secondary coordination holes" in the cured spar member 418 means holes that correspond to coordination locations in at least one of the following: the lower composite skin assembly 151, the rib posts 146, a plurality of clevis fittings 142, the anchor assemblies 147, and the engagement members 145. The primary and secondary coordination holes 422, 433 establish the relationship of the components to each other and facilitate installation such that separate tooling fixtures are minimized. In one embodiment, the primary and the secondary coordination holes 422, 433 are holes drilled to a nominal position at a width of about 0.098 inch and having a +/−tolerance of 0.005 inches. Many parts and sub-assembled components include a plurality of openings 442 that correspond to the secondary coordination holes 433 and facilitate easy assembly of the cured spar member 418 and ultimately installation of the assembled parts to form a torque box assembly 157.

Figure 21C:
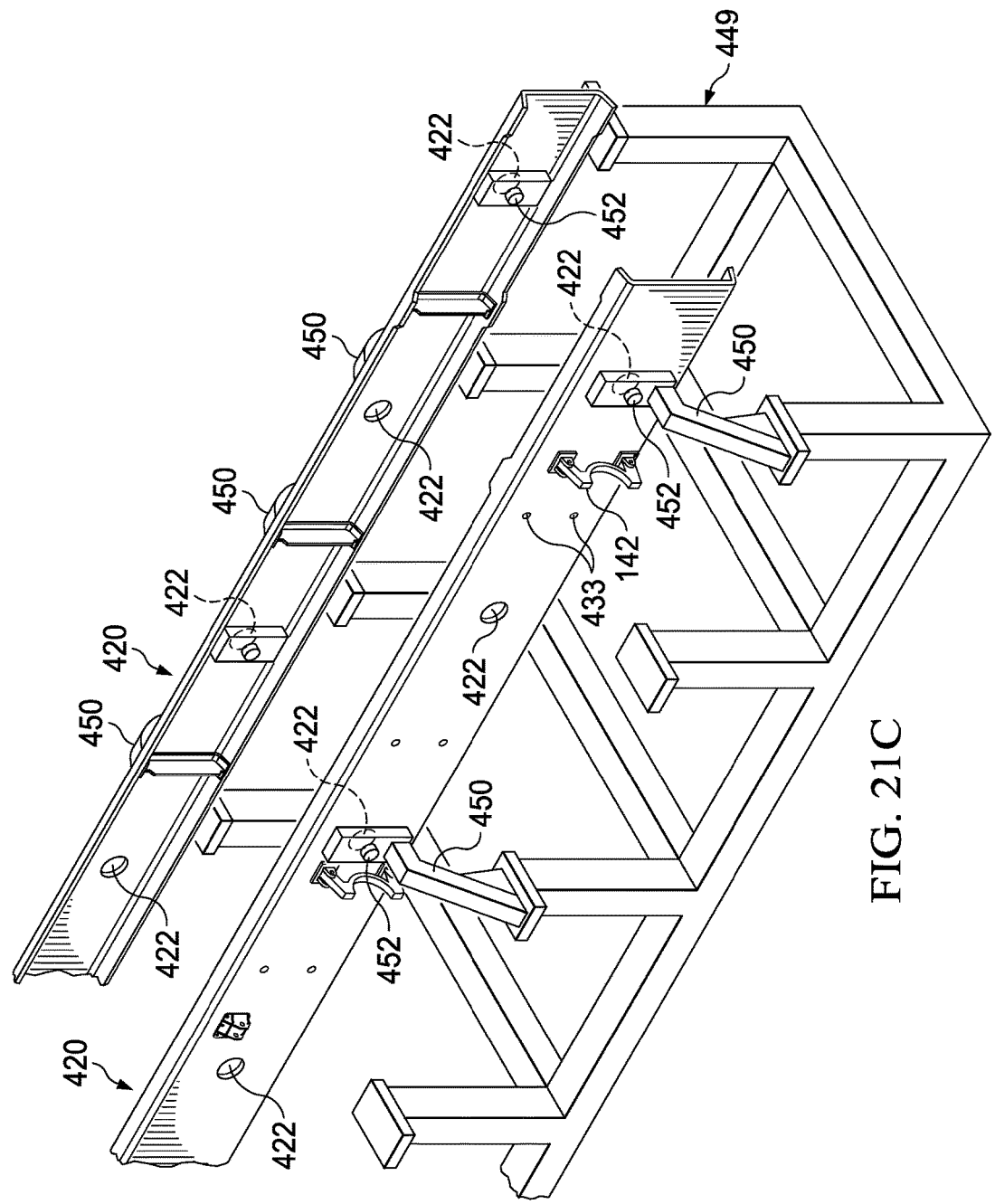
FIG. 21C is a perspective, schematic view of a spar assembly in a fixture, according to an exemplary embodiment.
Figure 22A:
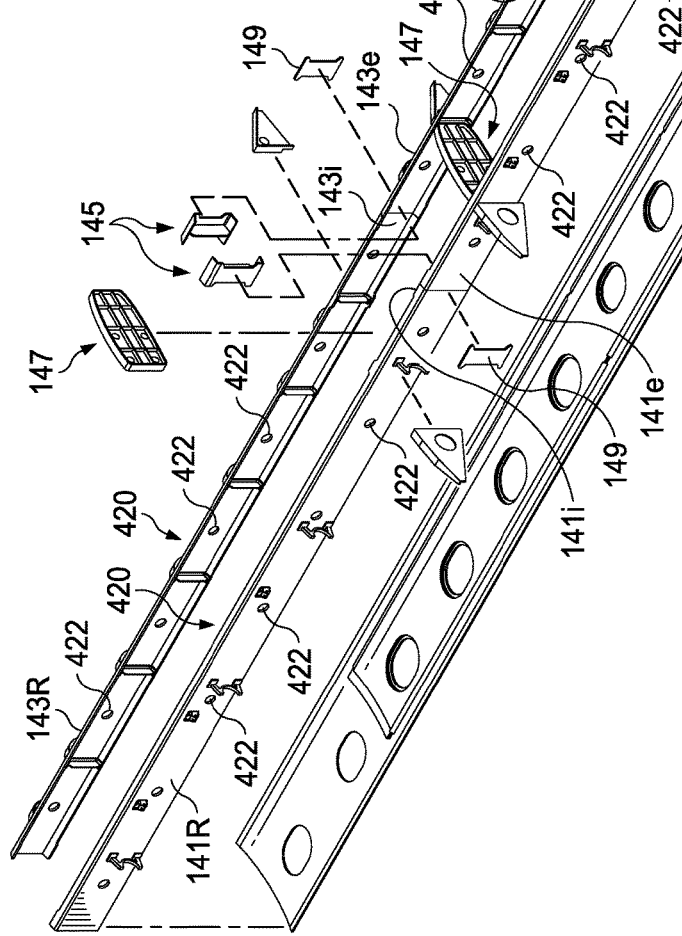
FIG. 22A is a schematic view diagram of a method for installing a lower composite skin assembly to a forward spar assembly and an aft spar assembly, according to an exemplary embodiment.

In step 328 of method 300, the cured spar member 418 undergoes assembly to form a spar sub-assembly 420 on assembly bench 449 and uses only standard tooling such as hand-held drills. The step 328 includes assembly of the plurality of rib posts 146 to the spar member 418 at the plurality of the primary coordination holes 422 as shown in FIGS. 21A and 21C. The step 328 can also include assembly of clevis fittings 142, and other components needed to form a spar sub-assembly 420 for either the left or right aft or forward spar assembly 141L, 141R, 143L, 143R, as shown in FIG. 22A. The clevis fittings 142 can be a plurality of clevis fitting have various configurations as shown in FIGS. 21A-21C. In one embodiment, a clevis 437 includes bases 437a, 437c, and a support feature 437b. The clevis base 437a can be located with one hole and secured to the cured spar member 418 with a fastener therethrough, then the support feature 437b can be fixedly attached to the base 437a. The second base 437c is located by the position of the support feature 437b and secured to the cured spar member 418. The spar sub-assembly 420 can include fittings and components for the leading edge assembly 159 and cove edge assembly 161. The step 328 can include attaching a plurality of stiffeners 435 to the cured spar member 418. The step 328 can advantageously provide a method for performing sub-assembly on a cured spar member 418 that does not require custom and expensive tooling.

Figure 22A:
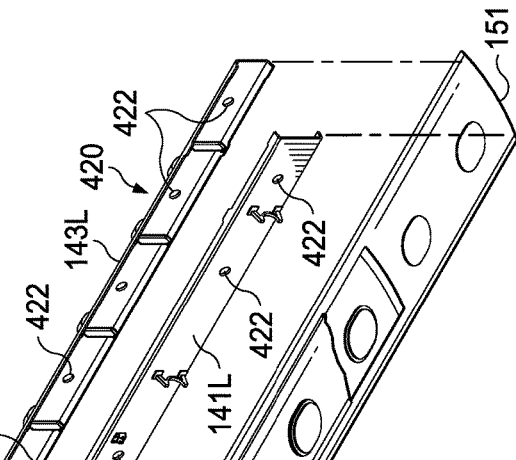

In an embodiment, the step 330 of the method 300 includes repeating the forming the spar sub-assembly step to form the aft spar assembly 141 and the forward spar assembly 143. In an embodiment, shown in FIG. 22, the forward spar assembly is constructed of two spar sub-assemblies 420 designated as a right spar sub-assembly 141R, 143R and a left spar sub-assembly 141L, 143L.

Figure 22B:
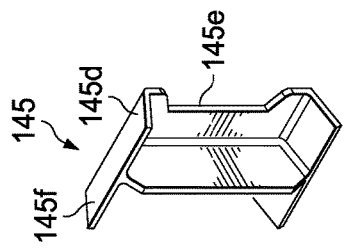
FIG. 22B is a perspective view of an engagement member, according to an exemplary embodiment.
Figure 23:
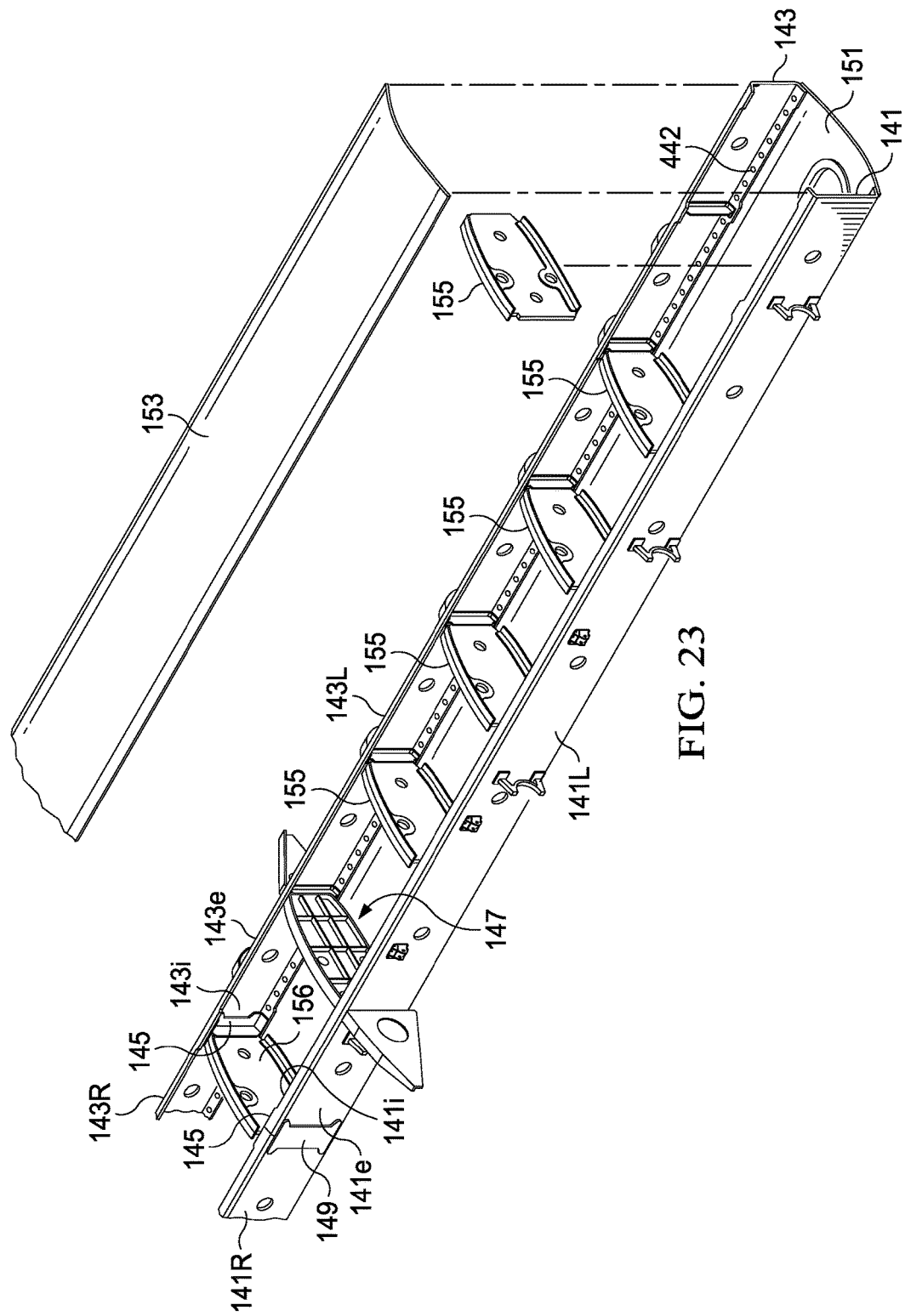
FIG. 23 is a schematic view diagram of a method of installing a plurality of rib assemblies and upper skin composite to form a torque box assembly, according to an exemplary embodiment.

An embodiment provides that the right and left aft spar assemblies 141R, 141L and the right and left forward spar assemblies 143R, 143L are each joined with the engagement member 145 as shown in FIGS. 22A, 22B, and 23. The respective interior surfaces 141i, 143i of the aft and forward spar assemblies 141, 143 are each fixedly attached to the first and second engagement surfaces 145f, 145d on the joining portion 145j of the engagement member 145. In particular, in one exemplary embodiment, as shown in FIG. 23, interior surface 143i of the left forward spar 143L is fixedly attached to the second engagement surface 145d and the interior surface 143i of the right forward spar 143R is fixedly attached to the first engagement surface 145f. In an embodiment, an exterior plate 149 can be positioned over the butt joint of the left and right spar assemblies 420 to reinforcement the joint of the exterior surface 141e, 143e of the aft or forward spar sub-assembly 141, 143. In other embodiments, the engagement member 145 includes at least one attachment surface on the interior surface 145i of the joining portion 145i. The engagement member 145 can be constructed of at least one of a composite material and a metallic material and can be constructed of various materials, shapes and sizes to accommodate at least two spars for an aircraft and other structural members. In one embodiment, the engagement member 145 is a single machined part that splices the left and right forward and aft spars to form aft and forward spar assemblies 141, 143.

In an embodiment, each of the aft and forward spar assemblies 141, 143 are generally straight and do not include a bend or kink as is found in the prior art wing in FIGS. 1 and 2. The generally straight aft and forward spar assemblies 141, 143 advantageously provides structural stiffness and facilitates installation and accuracy of thereof by having straight surfaces for assembly. It should be appreciated that the tiltrotor wing structure can include at least one generally straight forward spar assembly 143 and aft spar assembly 141 constructed of a variety of materials, shapes, and sizes.

The method 300 includes providing assemblies for the installation steps. The lower composite skin 151 assembly is provided in step 332 and includes a plurality of openings 442. The plurality of rib assemblies 155 is provided in step 334 and includes a plurality of openings 442. The lower composite skin 151 and the plurality of rib assemblies 155 can be transported for installation by hand and do not require cranes or other lifting equipment. In an embodiment, the lower composite skin 151 is positioned in the fixture 449, which has a contoured surface that provides uniform structural support to the lower composite skin 151, is located by tool holes to ensure proper alignment, and raised up to join with the bottom of the aft and forward spar assemblies 141, 143 such that the plurality of openings 442 align with the secondary coordination holes 433 in the aft and forward spar assemblies 143, 141.

Step 336 includes installing the lower composite skin assembly 151 to the aft and forward spar assemblies 141, 143. The installation step 336 can include temporarily securing the lower composite skin assembly 151 to the aft and forward spar assemblies 141, 143 with removable pins. The aft and forward edges 151b, 151a are secured to the aft and forward spar assemblies 141, 143, respectively, by at least one of adhesive bonding and fasteners. The adhesive bonding can include adhesives that cure in ambient conditions or temperature sensitive. The fasteners can be secured through secondary coordination holes 433 in the spar flanges 425 of the aft and forward spar assemblies 141, 143 and in the corresponding plurality of openings 442 in the lower composite skin assembly. In an embodiment, the plurality of openings 442 in the lower composite skin 151 can be drilled using the second coordination holes 433 in the spar flanges 425.

The installation step 336 can further include providing a plurality of anchor assemblies 147, positioning the anchor assemblies 147, and installing the anchor assemblies to the aft and forward spar assemblies 141, 143. The plurality of anchor assemblies 147 attach the tiltrotor wing structure to a fuselage. In an embodiment, the plurality of anchor assemblies is located by a fixture tool and fastened to the aft and forward spar assemblies 141, 143 using fasteners.

The installation step 336 further includes installing a plurality of rib assemblies 155 to the aft and forward spar assemblies 141, 143 and to the lower skin 151. The plurality of rib assemblies includes a plurality of openings 442 in the joint members 250, 252 that are aligned with the secondary coordination holes 433 in the rib posts 146 in the aft and forward spar assemblies 141, 143 and then temporarily secured therein with pins. In an embodiment, the skin flanges 240 do not include the plurality of openings 442 therein for securing to the lower or upper composite skin 151, 153 and are secured by paste bonding thereto.

In an embodiment, the rib assemblies 155, the lower skin 151, and the upper skin 153 are configured with fiberglass layers sufficient to eliminate the galvanic corrosion potential of the wing structure 109.

The installation step 336 can include installing a centerline rib assembly 156 with the rib post 145p of the engagement member 145 by fixedly attaching the centerline rib assembly 156 to the rib post 145p with fasteners. In one embodiment, the centerline rib assembly 156 is a rib assembly 155 as described herein.

The installation step 336 of the method 300 can further include adjusting for tolerance buildup using tolerance adjustment members 146t in the rib posts 146. A portion of the rib posts 146 can include at least one tolerance adjustment member 146t such as a slot for receiving a fastener that can be selectively adjusted in response to tolerance variations during the installing step 336. In an embodiment, tolerance adjustment member 146t is the width of two drilled holes. In one embodiment, the tolerance adjustment members 146t are provided on at least one of the rib posts 146 on the aft spar assembly 141 and on the forward spar assembly 143. Once the tolerance adjustment members 146t have been aligned and secured into position, the plurality of rib assemblies 155 is secured with at least one of adhesive and fasteners to the respective rib posts 146.

The method 300 further includes step 338 of providing an upper composite skin 153, and the step 340 of installing the upper composite skin 153 onto the aft spar assembly 141, the plurality of rib assemblies 155, and the forward spar assembly 143 to form a torque box assembly 157. In an embodiment, the upper composite skin is located using a fixture and is adhesively bonded to the aft spar assembly 141, the plurality of rib assemblies 155, and the forward spar assembly 143. In an embodiment, the installing step 340 can further include curing. In an embodiment, the adhesive can bond at ambient temperature or with a temperature sensitive adhesive using a heating tool. In an embodiment, the curing step can include curing the entire torque box assembly.

In another embodiment, the curing can include curing a portion of the torque box assembly 157. In one embodiment, a heating tool 460 is configured for curing a portion of the torque box assembly 157, as shown in FIGS. 24A-24H, by providing localized heating to a surface 480 while avoiding thermal damage to surrounding components. The surface 480 can be an exposed surface, adhesive between more than one surface. In other embodiments, the heating tool 460 can be used to heat treat or expedite the cure of surface resins, paints, fairing compound, and the like. The localized heating provided by the tool 460 can provide at least one of the following benefits: reduced energy consumption; limits safety concerns related to a heated manufacturing area and surfaces therein; dimensional stability from thermal expansion; and additional tooling and processes may not be needed to compensate for thermal expansion of an entire component. In an embodiment, the adhesive is a room-temperature curable liquid, paste epoxy adhesives, or any adhesive or material that is temperature sensitive such that heat speeds up the desired chemical reaction or cure kinetics.

The surface 480 can be made of a material such as a composite or metallic material having a temperature sensitive adhesive applied thereto or a temperature sensitive resin therein. In an example implementation, the surface 480 is in a fuel bay 484 of torque box assembly 157 as shown in FIG. 24A. The surface 480 has a contour 480a that can be curved, as shown in FIGS. 24A and 24B. The contour 480a can be a curved surface or a horizontal corner of the rib assembly 155 being adhesively bonded to the upper composite skin 153, which can be difficult to access and provide uniform heating thereto with conventional heating tools. In other embodiments, the surface 480 is a vertical corner, straight, or other shapes and sizes of various components.

In a particular embodiment, the heating tool 460 is configured for heating a surface 480 of a fuel bay 484 in the torque box assembly 157 to a temperature sufficient to effect a cure therein. The heating tool 460 includes a heat source 462 having a discharge outlet 464 and a manifold 466. The heat source 462 can be a heating device that provides heated airflow such as, but not limited to, hot gas convention (e.g. a heat gun, hair dryer, or other hot gas supply), a furnace, a space heater, or other heat source. In some implementations, multiple heat sources of the same type or different types are used to heat the surface 480. In an exemplary embodiment, the heat source 462 is a Masterflow® Heat Blower AH-501 made by Master Appliance Corporation. In an embodiment, the discharge outlet 464 is a round end of a barrel on a heat gun.

The manifold 466 includes an intake conduit 468 configured to releasably connect to the discharge outlet 464 and a chamber 470 coupled to the intake conduit 468. The chamber 470 includes a ventilation path 476 for providing uniform airflow to heat the surface 480. The ventilation path 476 includes a plurality of apertures 477 that can be round, rectangular, or other various shapes and sizes sufficient to provide uniform airflow to the surface 480. In one embodiment, the ventilation path 476 is located along the upper edge 470u of the chamber 470 opposite to the bottom end 470L of the chamber 470. The bottom end 470L is releasably engaged with the intake conduit 468 for receiving heated airflow therefrom. In the exemplary embodiment shown in FIG. 24C the ventilation path 476 is a plurality of various sized rectangular slots with the end rectangular slots 478 longer than the middle rectangular slots 479. The ventilation path 476 can be configured to align generally with the contour of the surface 480.

Figure 24D:
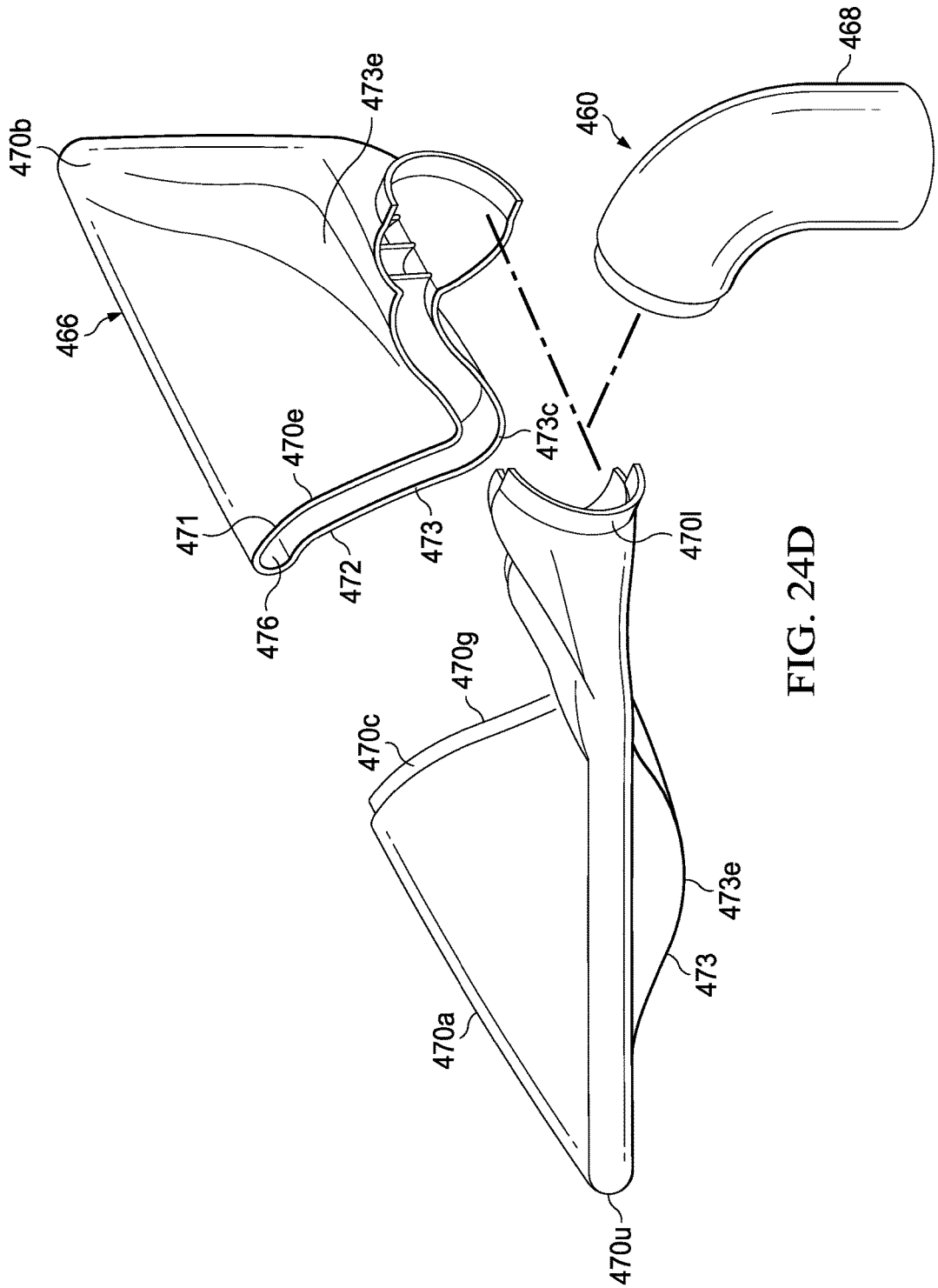
FIG. 24D is an exploded perspective view of a heating tool including a chamber with a first portion and a second portion, according to an exemplary embodiment.
Figure 24E:
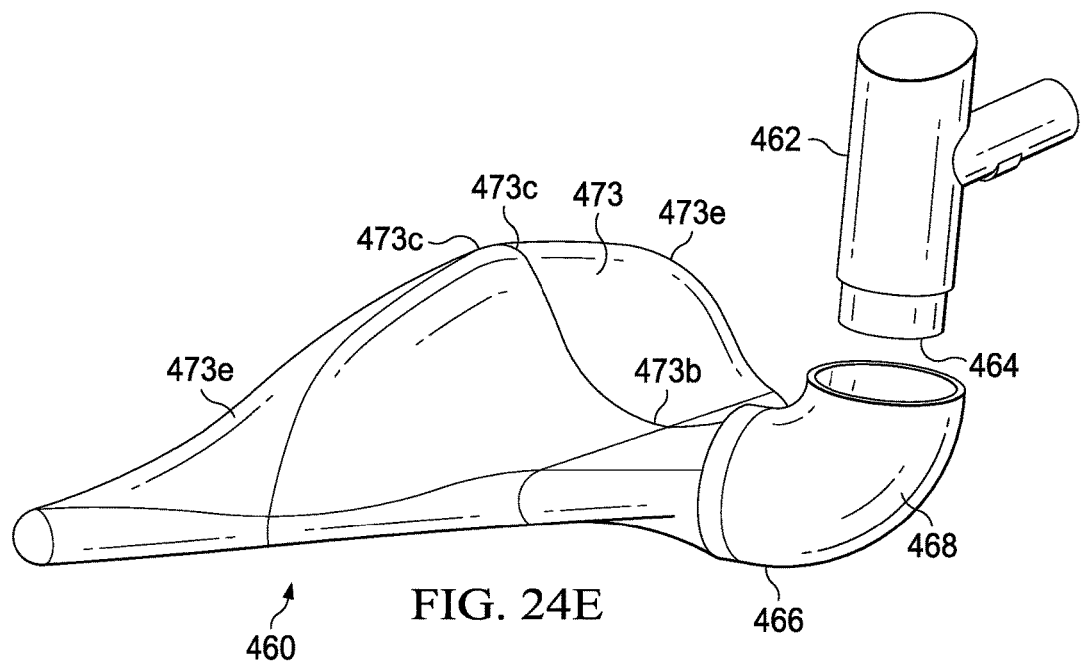
FIG. 24E is a bottom perspective of a heating tool, according to an exemplary embodiment.

The chamber 470 is generally triangular in shape as shown in FIG. 24A. The chamber 470 includes a first wall 471 and a second wall 472 that can be parallel to each other as shown in FIG. 24D to direct the flow of air therebetween. The first and second walls 472 each includes a diverging portion 473 that is configured to provide uniform airflow through the ventilation path 476. In this exemplary embodiment, the diverging portion 473 is a convex portion or shape that extends away from the ventilation path 476. The convex portion 473 shown in FIGS. 24B, 24C, 24D and 24E is disposed between the ventilation path 476 and the intake conduit 468 and radiates from a base 473b centered above the intake conduit 468. The convex portion 473 radially protrudes symmetrically such that the center 473c of the convex portion protrudes more than the outer edges 473e and forms generally a cross-sectional "V" shape as shown in FIG. 24D. In the exemplary embodiment shown in FIG. 24D, the center 473c of the curvature in the convex portion 473 creates an equal distance (equal back pressure) for the airflow as the ventilation path 476 radiates to the edges 473e. The convex portion 473 internally changes the direction and distance of the airflow such that the airflow in the center portion has the same distance of travel as the airflow at the edges to provide uniform airflow through the ventilation path 476. The diverging portion 473 can mix or temper a portion of air through the chamber 470 to provide uniform airflow through the ventilation path 476. In an embodiment, the airflow through the ventilation path 476 is heated convection airflow for heating of a surface 480 that is adhesive bondlines.

Since the surface 480 can be a variety of shapes and sizes with various contours, the size and shape of at least one of the following of the chamber 470, the diverging portion 473, and the ventilation path 476 can be adapted to provide at least one of mixing and tempering of airflow to provide a uniform airflow from the ventilation path 476 to the surface 480. In an illustrative embodiment, if the surface 480 is an oval shaped access panel having a rounded joint member 217 that required heating, the chamber 470 could have a generally rounded or oval shape. In other illustrative embodiments, the chamber 470 could have a generally cruciform shape and can further include staggered and stepped features. In an embodiment, at least one of the following of the chamber 470, the diverging portion 473, and the ventilation path 476 are selectively configured to tailor the airflow through the ventilation path 476 to the surface 480. In an embodiment, the chamber 470 and ventilation path 476 conform to a contour of a surface 480. In another embodiment, the chamber 470 includes structural features such as vanes, nozzles, and the like that assist in distributing and tempering the airflow therethrough to the ventilation path 476.

An embodiment provides that the chamber 470 includes a first portion 470a and a second portion 470b that can be assembled and disassembled. The first portion 470a and the second portion 470 can be releasably engaged along the centerline 470c as shown in FIG. 24D. In an embodiment, the first portion 470a and the second portion 470b are snapped together such that the edge 470e of the second portion overlaps the edge 470g of the first portion. The first and second portions 470a, 470b can be secured together using tape or snapped together using tab fasteners. To facilitate heating in space constrained areas such as the fuel bay 484, the first and second portions 470a, 470b can be assembled in the space constrained area and then connected to the intake conduit 468. In an embodiment, the chamber 470 is configured for assembly and disassembly for space constrained locations such that the first and second portions 470a, 470b and even more portions can be assembled and disassembled having various configurations, for example, a fan type configuration with pieces that fold into themselves.

Figure 24F:
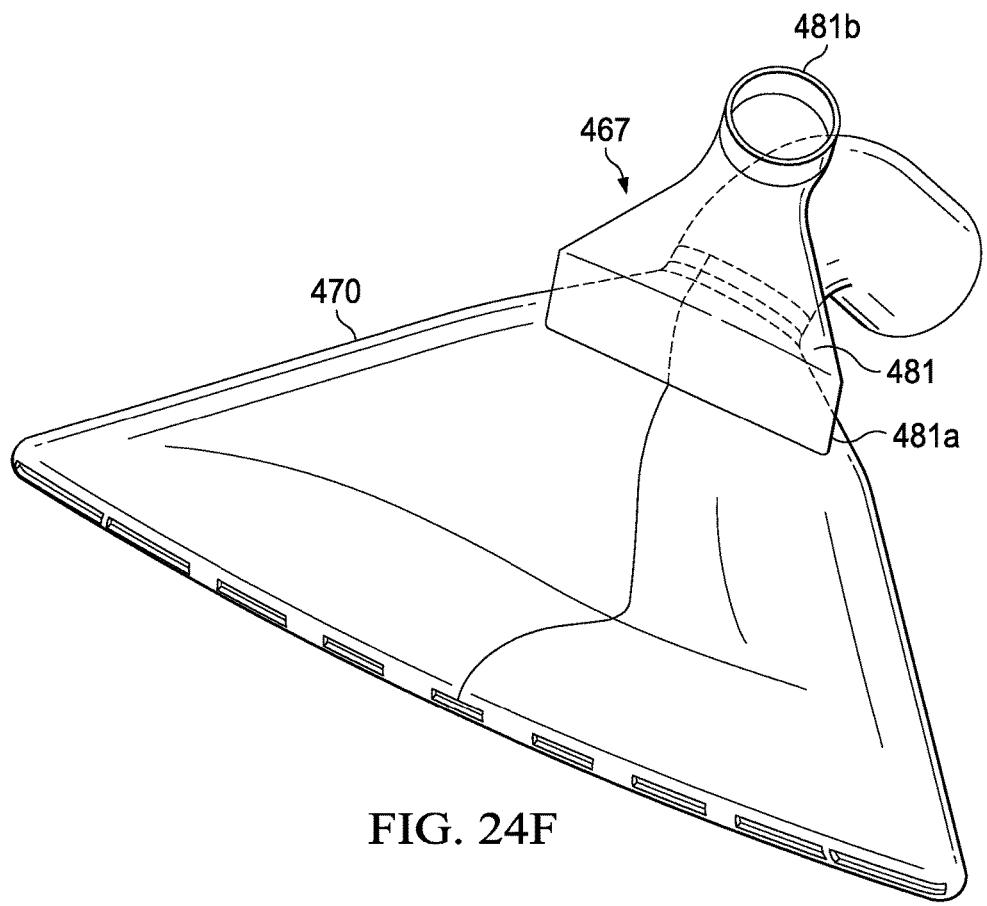
FIG. 24F is a perspective view of a heating tool with an alignment member, according to an exemplary embodiment.

In an embodiment, the heating tool 460 can include an alignment member 467 to minimize misalignment between the ventilation path and the surface and support the weight of at least a portion of the heating tool 460, as shown in FIG. 24F. The alignment member 467 is a stand member 481 including a base 481a connected to the chamber 470 and a cylindrical feature 481b. The base 481 can be removably attached to the chamber 470. The cylindrical feature 481b is positioned in an aperture, for example, and not limitation, as 230r in the rib web 230, to align and support at least a portion of the heating tool 460. The stand member 481 can be used to lock the chamber into position and for locating and aligning the ventilation path 476 with the surface 480.

Figure 24G:
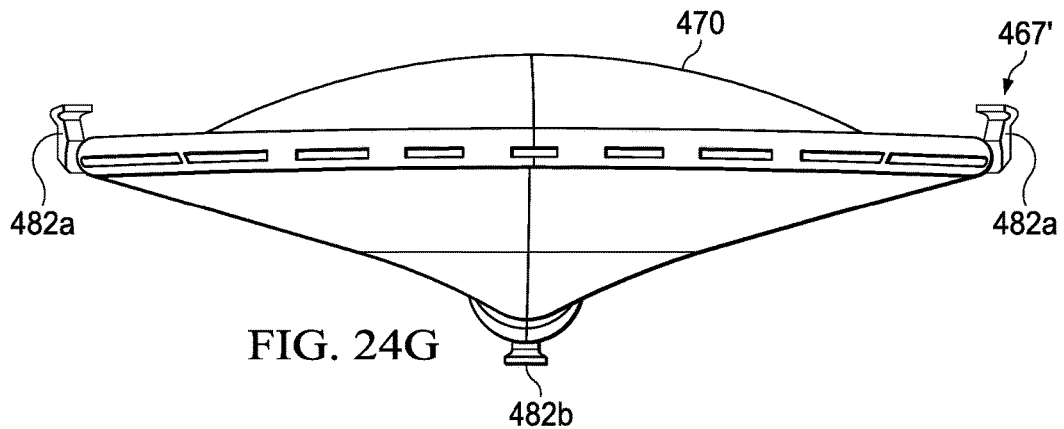
FIGS. 24G and 24H are top view of a heating tool with alignment members, according to exemplary embodiments.

In another embodiment, shown in FIG. 24G, the alignment member 467' can be a clip or clamp 482a located on or near the upper edge 470u of the chamber 470 and a clip or clamp 482b located on or near the intake conduit 468. The clips 482a, 482b are coordinated with structural features near or on the surface 480 to achieve and maintain proper alignment and spacing. In an embodiment, the alignment member 467' includes at least one clip or clamp 482a, 482b at position to align and secure the chamber 470 for proper alignment with the surface 480. The clip or clamp 482a, 482b can be in various locations on the chamber 470 and the intake conduit 468 as needed for a particular configuration of the heating tool 460.

Figure 24H:
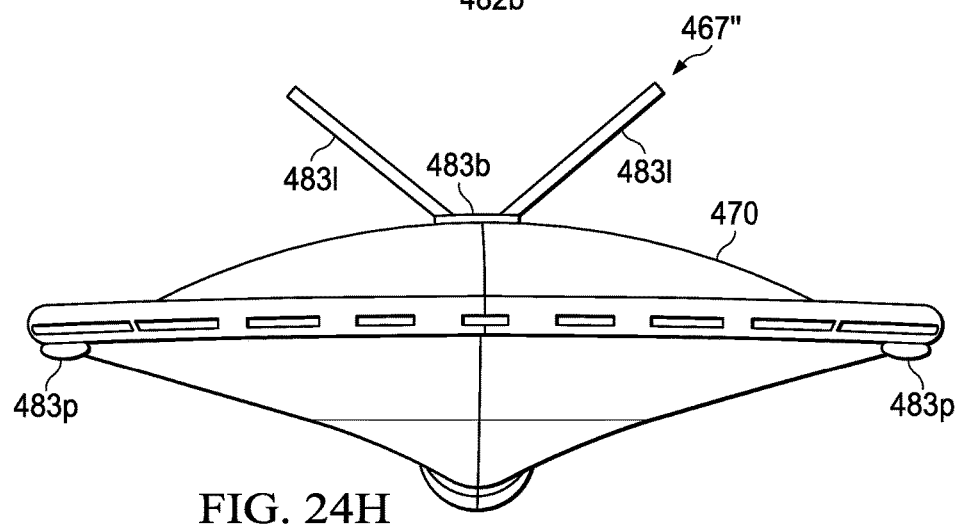

In another exemplary embodiment, shown in FIG. 24H, the alignment member 467" can be a legs 483l extending from a base 483b to support the chamber 470 and a pair of feet 483p located on or near the upper edge 470u of the chamber. The legs 483l can be extendable or telescoping legs. The pair of feet 483p can maintain desired and uniform spacing between the ventilation path and the surface 480. The clip or clamp 482a, 482b, the feet 483p, the base 483b, and the 483l can be separate or integral to the heating tool 460.

The alignment member 467, 467', 467" can be used for locating, positioning, and locking the heating tool 460 into place for the duration of its operation and can be dissembled thereafter. In another embodiment, the alignment member 467 can include a plurality of pins with locating features that line up with existing holes or offset features of the surface 480 to marry up to the surrounding surfaces.

Figure 24I:
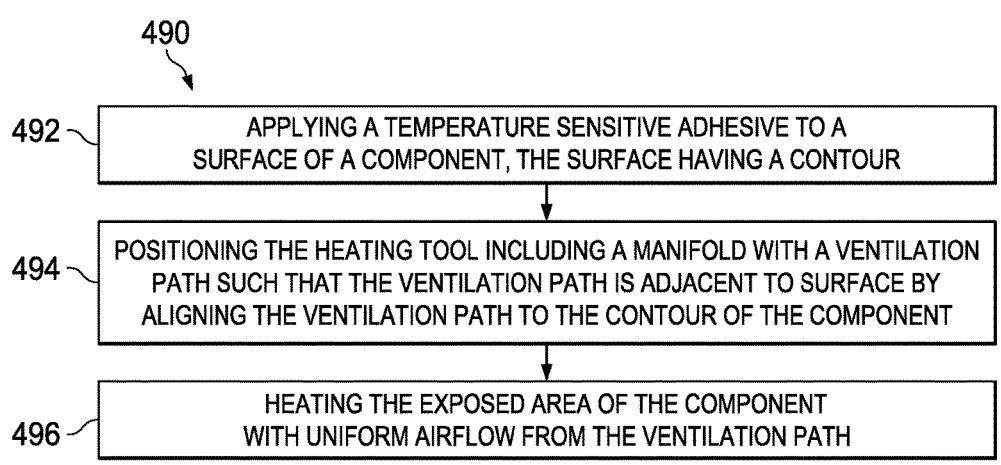
FIG. 24I is a flow diagram of a method of curing using a heating tool, according to an exemplary embodiment.

In an embodiment shown in FIG. 24I, there is a method of curing a component for an aircraft 490 including the steps of applying a temperature sensitive adhesive to a surface 480 of a component in step 492, the surface 480 having a contour; positioning the heating tool 460 including a manifold 466 with a ventilation path 476 such that the ventilation path 476 is adjacent to surface 480 by aligning the ventilation path 476 to the contour 480c of the component in step 494; and heating the exposed area of the component with uniform airflow from the ventilation 476 path in step 496. The chamber 470 and the intake conduit 468 can be assembled prior to the positioning step 492; and, in an exemplary embodiment, the first and second portions 470a, 470b are assembled in the fuel bay 484 of the torque box assembly 157. The ventilation path 476 is aligned adjacent to the surface 480, which means the ventilation path is generally alongside, besides, or next to the surface 480, to provide localized heating thereto. The heating step 496 can involve heating the surface 480 from ambient temperature to about 350 F; however, it will be appreciated that the contemplated embodiments can involving heating higher than 350 F for certain surfaces. In an embodiment of the method of curing 490, the method can include applying direct heated air to the surface 480 of a curing area in a location that is difficult to reach due to the structure of the component. Advantageously the method of curing 490 and heating tool 460 can provide heating by the ventilation path 476 within a heating zone HZ of the surface 480 being heated without overshooting upper limits of curing temperatures and avoiding thermal damage incurred upon the assembly or parts comprising the assembly. The heating zone HZ can be a periphery of a component having adhesive or other curable material thereon or therein. Moreover, the method of curing 490 and the heating tool 460 can provide at least one of the following advantages: accelerated cure kinetics of the surface 480 with the selected application of heat thereto; reduced cure time; improved cure properties; can increase and control temperature ramp rates, particularly in insulative honeycomb structures, or structures with variable features such as thickness or material thermal conductivities; minimizes the influence of variable and ambient boundary conditions; enables a more efficient mode of heat transfer; and allows for localized heat to the surface 480 in adhesively bonded components without overshooting upper limits of curing temperatures.

Figure 26:
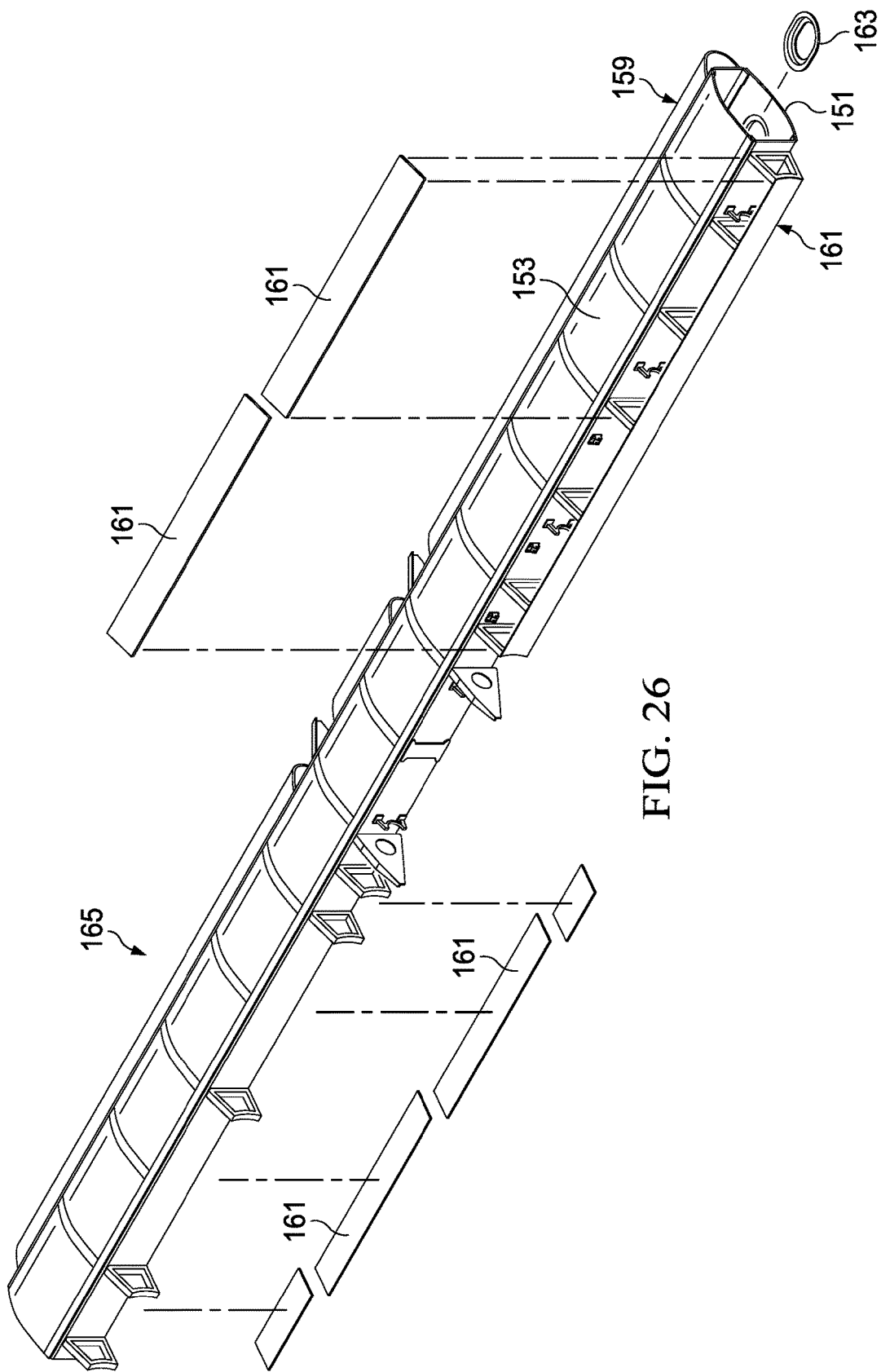
FIG. 26 is a schematic view diagram of a method of installing a leading edge assembly, a cove edge assembly, and fuel access covers to form a wing structure; according to an exemplary embodiment.

Step 342 of the method 300 as shown in FIG. 26 includes installing a leading edge assembly 159 and a cove edge assembly 161 to the torque box assembly 157 to form the wing structure 165 for a tiltrotor aircraft 101. The step 342 can include installing fuel access covers 163 in the lower composite skin assembly 151.

Advantages of the method of manufacture 300 can include at least one of the following advantages: upstream spar assemblies 141, 143, skin assemblies 151, 153, and rib assemblies 155 reduce the need for assembly during the final installation steps in method 300, which reduces the number of fixtures needed during the installation steps by 60% as compared to the prior art methods used in FIGS. 1 and 2; reduces the floor space needed by about 50% as compared to the prior art methods used in FIGS. 1 and 2; reduces the hours for assembly and installation of the torque box assembly 157 by about 32% when compared to the manufacture of the torque box of the prior art wing shown in FIGS. 1 and 2; and the prefabricated lower composite skin 151 provides a flat bottom and requires only foam fillets in each corner of a fuel bay.

An embodiment provides a wing member 109 for a tiltrotor aircraft 101 including a wing having a straight forward edge 109a and a straight aft edge 109b. Each of the straight forward edge 109a and the straight aft edge 109b are made of a left and right spar assembly 143R, 143L, 141R, 141L, respectively. The wing 109 can include a lower composite skin 151 and an upper composite skin 153. Each of the lower and upper composite skins 151, 153 are a composite assembly including of a first skin 201, a second skin 211, and a honeycomb core 207 disposed between the first skin 201 and the second skin 211. The honeycomb core 207 is made from a plurality of honeycomb panels 203 positioned along the longitudinal axis of the first skin. The wing member 109 can advantageously provide at least one of the following benefits: a straight wing with a simplified cross-section, which eliminates the need for costly splicing at contour break locations and reduces part count of the entire wing structure by about 75% as compared to the conventional structure shown in FIGS. 1 and 2; reduces the number of discrete tools; less fasteners as compared to the prior art shown in FIGS. 1 and 2, which means less deburring; the numerous horizontal and vertical stiffeners needed for conventional aerospace structures as shown in FIGS. 1 and 2 are no longer needed for buckling resistance and to transfer the load and resist out of plane bending forces; and the smooth lower composite skin interior surface can improve fuel capacity.

At least one embodiment is disclosed and variations, combinations, and/or modifications of the embodiment(s) and/or features of the embodiment(s) made by a person having ordinary skill in the art is within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). For example, whenever a numerical range with a lower limit, $R_l$, and an upper, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 5 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrow terms such as consisting of, consisting essentially of, and comprised substantially of. Accordingly, the scope of protection is not limited by the description set out above but is defined by the claims that follow, the scope including all equivalents of the subject matter of the claims. Each and every claim is incorporated as further disclosure into the specification and the claims are embodiment(s) of the present invention.

What is claimed is:

1. A method of making a pre-cured laminate having a total number of plies in a mold, the mold having a cavity with a periphery defined by a forward edge, an aft edge, and outboard ends, comprising:
    selecting a first plurality of resin impregnated plies configured to continuously extend beyond the periphery of the cavity, the first plurality of resin impregnated plies comprises at least 50 percent of the total number of plies;
    selecting a second plurality of resin impregnated plies that do not extend beyond the forward edge and continuously extend beyond the aft edge;
    laying the first plurality of resin impregnated plies in the cavity to form a portion of the total number of plies;
    laying the second plurality of resin impregnated plies in the cavity to form a portion of the total number of plies;
    compacting the total number of plies in the cavity; and
    pre-curing the total number of plies to form a pre-cured laminate;
wherein the pre-cured laminate extends beyond the periphery of the cavity.

2. The method of claim 1, wherein the first plurality of resin impregnated plies comprises from about 50 percent to about 90 percent of the total number of plies.

3. The method of claim 1, wherein the second plurality of resin impregnated plies comprises from about 15 percent to about 25 percent of the total number of plies.

4. The method of claim 1, further comprising:

selecting a third plurality of resin impregnated plies that do not extend beyond the aft edge and continuously extend beyond the forward edge; and laying the third plurality of resin impregnated plies in the cavity to form a portion of the total number of plies.

5. The method of claim 4, wherein the third plurality of resin impregnated plies comprises from about 15 percent to about 25 percent of the total number of plies.

6. The method of claim 4, wherein a portion of the third plurality of plies do not extend beyond the outboard ends.

7. The method of claim 4, further comprising:

selecting a fourth plurality of resin impregnated plies that do not extend beyond the outboard ends and continuously extend beyond the forward and aft edges; and laying the fourth plurality of resin impregnated plies in the cavity to form a portion of the total number of plies.

8. The method of claim 7, wherein the fourth plurality of resin impregnated plies comprise from about 5 percent to about 50 percent of the total number of plies.

9. The method of claim 1, further comprising:

trimming the pre-cured laminate to reduce the pre-cured laminate to the periphery of the cavity.

10. The method of claim 1, wherein the total number of plies is from about 8 plies to about 100 plies.

11. The method of claim 1, wherein the resin impregnated plies are made from a fiber selected from the group consisting of glass, carbon, graphite, basalt, and aramid.

12. The method of claim 1, wherein the resin impregnated plies comprise at least one of a woven fabric and a tape.

* * * * *